United States Patent
Campos et al.

(10) Patent No.: US 11,898,900 B1
(45) Date of Patent: Feb. 13, 2024

(54) DISTRIBUTED FIBER OPTIC SENSING SYSTEMS AND METHODS

(71) Applicant: Cable Television Laboratories, Inc., Louisville, CO (US)

(72) Inventors: Luis Alberto Campos, Superior, CO (US); Zhensheng Jia, Superior, CO (US); Mu Xu, Broomfield, CO (US); Haipeng Zhang, Broomfield, CO (US); Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/652,674

(22) Filed: Feb. 25, 2022

Related U.S. Application Data

(60) Provisional application No. 63/153,829, filed on Feb. 25, 2021.

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC ............... G01H 9/004; G01D 5/35341; G01D 5/35345; G01D 5/35351; G01D 5/35354; G01D 5/35358; G01D 5/35361; G01D 5/35364; G01D 5/35367
See application file for complete search history.

(56) References Cited

U.S. PATENT DOCUMENTS

| | | | |
|---|---|---|---|
| 10,451,448 B2* | 10/2019 | Rowen | H01S 3/0675 |
| 2019/0204192 A1* | 7/2019 | Jaaskelainen | G01N 3/08 |
| 2020/0200592 A1* | 6/2020 | Huang | H04B 10/071 |
| 2020/0313763 A1* | 10/2020 | Wang | G01D 5/35374 |
| 2022/0341319 A1* | 10/2022 | Duthie | G01F 1/661 |

OTHER PUBLICATIONS

Z. Zhan, "Distributed Acoustic Sensing Turns Fiber-Optic Cables into Sensitive Seismic Antennas," Seismological Research Letters 91, No. 1 (2019).

M.R. Fernandez-Ruiz, "Distributed acoustic sensing for seismic activity monitoring," APL Photon, 030901 (2020).

E.F. Williams, et al., "Distributed sensing of microseisms and teleseisms with submarine dark fibers," Nature Communications, 10, 5778 (2019).

(Continued)

*Primary Examiner* — Michael A Lyons
(74) *Attorney, Agent, or Firm* — PdZ Patent Law, PLLC

(57) ABSTRACT

A method for distributed fiber optic sensing (DFOS) includes (a) generating first data signals for transmission via a first fiber optic strand, (b) generating first sensing signals for transmission via the first fiber optic strand, and (c) analyzing at least one of first back-scattering signals and first forward-scattering signals of the first sensing signals, to perform DFOS. The method may further include generating the first sensing signal such that presence of the first sensing signal on the first fiber optic strand does not interfere with transmission of the first data signal by the first fiber optic strand.

18 Claims, 28 Drawing Sheets

(56) References Cited

OTHER PUBLICATIONS

M.R. Fernandez-Ruiz et al., "Distributed Acoustic Sensing Using Chirped-Pulse Phase-Sensitive OTDR Technology," Sensors 19, 4368 (2019).
J. Pastor-Graells, et al., Chirped-Pulse Phase-Sensitive Reflectometer Assisted by First-Order Raman Ampolification, Journal of Lightwave Technology, vol. 35, No. 21, pp. 4677-4683 (2017).
Wellbrock, Glenn A., et al.; "First Field Trial of Sensing Vehicle Speed, Density, and Road Conditions by Using Fiber Carrying High Speed Data," OFC 2019.

* cited by examiner

| Data Signal Type | Desired Parameter Set |
|---|---|
| Type A | Parameter Set 1 |
| Type B | Parameter Set 2 |
| Type C | Parameter Set 1 |
| Type D | Parameter Set 3 |
| Type E | Parameter Set 2 |

DISTRIBUTED FIBER OPTIC SENSING SYSTEMS AND METHODS

CROSS REFERENCE TO RELATED APPLICATIONS

This application claims the benefit of priority to U.S. Provisional Patent Application Ser. No. 63/153,829, filed on Feb. 25, 2021, which is incorporated herein by reference.

BACKGROUND

Distributed fiber optic sensing (DFOS) has attracted significant attention globally for measuring properties, such as strain, temperature, and vibration, over tens of kilometers by utilizing back-scattering and/or forward-scattering of Rayleigh, Raman, or Brillouin signals in a fiber optic strand. The back-scattering and forward-scattering are caused, for example, by change in chromatic dispersion of the fiber optic strand and/or by change in change in refractive index of the fiber optic strand, due to a perturbation of the fiber optic strand. DFOS provides a very promising way to turn a fiber optic strand into many sensing elements and to monitor real-time parameters along the strand with a single interrogator.

DETAILED DESCRIPTION OF THE EMBODIMENTS

Conventional distributed fiber optic sensing (DFOS) systems require a dedicated fiber optic strand for sensing, which limits deployment of conventional DFOS systems. For example, it is frequently impractical to install a fiber optic cable solely for the purpose of DFOS, such as due to cost and intrusiveness of installing the fiber optic cable, especially in a developed area or in an existing structure.

Additionally, while a dark (unused) fiber of an existing communication fiber optic cable can be used as a dedicated fiber optic strand for DFOS, increasing demand for data transmission has caused shortages of dark fibers in many regions. As such, widescale deployment of conventional DFOS systems is significantly constrained by lack of available fiber optic strands for sensing.

Disclosed herein are DFOS systems and methods which at least partially overcome the above-discussed drawbacks of conventional DFOS systems. The new DFOS systems and methods advantageously enable DFOS sensing signals and data signals to coexist on a common fiber optic strand. Consequently, the new systems and methods do not require a dedicated fiber optic strand for DFOS. As such, the new systems and methods can be implemented in essentially any fiber optic network. Furthermore, certain embodiments of the new systems and methods can turn essentially an entire existing fiber optic network into a distributed sensing system without impairing ability of the network to transmit data. Consequently, the new systems and methods enable DFOS to be deployed in many applications that would not be feasible with conventional DFOS systems. Moreover, particular embodiments are capable of achieving higher sensitivity and/or greater ability to discriminate between sensed perturbations, as discussed below.

Figure 1:
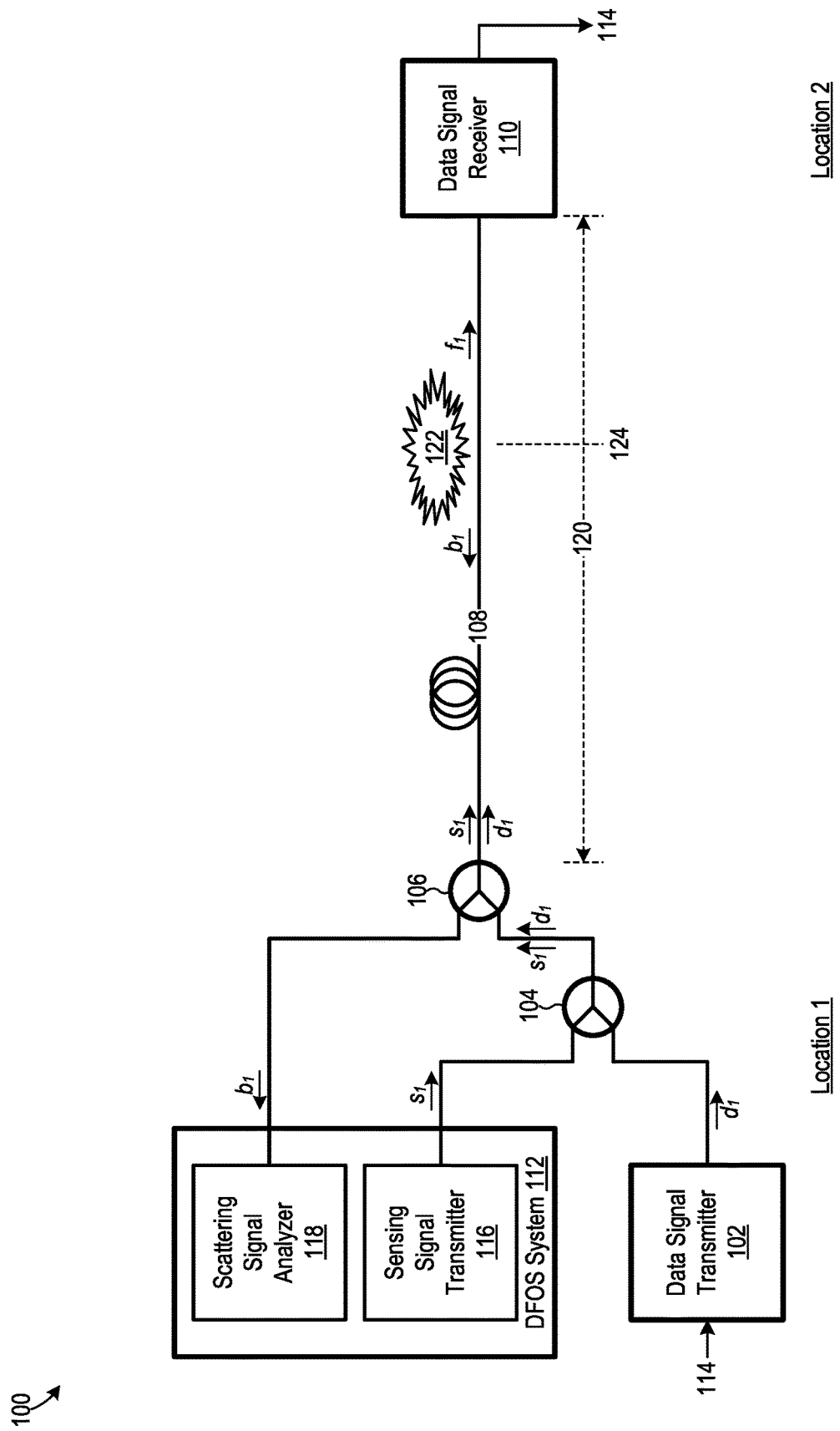
FIG. 1 is a block diagram of a fiber optic network including a distributed fiber optic sensing (DFOS) system, according to an embodiment.

FIG. 1 is a block diagram of a fiber optic network 100, henceforth referred to as network 100 for brevity, which includes an embodiment of the new systems for DFOS. Network 100 includes a data signal transmitter 102, an optical coupler 104, an optical coupler 106, a fiber optic strand 108, a data signal receiver 110, and a DFOS system 112. Data signal transmitter 102, optical couplers 104 and 106, and DFOS system 112 are disposed at a Location 1, and data signal receiver 110 is disposed at a Location 2. Network 100 can include additional elements without departing from the scope hereof. In some embodiments, network 100 is, or is part of, an access communication network, a transmission communication network, a network in a computing environment (e.g., in a data center or in a hyperscale), a network in a vehicle, a network in a plane or other aircraft, a network in a ship or other watercraft, a network in equipment (e.g., in a machine), a network in a structure (e.g., in a building, a bridge, or a tunnel), a network in infrastructure (e.g., in an utility system), a network in a resource extraction application (e.g., in a well or a mine), a network in a military application, a network in a safety application, a network in an intelligence gathering application, a network in a security application, a network in a data collection system, a network in an environmental monitoring system, or the like.

Data signal transmitter 102 is configured to generate data signals $d_1$ for receipt by data signal receiver 110, where data signals $d_1$ are optical signals and may be in digital and/or analog form. Examples of data signals $d_1$ include, but are not limited to, communication signals, controls signals, and feedback signals. Data signals $d_1$ may include two or more different types of data signals, such as two or more data signals having different optical carrier wavelengths and/or two or more data signals generated at different times. In some embodiments, data signal transmitter 102 includes a light source (not shown) and a modulator (not shown), where the modulator is configured to modulate amplitude and/or phase of an optical carrier generated by the light source according to data 114, to generate data signals $d_1$ that are encoded with data 114. Some embodiments of data signal transmitter 102 are configured to implement coherent optics technology and thereby modulate both phase and amplitude of an optical carrier of data signals $d_1$, such that the data signals are transmitted by network 100 across two polarizations. Additionally, some embodiments of data signal transmitter 102 are configured to generate data signals $d_1$ such that at least some of the data signals are intensity modulation-direct detection (IM-DD) data signals.

DFOS system 112 includes a sensing signal transmitter 116 and a scattering signal analyzer 118. Sensing signal transmitter 116 is configured to generate sensing signals $s_1$, and scattering signal analyzer 118 is configured to receive back-scattering signals $b_1$, where both sensing signals $s_1$ and back-scattering signals $b_1$ are optical signals. Sensing signal transmitter 116 and scattering signal analyzer 118 are discussed further below.

Optical couplers 104 and 106 are collectively configured to multiplex data signals $d_1$ and sensing signals $s_1$ onto fiber optic strand 108, as well as to demultiplex back scattering signals $b_1$ from fiber optic strand 108 for delivery to scattering signal analyzer 118. In some embodiments, one or more of optical couplers 104 and 106 includes an optical circulator. The configuration of optical couplers 104 and 106 may vary as long as they are capable of performing aforesaid multiplexing and demultiplexing. Additionally, optical couplers 104 and 106 could be replaced with a single device configured to perform the functions of optical couplers 104 and 106. For example, in some alternate embodiments, optical couplers 104 and 106 are collectively replaced with a wavelength selective switch (WSS) or a chip-enhanced wavelength selective switch (EWSS).

Fiber optic strand 108 is configured to transmit data signals $d_1$ from Location 1 to Location 2. Accordingly, fiber optic strand 108 is connected between optical coupler 106 and data signal receiver 110. In some embodiments, fiber optic 108 strand is part of another element, such as a cable including a plurality of fiber optic strands. Fiber optic strand 108 has a length 120, where length 120 is implementation dependent. For example, in embodiments where network 100 is part of a fiber optic network within a small passenger vehicle, length 120 may be on the order of centimeters or meters. As another example, in embodiments where network 100 is part of a transmission communication network, length 120 may on the order of hundreds of kilometers or thousands of kilometers. Although fiber optic strand 108 is depicted as extending in a straight line, a shape of a path traversed by fiber optic strand 108 may vary. Network 100 may include additional elements along length 120 of fiber optic strand 108, such as couplers (not shown) connecting subsections of fiber optic strand 108, fusion splices (not shown) connecting subsections of fiber optic strand 108, and/or splitters (not shown) splitting fiber optic strand 108 into multiple branches (not shown).

Data signal receiver 110 is configured to receive data signals $d_1$ from fiber optic strand 108. The configuration of data signal receiver 110 is implementation dependent. For example, in embodiments where data signal 110 receiver implements coherent optics technology, data signal receiver 110 includes a coherent optics receiver configured to detect both optical phase and optical amplitude of received data signals $d_1$. In some embodiments, data signal receiver 110 includes a demodulator configured to demodulate data signals $d_1$ and thereby recover data 114 from data signals $d_1$.

DFOS system 112 is one embodiment of the new DFOS systems disclosed herein.

In some embodiments, DFOS system 112 is separate from the other elements of network 100, such as depicted as FIG. 1. For example, in certain embodiments, DFOS system 112 is a self-contained system that functions independently of the remaining elements of network 100, such that DFOS system 112 could be retrofitted into network 100 in embodiments where network 100 is an existing network that is being upgraded to support DFOS. However, DFOS system 112 can be partially or fully integrated with one or more other elements of network 100 without departing from the scope hereof. For example, in particular alternate embodiments, DFOS system 112 is partially or fully integrated with one or more of data signal transmitter 102, optical coupler 104, and/or optical coupler 106. As another example, in some alternate embodiment, DFOS system 112 shares one or more components with data signal transmitter 102, optical coupler 104, and/or optical coupler 106. Additionally, while DFOS system 112 is depicted as being deployed at Location 1, DFOS system 112 could be distributed among two or more locations without departing from the scope hereof. As an example, in some alternate embodiments, DFOS 112 is distributed between Location 1 and Location 2. As another example, in some other alternate embodiments, some elements of DFOS system 112, such as controlling and/or processing components, are implemented in a hub or central office, a remote data center, or in a distributed computing system, such as in a cloud computing system.

In some embodiments, DFOS system 112 is at least partially implemented using element similar to those of FIG. 13, discussed below. For example, in a particular embodiment, sensing signal transmitter 116 is at least partially embodied by a combination of elements similar to sensing signal transmitter 1310 and local sensing signal controller 1302, and scattering signal analyzer 118 is at least partially embodied by a combination of elements similar to sensing signal receiver 1308 and local sensing signal processor 1304. Additionally, in some embodiments, scattering signal analyzer 118 is configured to capture back-scattering signals $b_1$ at least partially using techniques similar to the echo extraction and echo reconstruction techniques disclosed in U.S. Pat. No. 10,958,345 to Xu et al., which is incorporated herein by reference.

Sensing signal transmitter 116 is configured to generate sensing signals $s_1$ for transmission along length 120 of fiber optic strand 108, for detecting occurrence of events in the vicinity of fiber optic strand 108. Specifically, sensing signal transmitter 116 is configured to generate sensing signals $s_1$ such that the sensing signals are scattered in response to perturbation of fiber optic strand 108 due occurrence of an event of interest in the vicinity of fiber optic strand 108. Sensing signals $s_1$ typically scatter in two directions along fiber optic strand 108, i.e., toward sensing signal transmitter 116 and toward data signal receiver 110, response to a perturbation of fiber optic strand 108. Sensing signals $s_1$ scattering toward sensing signal transmitter 116 along fiber optic strand 108 are referred to as back-scattering signals ($b_1$), and signals $s_1$ scattering toward data signal receiver 110 along fiber optic strand 108 are referred to as forward-scattering signals (b). In this document, the term "scattering signals" encompasses both back-scattering signals and forward-scattering signals.

FIG. 1 depicts sensing signals $s_1$ generating back-scattering signals $b_1$ and forward-scattering signals $f_1$ in response to perturbation of fiber optic strand 108 at a location 124 along length 120, due to occurrence of an event 122 at location 124. Examples of the perturbation to fiber optic strand 108 caused by event 122 include, but are not limited to, vibration of fiber optic strand 108, change in strain of fiber optic strand 108, change in electromagnetic environment of fiber optic strand 108, and/or change in temperature of fiber optic strand 108. In certain embodiments, sensing signals $s_1$ have a higher power density, but a shorter duration, than data signals $d_1$. Additionally, in some embodiments, sensing signals $s_1$ are chirped optical pulses.

Importantly, sensing signal transmitter 116 is configured to generate sensing signals $s_1$ such that transmission of sensing signals $s_1$ along fiber optic strand 108 does not interfere with transmission of data signals $d_1$ by network 100. For example, some embodiments of sensing signal transmitter 116 are configured to generate sensing signals $s_1$ such that an optical carrier of sensing signals $s_1$ has a different wavelength than an optical carrier of data signals $d_1$, to reduce likelihood of sensing signals $s_1$ interfering with transmission of data signals $d_1$ by network 100. As another example, certain embodiments of sensing signal transmitter 116 are configured to generate sensing signals $s_1$ solely when data signal transmitter 102 is not generating data signals $d_1$, such that data signal transmitter 102 and DFOS system 112 use fiber optic strand 108 at different respective times, to reduce likelihood of sensing signals $s_1$ interfering with transmission of data signals $d_1$ by network 100.

Additionally, some embodiments of sensing signal transmitter 116 are configured such that sensing signals $s_1$ are coherent optical signals, i.e., so that both phase and amplitude of an optical carrier signal are modulated to generate sensing signals $s_1$, which helps significantly reduce required power of sensing signals $s_1$ to achieve a given detection sensitivity of back-scattering signals and forward-scattering signals associated with the sensing signals. For example, use of coherent optics technology to generate sensing signals $s_1$, instead of modulating solely amplitude of an optical carrier signal when generating the sensing signals, may enable power density of the sensing signals to be reduced by more than a factor of eight. Reducing power density of sensing signals $s_1$ reduces likelihood of the sensing signals interfering with transmission of data signals $d_1$ in network 100. Consequently, configuring sensing signal transmitter 116 to employ coherent optics technology may help achieve coexistence of data signals $d_1$ and sensing signals $s_1$ on fiber optic strand 108.

Furthermore, some embodiments of sensing signal transmitter 116 are configured to intelligently control one or more parameters of sensing signals $s_1$, such as amplitude, phase, optical carrier wavelength, transmission time, and/or duration of sensing signals $s_1$, to help minimize likelihood of sensing signals $s_1$ interfering with transmission of data signals $d_1$ by network 100. For example, certain embodiments of sensing signal transmitter 116 are configured to (a) determine a type of data signals $d_1$ being generated by data signal transmitter 102 and (b) control one or more parameters of sensing signals $s_1$ at least partially based on the determined type of data signals $d_1$, to help minimize interference with the data signals $d_1$. For instance, some embodiments of sensing signal transmitter 116 include, or have access to, a lookup table 200 (FIG. 2) stored within a data store, where lookup table 200 specifies desired parameter sets of sensing signals $s_1$ based on type data signals $d_1$. The desired parameter set for each data signal type is a set of parameters (e.g., amplitude, phase, optical carrier wavelength, transmission time, and/or duration) that helps minimize likelihood of sensing signals $s_1$ interfering with transmission of data signal $d_1$. For example, lookup table 200 specifies Parameter Set 1 as being a desired parameter set for sensing signals $s_1$ to help minimize likelihood of interference with type A data signals $d_1$, and lookup table 200 specifies Parameter Set 2 as being a desired parameter set for sensing signals Si to help minimize likelihood of interference with type B data signals $d_1$. The number of entries in lookup table 200, as well as the specifics of the entries in lookup table 200, may vary without departing from the scope hereof.

In some embodiments, the contents of lookup table 200 are at least partially based on a priori knowledge of compatibility of sensing signals with data signals in network 100 or in a comparable fiber optic network. Additionally, in some embodiments, lookup table 200 is automatically updated by DFOS system 112, or by another system, based on experience with compatibility of sensing signals and data signals, either within network 100 or in another fiber optic network. Furthermore, in certain embodiments, DFOS system 112 and/or another system at least partially populate lookup table 200 using artificial intelligence and/or machine learning. For example, DFOS system 112 may use artificial intelligence and/or machine learning to populate lookup table 200 to add a desired parameter set for a particular type of data signals $d_1$ when there is no a priori knowledge of what parameters of sensing signals $s_1$ are compatible with transmission of this type of data signals.

Figures 2, 3:
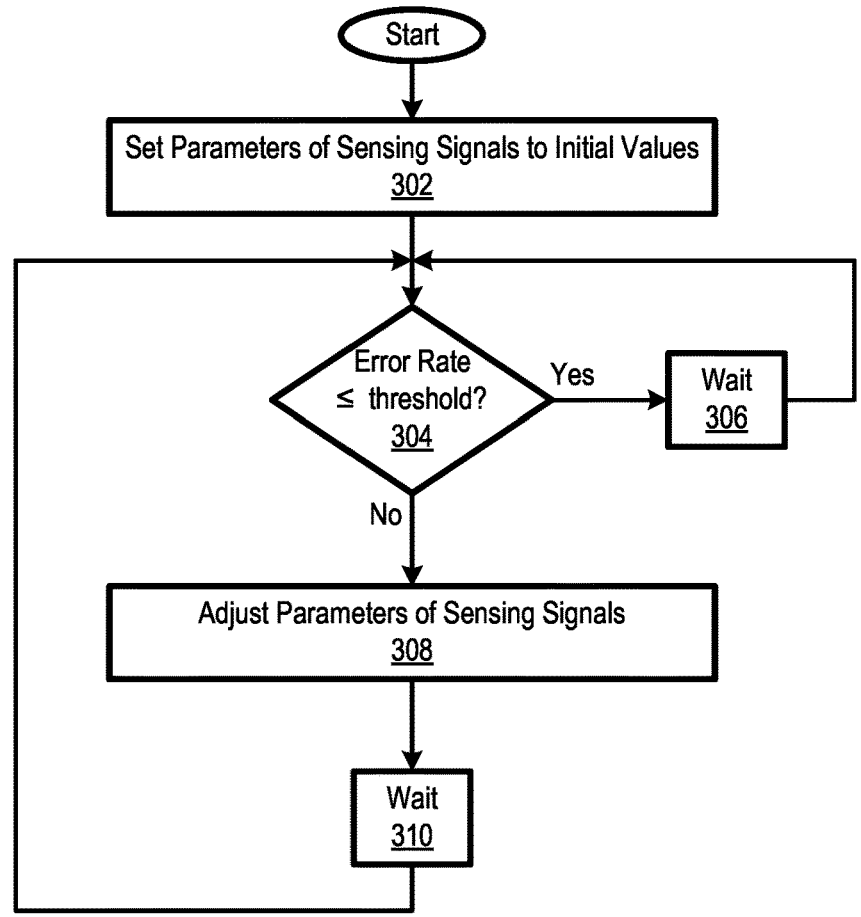
FIG. 2 is an illustration of a lookup table used by some embodiments of the FIG. 1 DFOS system to help reduce likelihood of sensing signals generated by the DFOS system interfering with transmission of data signals by the FIG. 1 fiber optic network, according to an embodiment.
FIG. 3 is a flow chart of a method for reducing likelihood of sensing signals interfering with data signals, according to an embodiment.

Moreover, some embodiments of DFOS system 112 are configured to dynamically vary one or more parameters (e.g., amplitude, phase, optical carrier wavelength, transmission time, and/or duration) of sensing signals $s_1$ to reduce likelihood of the sensing signals interring with transmission of data signals $d_1$ by network 100, such as at least partially based on feedback from data signal receiver 110. For example, FIG. 3 is a flow chart of a method 300 for reducing likelihood of sensing signals interfering with data signals, which is executed by some embodiments of DFOS system 112. In a block 302 of method 300, DFOS system 112 sets parameters (e.g., amplitude, phase, optical carrier wavelength, transmission time, and/or duration) of sensing signals $s_1$ to initial values. In one example of block 302, DFOS system 112 sets sensing signals $s_1$ to initial values specified in a lookup table, such as a lookup table equivalent to, or a lookup table similar to, lookup table 200 of FIG. 2. In a decision block 304, DFOS system 112 determines if an error rate of data signals $d_1$, as received by data signal receiver 110, is less than or equal to a threshold value, where the threshold value represents a maximum permissible error rate of data signals $d_1$. In one example of decision block 304, DFOS system 112 obtains an error rate from data signal receiver 110 and compares the error rate to a threshold value.

If the result of decision block 304 is yes, method proceeds to block 306 and waits a predetermined amount of time, and method 300 subsequently returns to decision block 304 to determine whether the error rate is still less than or equal to the threshold value. On the flip side, if the result of decision block 304 is no, method proceeds to block 308 where DFOS system 112 adjusts one or more parameters of sensing signals $s_1$, to attempt to reduce errors in data signals $d_1$ due to interference from sensing signals $s_1$. In one example of block 308, DFOS system 112 adjusts one or more of amplitude, phase, wavelength, transmission time, and/or duration of sensing signals $s_1$ according to predetermined instructions. In another example of block 308, (a) DFOS system 112 implements a neural network, or other form of artificial intelligence/machine learning, that is configured to optimize sensing signals $s_1$ to minimize interaction of sensing signals $s_1$ and data signals $d_1$, and (b) DFOS system 112 adjusts one or more of amplitude, phase, wavelength, transmission time, and/or duration of sensing signals $s_1$ according to parameter values specified by the neural network or other form of artificial intelligence/machine learning. Method 300 proceeds from block 308 to block 310 and waits a predetermined amount of time, and method 300 subsequently returns to decision block 304 to determine whether the error rate is still less than or equal to the threshold value. Although FIG. 3 illustrates method 300 operating in perpetuity once is has begun, method 300 could be modified to terminate in response to one or more conditions being satisfied.

Referring again to FIG. 1, certain embodiments of sensing signal transmitter 116 are configured to generate sensing signals $s_1$ such that they are optimized for a detection of a specific type of event, or stated differently, such that sensing signals $s_1$ generate back-scattering signals $b_1$ and/or forward scattering signals $f_1$ that are readily distinguishable from other optical signals on fiber optic strand 108, in response to occurrence of the specified event. For example, sensing signal transmitter 116 may be configured to generate sensing signals $s_1$ such that the sensing signals cause generation of back-scattering signals $b_1$ and/or forward scattering signals $f_1$ having a specific signature (e.g., phase, wavelength, amplitude, timing, and/or harmonics) in response to perturbation of fiber optic strand 108 due to occurrence of a specific type of event, where the signature of the back-scattering signals $b_1$ and/or forward scattering signals $f_1$ identifies the event. Sensing signal transmitter 116 is configured to optimize sensing signals $s_1$ for detection of a specific type of event, for example, by optimizing amplitude, phase, wavelength, transmission time, and/or duration of sensing signals $s_1$, for an expected nature and expected characteristics of the event, as well as for the configuration of network 100 (e.g., for the topology of network 100 and/or for the material characteristics of fiber optic strand 108). Such optimization of sensing signals $s_1$ for detection of a specific type of event not only helps ensure detection of an occurrence of the event, but it also promotes high resolution and accuracy in analyzing the event occurrence.

Some embodiments of sensing signal transmitter 116 are configured to generate two or more different types of sensing signals $s_1$ that are optimized for detection of different respective event types, and the two or more different types of sensing signals $s_1$ may be transmitted on fiber optic strand 108 using time division multiplexing and/or frequency division multiplexing techniques. For example, sensing signal transmitter 116 could be configured to generate two different types of sensing signals $s_1$ optimized to detect vibration associated with different respective events. As another example, sensing signal transmitter 116 could be configured to generate three different types of sensing signals $s_1$ optimized to detect vibration along fiber optic strand 108, change in temperature along fiber optic strand 108, and change in electromagnetic environment along fiber optic strand 108, respectively. In some embodiments, each different type of sensing signal $s_1$ has one or more unique parameters that cause the sensing signal to provoke generation of back-scattering signals $b_1$ and/or forward scattering signals $f_1$ having unique signatures (e.g., phase, wavelength, amplitude, timing, and/or harmonics) in response to occurrence of a particular type of event, to enable event types to be distinguished from signatures of their respective back-scattering signals $b_1$ and/or forward scattering signals $f_1$.

Certain embodiments of sensing signal transmitter 116 are configured to optimize sensing signals $s_1$ for detection of a specific type of event based on a priori knowledge of what parameters of sensing signals $s_1$ are conducive to provoking back-scattering signals $b_1$ and/or forward scattering signals $f_1$ identifying the event. Additionally, some embodiments of sensing signal transmitter 116 are configured to use artificial intelligence or machine learning to help optimize sensing signals $s_1$ for detecting certain event types. For example, in some embodiments of sensing signal transmitter 116, (a) the sensing signal transmitter includes, or has access to, a neural network that has been trained to determine optimum parameters of sensing signals for detecting occurrence of one or more different types of events, and (b) the sensing signal transmitter is configured to generate sensing signals $s_1$ having parameters specified by the neural network. Furthermore, some embodiments of sensing signal transmitter 116 are configured to dynamically optimize sensing signals $s_1$ for detection of a specific type of event, such as based on experience in detecting occurrence of events by network 100 or experience in detecting occurrence of events by another fiber optic network. Accordingly, particular embodiments of sensing signal transmitter 116 are configured to train itself to optimize sensing signal $s_1$ parameters based on posterior knowledge of classification of a previously detected event.

Some embodiments of sensing signal transmitter 116 are configured to repeatedly generate sensing signals $s_1$, such as on a periodic basis. Additionally, as mentioned above, some embodiments of sensing signal transmitter 116 are configured to generate two or more different types of sensing signals $s_1$, such as for detecting occurrence of different respective types of events. Two or more different types of sensing signals $s_1$ can be transmitted via fiber optic strand 108 using time division multiplexing and/or wavelength division multiplexing, so that the different types of sensing signals $s_1$ do not interfere with each other.

Figure 4:
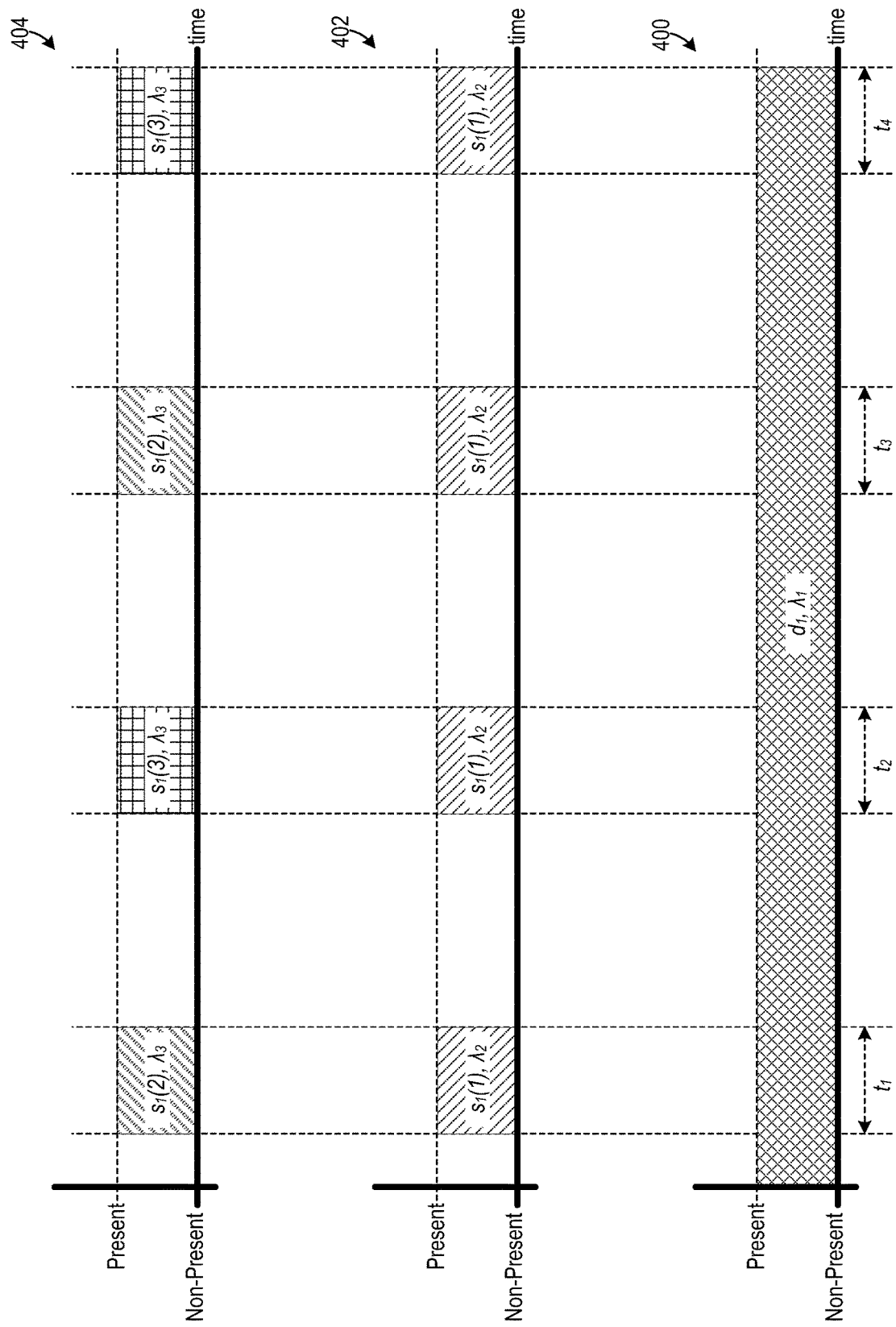
FIG. 4 is a compilation of three graphs illustrating one example of signals on a fiber optic strand of the FIG. 1 fiber optic network, according to an embodiment.

For example, FIG. 4 is a compilation of three graphs 402, 404, and 406 illustrating one example of how network 100 could transmit data signal $d_1$ as well as three different types of sensing signals $s_1$. Each of graphs 400, 402, and 404 has a common time base. Graph 400 illustrates presence of data signals $d_1$ on fiber optic strand 108 versus time, graph 402 illustrates presence of sensing signals $s_1(1)$ on fiber optic strand 108 versus time, and graph 404 illustrates presence of sensing signals $s_1(2)$ and $s_1(3)$ on fiber optic strand 108 versus time, where each of sensing signals $s_1(1)$, $s_1(2)$, and $s_1(3)$ is a different type of sensing signal $s_1$. In this document, specific instances of an item may be referred to by use of a numeral in parentheses (e.g., sensing signals $s_1(1)$) while numerals without parentheses refer to any such item (e.g., sensing signals $s_1$). Graphs 400, 402, and 404 merely indicate when signals are potentially present on fiber optic strand 108, and the graphs therefore should not be construed to require any particular shape, amplitude, or phase of the signals.

In the example of FIG. 4, data signals $d_1$ have an optical carrier wavelength of $\lambda_1$, and data signals $d_1$ are present on fiber optic strand 108 during the entire time span illustrated in graphs 400, 402, and 404. However, in this example, sensing signal transmitter 116 periodically generates sensing signals $s_1(1)$ such that sensing signals $s_1(1)$ are present on fiber optic strand 108 only during time periods $t_1$, $t_2$, $t_3$, and $t_4$. Sensing signals $s_1(1)$ have an optical carrier wavelength $\lambda_2$ that is different than optical carrier wavelength $\lambda_1$ of data signals $d_1$, to reduce the likelihood of sensing signals $s_1(1)$ interfering with transmission of data signals $d_1$ in network 100. Additionally, sensing signal transmitter 116 is configured in the FIG. 4 example to periodically generate sensing signals $s_1(2)$ and $s_1(3)$ using time division multiplexing. Specifically, sensing signals $s_1(2)$ are present on fiber optic strand 108 during time periods $t_1$ and $t_3$, and sensing signals $s_1(3)$ are present on fiber optic strand 108 during time periods $t_2$ and $t_4$. Sensing signals $s_1(2)$ and $s_1(3)$ have a common optical carrier wavelength $\lambda_3$, which is different from optical carrier wavelengths $\lambda_1$ and $\lambda_2$. As such, sensing signals $s_1(2)$ and $s_1(3)$ do not interfere with data signals $d_1$ or sensing signals $s_1$ due to differences in optical carrier wavelength among the signals. Additionally, the time division multiplexing of sensing signals $s_1(2)$ and $s_1(3)$ prevents them from interfering with each other, even though the two sensing signals have a common optical carrier wavelength. In some alternate embodiments of the FIG. 4 example, sensing signals $s_1(1)$ are offset in transmission time from sensing signals $s_1(2)$ and $s_1(3)$, such as to facilitate distinguishing occurrence of respective events associated with the sensing signals.

Referring again to FIG. 1, scattering signal analyzer 118 is configured to determine occurrence of event 122 at least partially based on back-scattering signals $b_1$ received from fiber optic strand 108, such as based on one or more of (a) a signature (e.g., phase, wavelength, amplitude, timing, and/or harmonics) of back-scattering signals $b_1$, (b) a relationship between back-scattering signals $b_1$ and sensing signals $s_1$, and (c) a relative or absolute time that back-scattering signals $b_1$ are received by scattering signal analyzer 118. Additionally, some embodiments of scattering signal analyzer 118 are configured to determine one or more of a type of event 122 and location 124 of event 122, such as based on one or more of (a) a signature (e.g., phase, wavelength, amplitude, timing, and/or harmonics) of back-scattering signals $b_1$, (b) a relationship between backscattering signals $b_1$ and sensing signals $s_1$, and (c) a relative or absolute time that backscattering signals $b_1$ are received by scattering signal analyzer 118. Some embodiments of signal analyzer 118 includes one or more receivers configured to capture scattering signals using direct detection techniques.

Furthermore, some alternate embodiments of scattering signal analyzer 118 are configured to determine occurrence of event 122, type of event 122, and/or location 124 of event 122, at least partially using forward-scattering signals $f_1$, in addition to, or in place of, back-scattering signals $b_1$, such as based on one or more of (a) a signature (e.g., phase, wavelength, amplitude, timing, and/or harmonics) of forward-scattering signals $f_1$, (b) a relationship between forward-scattering signals $f_1$ and sensing signals $s_1$, and (c) a relative or absolute time that forward-scattering signals $f_1$ are received by scattering signal analyzer 118 or another element of network 100. Embodiments of network 100 where scattering signal analyzer 118 is configured to determine event 122 information at least partially based on forward-scattering signals $f_1$ are further capable of capturing forward-scattering signals $f_1$ at Location 2 and transmitting the forward-scattering signals $f_1$ to scattering signal analyzer 118.

Figure 5:
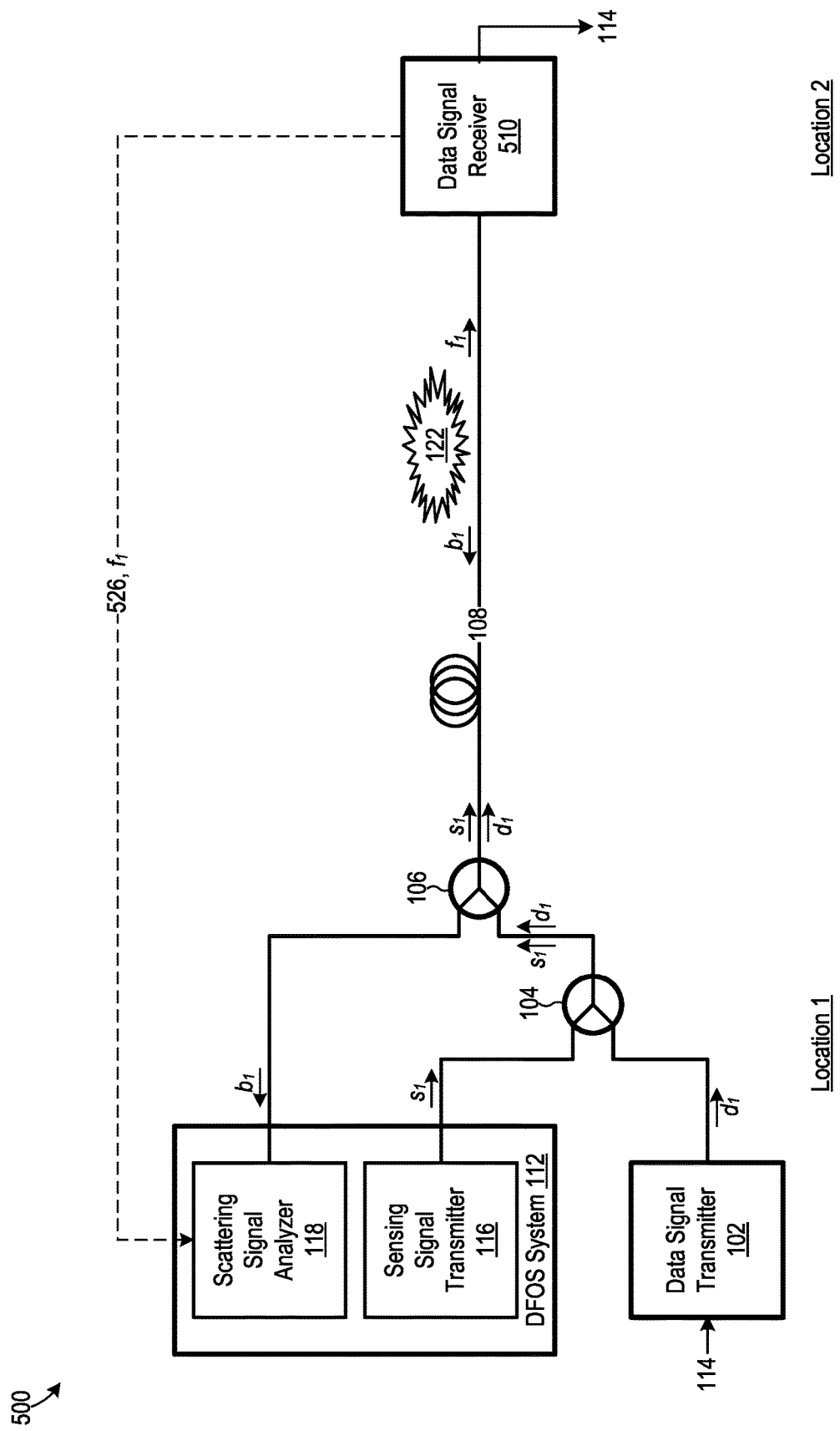
FIG. 5 is a block diagram of an alternate embodiment of the FIG. 1 fiber optic network where a data signal receiver is configured to capture forward-scattering signals as well as data signals.

For example, FIG. 5 is a block diagram of a network 500, which is an alternate embodiment of network 100 of FIG. 1 where data signal receiver 110 is replaced with a data signal receiver 510. Data signal receiver 510 is like data signal receiver 110, but data signal receiver 510 is configured to capture forward-scattering signals $f_1$ in addition to data signals $d_1$. For example, some embodiments of data signal receiver 510 include a coherent optics receiver capable of being dynamically tuned to capture either data signals $d_1$ or forward-scattering signals $f_1$, such that data signal receiver 510 can capture data signals $d_1$ and forward-scattering signals $f_1$ in a time division multiplexing manner. Network 500 is configured to transmit forward-scattering signals $f_1$ to scattering signal analyzer 118 via a communication link 526. Communication link 526 could be a physical communication link (e.g., a wireline communication link or a wireless communication link), or communication link 526 could be a logical communication link. In some embodiments, communication link 526 is a logical communication link at least partially embodied by fiber optic strand 108.

Figure 6:
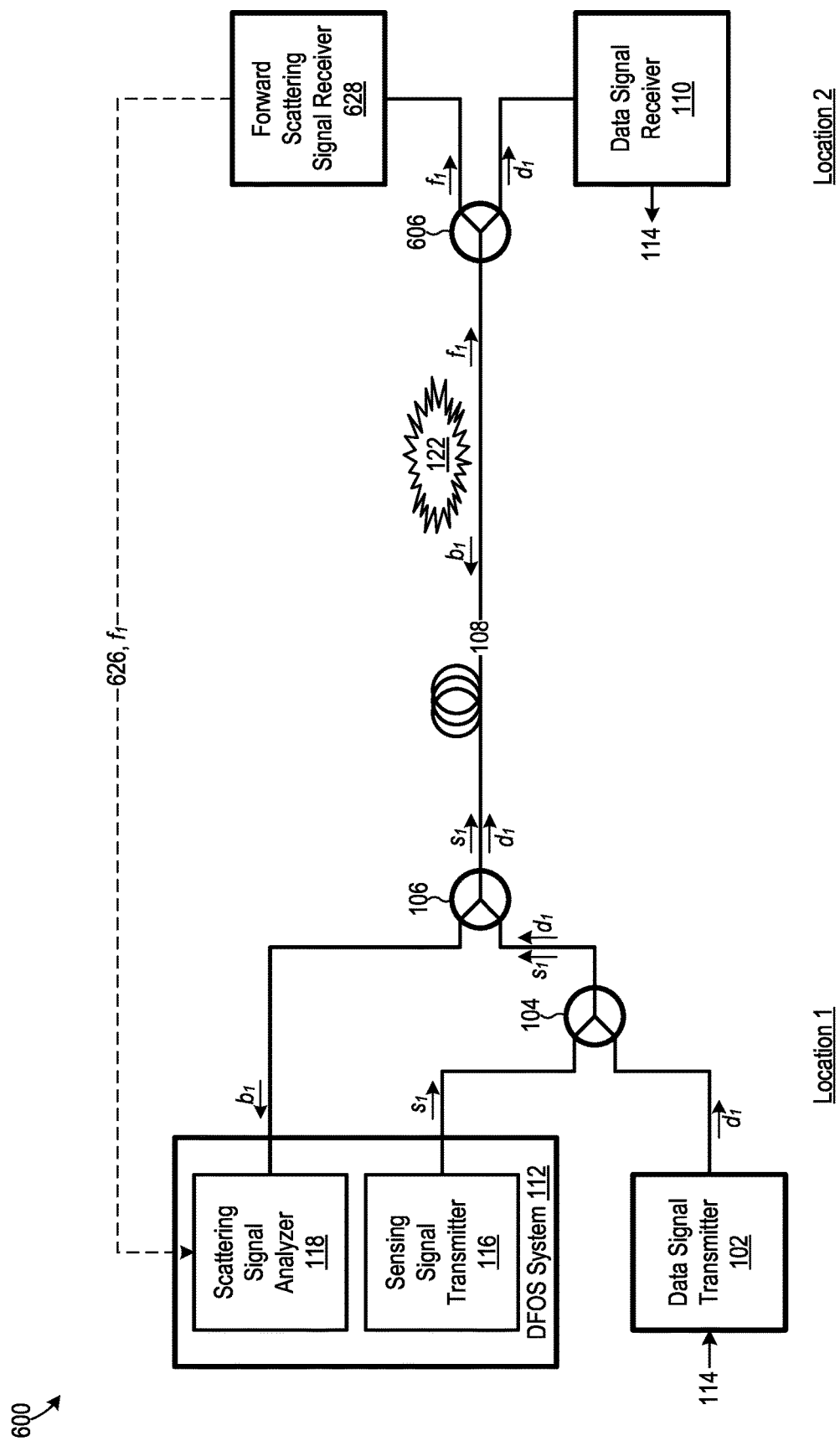
FIG. 6 is a block diagram of an alternate embodiment of the FIG. 1 fiber optic network further including a receiver configured to capture forward-scattering signals.

As another example of a fiber optic network configured to capture forward-scattering signals, FIG. 6 is a block diagram of a network 600, which is an alternate embodiment of network 100 of FIG. 1 further including an optical coupler 606 and forward-scattering signal receiver 628. Optical coupler 606 is configured to perform demultiplexing by (a) directing data signals $d_1$ from fiber optic strand 108 to data signal receiver 110 and (b) directing forward-scattering signals $f_1$ from fiber optic strand 108 to forward-scattering signal receiver 628. Forward-scattering signal receiver 628 is configured to capture forward-scattering signals $f_1$, and network 600 is configured to transmit forward-scattering signals $f_1$ to scattering signal analyzer 118 via a communication link 626. Communication link 626 could be a physical communication link (e.g., a wireline communication link or a wireless communication link), or communication link 626 could be a logical communication link. In some embodiments, communication link 626 is a logical communication link at least partially embodied by fiber optic strand 108.

Referring again to FIG. 1, some embodiments of scattering signal analyzer 118 are configured to determine occurrence of event 122, type of event 122, and/or location 124 of event 122, from back-scattering signals $b_1$ and/or forward-scattering signals $f_1$ at least partially using DFOS techniques known in the art, which are not disclosed in this document to avoid obscuring features of the new systems and methods disclosed herein. However, certain embodiments of scattering signal analyzer 118 are configured to determine occurrence of event 122, type of event 122, and/or location of event 122 at least partially using new DFOS techniques developed by Applicant.

For example, some embodiments of scattering signal analyzer 118 are configured to use artificial intelligence or machine learning to determine occurrence of event 122, type of event 122, and/or location 124 of event 122, based on back-scattering signals $b_1$ and/or forward-scattering signals $f_1$. For instance, certain embodiments of scattering signal analyzer 118 include a neural network that has been trained to identify and classify events based on back-scattering signals $b_1$ and/or forward-scattering signals $f_1$, and scattering signal analyzer 118 is configured to determine information on event 122 at least partially using this neural network. Additionally, in particular embodiments of scattering signal analyzer 118 using artificial intelligence/machine learning, the artificial intelligence/machine learning is configured to train itself to determine event information using posterior knowledge of previously identified events in network 100 (or in another fiber optic network). Such self-training ability may advantageously significantly increase performance of the scattering signal analyzer over time.

Types of events that scattering signal analyzer 118 is configured to identify are implementation independent and depend, for example, on needs of the application of network 100. By way of example and not limitation, the following is a list of some possible events that scattering signal analyzer 118 could be configured to identify, such as in response to vibration, strain change, temperature change, and electromagnetic environment change in the vicinity of fiber optic strand 108: (1) motion (e.g., caused by people, vehicles, construction activity, seismic activity, settling, cracking, structural failure, etc.), (2) vibration (e.g., caused by people, vehicles, construction activity, seismic activity, settling, cracking, structural failure, machine operation, an explosion, etc.), (3) temperature change (e.g., caused by fire, operation or failure of a climate control system, change in operation of heat-producing machine, change in weather, etc.), (4) sound, and (5) electrical arcing (e.g., due to lightning, a damaged power line, dielectric insulation failure, etc.).

Moreover, some embodiments of scattering signal analyzer 118 can determine a source of an event at least partially based on back-scattering signals $b_1$ and/or forward-scattering signals $f_1$. For example, particular embodiments of scattering signal analyzer 118 are configured to not only identify occurrence of motion or vibration in the vicinity of fiber optic strand 108, but these embodiments are further capable of at least partially identifying a source of the motion or vibration, such as the motion/vibration being due to people, vehicles, rough landing of a plane or other aircraft, construction activity, seismic activity, settling, cracking, structural failure, an explosion, etc. As another example, some embodiments of scattering signal analyzer 118 are configured to not only identify occurrence of motion or vibration in the vicinity of fiber optic strand 108 as being caused by a vehicle, but they can also determine a class of vehicle, or even particular model of vehicle, causing the motion or vibration. As yet another example, some embodiments of scattering signal analyzer 118 are configured to not only identify occurrence of an unusual sound in the vicinity of fiber optic strand 108, but they are also capable of at least partially determining a source of the sound, such as the sound being due to excessive wear of a device, imminent failure of a device, operation of a vehicle, etc.

Figure 7:
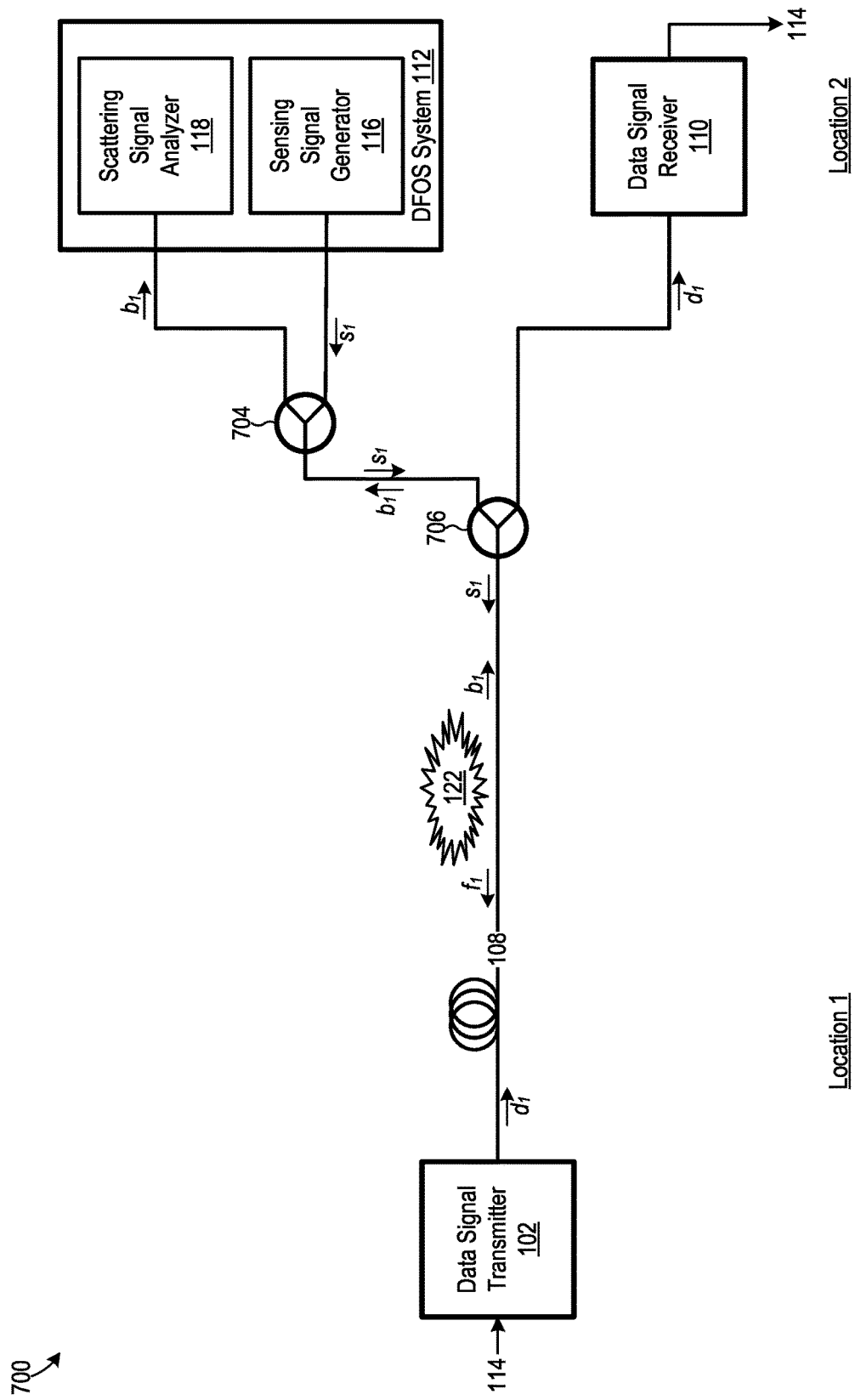
FIG. 7 is a block diagram of an alternate embodiment of the FIG. 1 fiber optic network where the DFOS system is disposed at a location of a data signal receiver.

While FIG. 1 depicts DFOS system 112 as being disposed at the same location as data signal transmitter 102, i.e., at Location 1, DFOS system 112 could alternately being disposed at the same location as data signal receiver 110, i.e., at Location 2. Moreover, a respective instance of DFOS system 112 could be disposed at each of Locations 1 and 2. FIG. 7 is a block diagram of a network 700, which is an alternate embodiment of network 100 where (a) DFOS system 112 is disposed at Location 2 and (b) optical couplers 104 and 106 are replaced with optical couplers 704 and 706. Network 700 operates in the same manner as network 100 of FIG. 1 except that (a) signals $s_1$, $b_1$, and $f_1$ flow in the opposite direction in network 700, and (b) optical couplers 704 and 706 direct signals differently than optical couplers 104 and 106. Optical couplers 704 and 706 collectively demultiplex data signals $d_1$ and back-scattering signals $b_1$ from fiber optic strand 108 for delivery to data signal receiver 110 and scattering signal analyzer 118, respectively. Additionally, optical couplers 704 and 706 collectively multiplex sensing signals $s_1$ onto fiber optic strand 108 with data signals $d_1$ and back-scattering signals $b_1$.

It should be appreciated that while sensing signals $s_1$ flow the same direction as data signals $d_1$ in fiber optic strand 108 in network 100 (FIG. 1), sensing signals $s_1$ flow in the opposite direction as data signals $d_1$ in fiber optic strand 108 in network 100 (FIG. 7). Applicant has found that configuring a fiber optic network such that sensing signals flow in the opposite direction as data signals, such as illustrated in FIG. 7, may promote coexistence of data signals and sensing signals on a common fiber optic strand 108.

Figure 8:
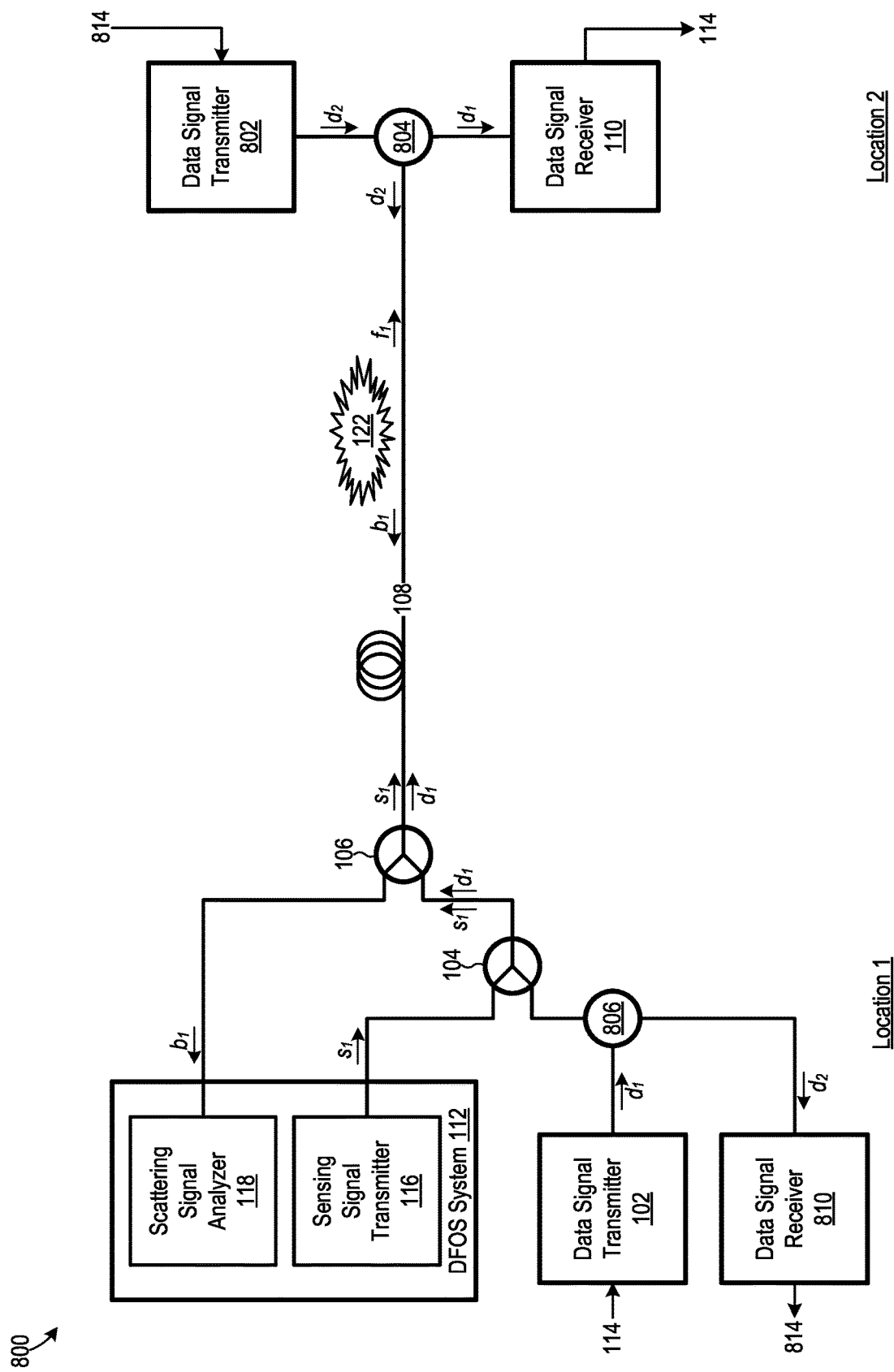
FIG. 8 is a block diagram of an alternate embodiment of the FIG. 1 fiber optic network that is configured for full duplex communication.

Any of the fiber optic networks discussed above could be modified to support transmission data signals in two directions on fiber optic strand 108, e.g., to support full duplex communication. For example, FIG. 8 is a block diagram of a network 800, which is an alternate embodiment of network 100 of FIG. 1 further including (a) a data signal transmitter 802 and an optical circulator 804 at Location 2 and (b) a data signal receiver 810 and an optical circulator 806 at Location 1, such that network 800 can realize full duplex communication. Data signal transmitter 802 is analogous to data signal transmitter 102, and data signal transmitter 802 is configured to generate data signals $d_2$, which are encoded with data 814, for transmission to data signal receiver 810. Optical circulator 804 is configured to (a) direct data signals $d_2$ onto optical strand 108 for transmission to Location 1 and (b) direct data signals $d_1$ on optical strand 108 to data signal receiver 110. Data signals $d_1$ and $d_2$ flow in opposite directions through fiber optic strand 108.

Optical circulator 806 is configured to (a) direct data signals $d_1$ to optical coupler 104 and (b) direct data signals $d_2$ from optical coupler 104 to data signal receiver 810. Data signal receiver 810 is analogous to data signal receiver 110, and data signal receiver 810 is configured to demodulate data signals $d_2$ and thereby recover data 814 from data signals $d_2$. Network 800 operates in the same manner as network 100, except that both data signals $d_1$ and $d_2$ are transmitted by fiber optic strand 108 in network 800.

Any of the fiber optic networks discussed above could be modified to include multiple fiber optic strand branches. Presence of multiple branches may facilitate sensing of an event by enabling generation of multiple back-scattering and/or forward-scattering signals in response to perturbation of two or more fiber optic strand branches by the event. The multiple back-scattering and/or forward scattering signals may be correlated to increase sensitivity of scattering signal analyzer 118 in sensing the event, as well as to increase ability of scattering signal analyzer 118 to accurately determine location of the event, especially in situations where the event occurs some distance from a fiber optic strand. Additionally, generation of multiple back-scattering and/or forward scattering signals effectively amplifies response of the fiber optic network to the event, thereby potentially enabling power density of sensing signals $s_1$ to be reduced while still enabling scattering signal analyzer 118 to sense the event. Reduction in power density of sensing signals $s_1$, in turn, reduces likelihood of the sensing signals interfering with transmission of data signals. Accordingly, presence of multiple fiber optic strand branches in a fiber optic network can be exploited to improve DFOS performance as well as to further promote coexistence of sensing signals and data signals on a common fiber optic strand.

Figure 9:
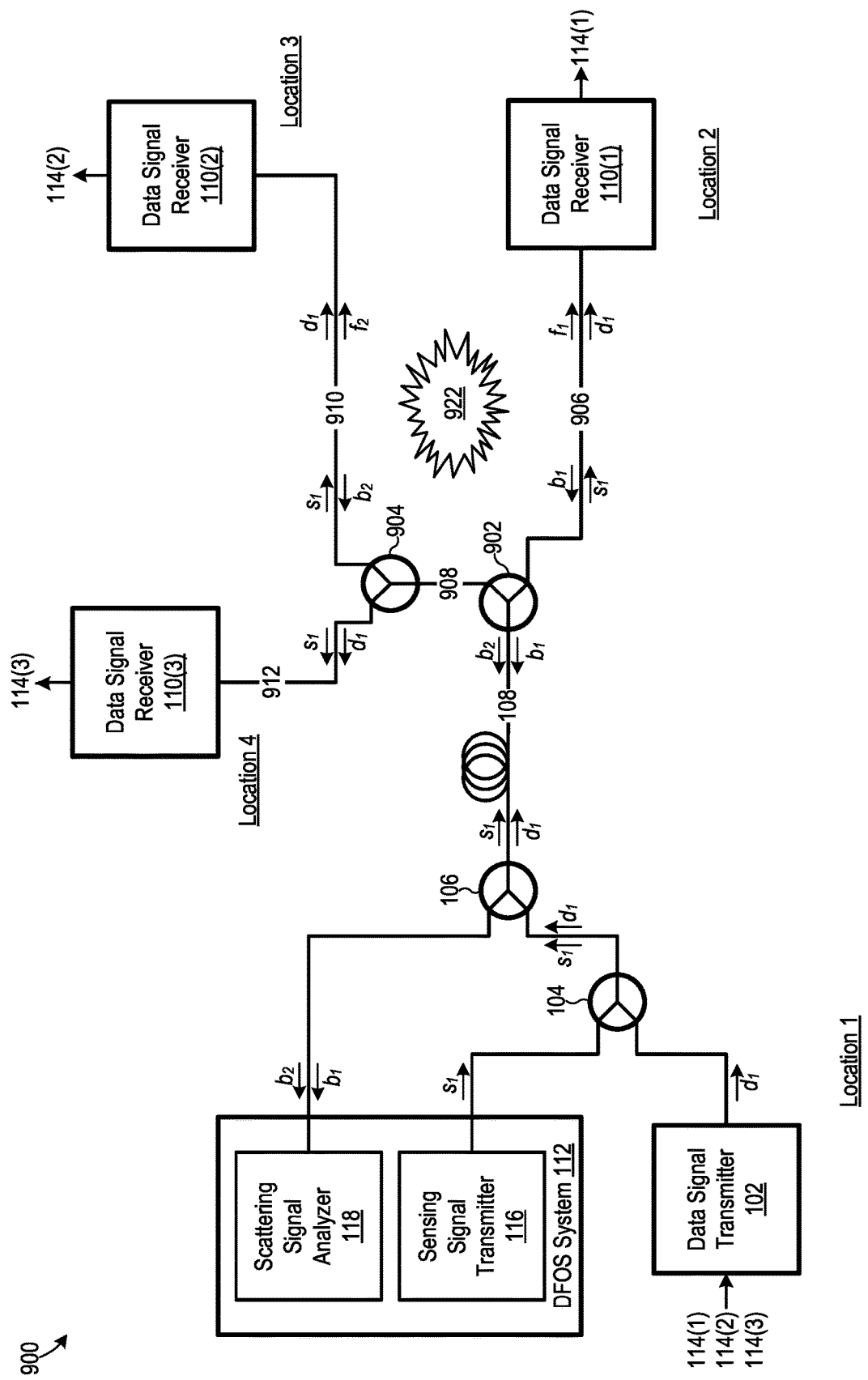
FIG. 9 is a block diagram of an alternate embodiment of the FIG. 1 fiber optic network including a plurality of fiber optic strand branches.

FIG. 9 illustrates one example of how multiple fiber optic strand branches can be used by the new DFOS systems and methods disclosed herein. Specifically, FIG. 9 is a block diagram of a network 900, which is an alternate embodiment of network 100 (FIG. 1) which further includes (a) optical couplers 902 and 904, (b) fiber optic strand branches 906, 908, 910, and 912, and (c) two additional instances of data signal receiver 110. Accordingly, network 900 includes a total of three instances of data signal receiver 110, which are respectively denoted as data signal receivers 110(1), 110(2), and 110(3) and are respectively disposed at Locations 2, 3, and 4. Optical coupler 902 splits fiber optic strand 108 into two fiber optic strand branches 906 and 908, and branch 906 communicatively couples data signal receiver 110(1) to optical coupler 902. Optical splitter 904 splits fiber optic strand branch 908 into fiber optic strand branches 910 and 912. Fiber optic strand branch 910 communicatively couples data signal receiver 110(2) to optical coupler 904, and fiber optic strand branch 912 communicatively couples data signal receiver 110(3) to optical coupler 904.

Data signal transmitter 102 is configured in network 900 to encode data signals $d_1$ with each of data 114(1), 114(2), and 114(3), which is intended for receipt by data signal receivers 110(1), 110(2), and 110(3), respectively. In some embodiments, data signals $d_1$ include respective components corresponding to data 114(1), 114(2), and 114(3), where each component has a different optical carrier wavelength, or each component is generated by data signal transmitter 102 at a different time. Each data signal receiver 110 is configured to demodulate data signals $d_1$, or a respective component of data signals $d_1$, to recover data intended for receipt by the data signal receiver. For example, data signal receiver 110(1) is configured to demodulate data signals $d_1$, or a respective component of data signals $d_1$, to recover data 114(1), and data signal receiver 110(2) is configured to demodulate data signals $d_1$, or a respective component of data signals $d_1$, to recover data 114(2).

Sensing signals $s_1$ are transmitted through each fiber optic strand 108, 906, 908, 910, and 912 in network 900, and each of these fiber optic strands therefore functions as a distributed sensor in conjunction with DFOS system 112. FIG. 9 illustrates one example of operation of network 900 where (a) an event 922 occurs between fiber optic strand branches 906 and 910, and (b) event 922 perturbs each of fiber optic strand branches 906 and 910. The perturbation of fiber optic strand branch 906 by event 922 causes sensing signals $s_1$ on strand 906 to generate back-scattering signals $b_1$ and forward-scattering signals $f_1$ on strand 906. Additionally, the perturbation of fiber optic strand branch 910 by event 922 causes sensing signals Si on strand 908 to generate back-scattering signals $b_2$ and forward-scattering signals $f_2$ on strand 908.

Back-scattering signals $b_1$ and $b_2$ are received by scattering signal analyzer 118, and scattering signal analyzer 118 determines one of more of the following information from the two back-scattering signals, such as by correlating and analyzing the two signals: (a) occurrence of event 922, (b) type of event 922, and (c) location of event 922. It should be appreciated that the receipt of multiple back-scattering signals by scattering signal analyzer 118 effectively amplifies the response of network 900 to event 922, thereby facilitating analysis of the event by scattering signal analyzer 118. As such, the multiple fiber optic strand branches of network 900 may increase sensitivity of scattering signal analyzer 118 when analyzing event 922. Such increased sensitivity of scattering signal analyzer 118 may enable sensing signal transmitter 116 to generate sensing signals $s_1$ at a lower power density than would otherwise be required, which promotes coexistence of sensing signals $s_1$ and data signals $d_1$ and may also help reduce energy consumption of network 900.

Furthermore, the presence of multiple back-scattering signals resulting from event 922 facilitates determination of location of event 922 by providing scattering signal analyzer 118 a plurality of data points to determine the event's location. Additionally, the ability of scattering signal analyzer 118 to accurately determine location of event 922 may increase with increasing number of back-scattering signals generated in response to event 922, by providing additional data point for use by analyzer 118 when calculating the location of event 922.

Moreover, it should be noted that sensing signals $s_1$ are inherently at least substantially synchronized in each of fiber strands 108, 906, 908, 910, and 912, due to the sensing signals in each strand being generated by a common source, i.e., by sensing signal transmitter 116. Such substantial synchronization of sensing signals $s_1$ across fiber optic strands of network 900 may advantageously simplify analysis of the back-scattering signals by scattering signal analyzer 118. However, in some alternate embodiments of network 900, such as where sensing signals on at least two of fiber optic strand branches 906, 908, 910, and 912 are generated by different sensing signal transmitters, sensing signals are not necessarily synchronized on all fiber optic strand branches.

Network 900 could be modified so that scattering signal analyzer 118 analyzes an event using forward-scattering signals in addition to, or in place of, back-scattering signals. For example, in an alternate embodiment of network 900, scattering signal analyzer 118 is configured to analyze event 922 based on forward-scattering signals $f_1$ and $f_2$, as well as based on back-scattering signals $b_1$ and $b_2$. In this alternate embodiment, data signal receivers 110 are configured to capture forward-scattering signals as well as data signals $d_1$, or network 900 alternately includes additional receivers configured to capture forward scattering signals at each of Locations 1, 2, and 3.

Network 900 could also be modified to have a different topology, such as to include additional fiber optic strand branches. Additionally, some alternate embodiments of network 900 are configured such that two or more branches carry different data signals (e.g., generated by different respective data signal transmitters), and/or such that two or more branches carry different sensing signals (e.g., generated by different sensing signal transmitters). In alternate embodiments of network 900 where two or more branches carry different sensing signals, the different sensing signals are optionally synchronized, such as by being generated at a common time, by having common parameters, or by having a known relationship between parameters (e.g., a known relationship between timing, a known relationship between optical carrier wavelength, and/or a known relationship between phase), to simplify analysis of an event by scattering signal analyzer 118.

Figure 10:
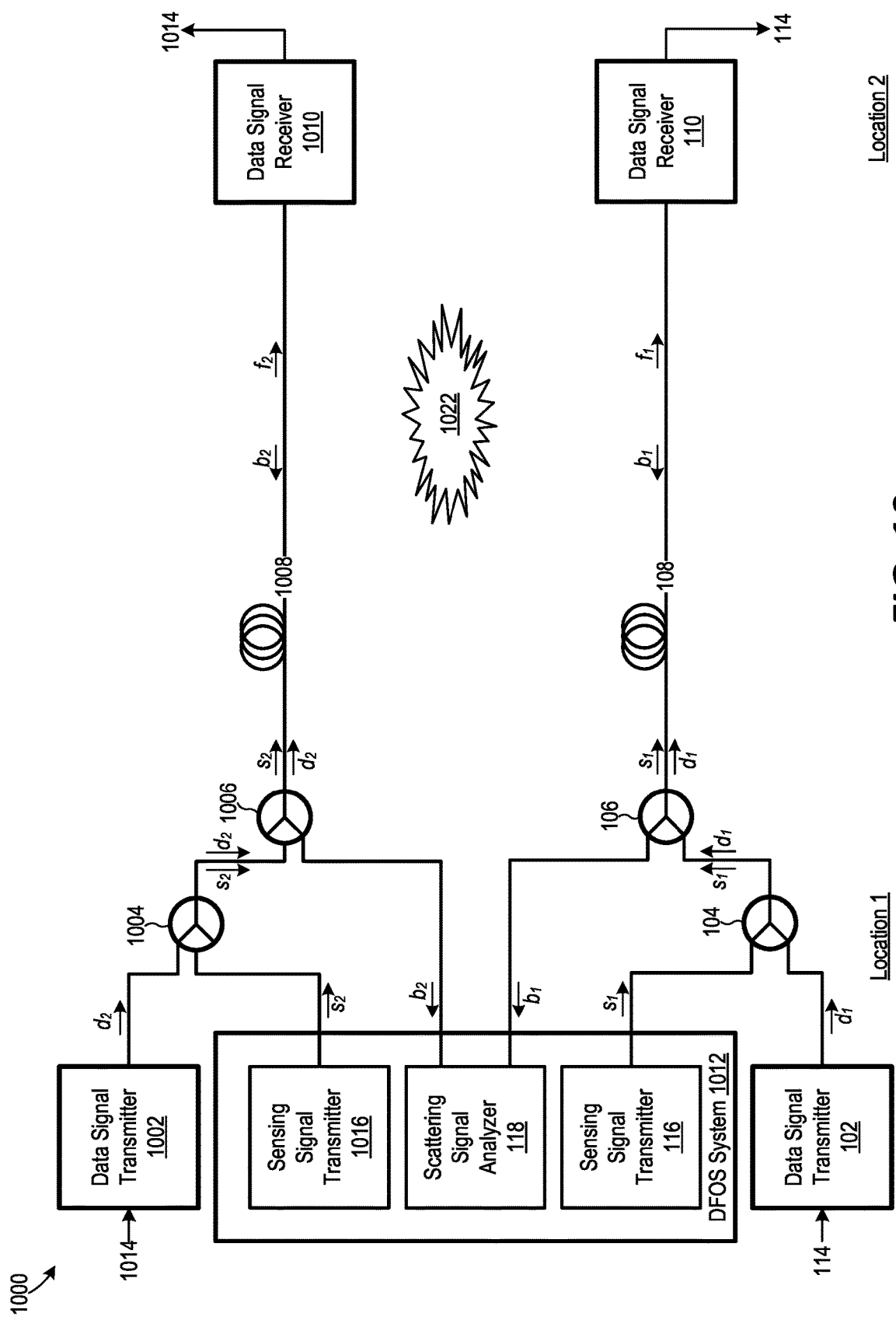
FIG. 10 is a block diagram of an alternate embodiment of the FIG. 1 fiber optic network including fiber optic strands that are not optically coupled.

Any of the fiber optic networks discussed above could be modified to include a plurality of fiber optic strands that are not optically coupled. For example, FIG. 10 is a block diagram of a fiber optic network 1000, henceforth referred to as network 1000, which is an alternate embodiment of network 100 of FIG. 1 further including (a) a data signal transmitter 1002, (b) optical couplers 1004 and 1006, (c) a fiber optic strand 1008, and (d) a data signal receiver 1010. Additionally, DFOS system 112 of FIG. 1 is replaced with DFOS system 1012 in FIG. 10. Fiber optic strands 108 and 1008 are not optically coupled, although in some embodiments, the two strands are part of a common element, such as part of a common fiber optic cable. Fiber optic strands 108 and 1008 each communicatively couple Locations 1 and 2.

Data signal transmitter 102, optical couplers 104 and 106, fiber optic strand 108, and data signal receiver 110 operate in the same manner as discussed above with respect to FIG. 1. Data signal transmitter 1002, which is disposed at Location 1, is analogous to data signal transmitter 102. Data signal transmitter 1002 is configured to generate data signals $d_2$ for receipt by data signal receiver 1010, and each data signal $d_2$ is encoded with data 1014. DFOS system 1012 in network 1000 includes an instance of sensing signal transmitter 116, an instance of scattering signal analyzer 118, and a sensing signal transmitter 1016. Sensing signal transmitter 1016 is like sensing signal transmitter 116 of FIG. 1, and sensing signal transmitter 116 is configured to generate sensing signals $s_2$ using techniques like those discussed above with respect to sensing signal transmitter 116.

In some embodiments, sensing signal transmitters 116 and 1016 are each configured so that sensing signals $s_1$ and $s_2$ are synchronized, such as by being generated at a common time, by having common parameters, or by having a known relationship between parameters (e.g., a known relationship between timing, a known relationship between optical carrier wavelength, and/or a known relationship between phase). For example, in certain embodiments, each of sensing signal transmitters 116 and 1016 includes a respective injection-locked laser that is synchronized by a common seed light source, such that each of sensing signals $s_1$ and $s_2$ has a common optical carrier signal wavelength. As another example, in some embodiments, sensing signal transmitters and 116 and 1016 share a common optical frequency comb light source, and each of sensing signals $s_1$ and $s_2$ uses a respective optical tone of the optical frequency comb light source as an optical carrier signal, such that the two sensing signals have a known relationship between optical carrier signal wavelengths.

Optical couplers 1004 and 1006 are collectively configured to multiplex data signals $d_2$ and sensing signals $s_2$ onto fiber optic strand 1008, as well as to demultiplex back scattering signal $b_2$ from fiber optic strand 1008 for delivery to scattering signal analyzer 118. In some embodiments, one or more of optical couplers 1004 and 1006 includes an optical circulator. The configuration of optical couplers 1004 and 1006 may vary as long as they are capable of performing aforesaid multiplexing and demultiplexing. Additionally, two or more optical couplers of network 1000 could be replaced with a single device configured to perform the functions of the optical couplers. For example, in some alternate embodiments, optical couplers 104, 106, 1004, and 1006 are collectively replaced with a WSS or an EWSS.

Fiber optic strand 1008 is communicatively coupled between optical coupler 1006 and data signal receiver 1010, and fiber optic strand 1008 is configured to transmit data signals $d_2$ from Location 1 to Location 2. Data signal receiver 1010 is analogous to data signal receiver 110 and is configured to recover data 1014 from data signals $d_2$.

Scattering signal analyzer 118 in DFOS system 1012 is configured to identify occurrence of an event in the vicinity of fiber optic strand 108 from back-scattering signals $b_1$, in the manner discussed above with respect to FIG. 1. Additionally, scattering signal analyzer 118 in DFOS system 1012 is configured to identify occurrence of an event in the vicinity of fiber optic strand 1008 from back-scattering signals $b_2$, in a manner analogous to that discussed above with respect to FIG. 1 for fiber optic strand 108. Furthermore, scattering signal analyzer 118 in DFOS system 1012 is configured to identify occurrence of an event that perturbs both of fiber optic strands 108 and 1008.

For example, FIG. 10 illustrates occurrence of an event 1022 between fiber optic strands 108 and 1008. The perturbation of fiber optic strand 108 by event 1022 causes sensing signals $s_1$ on strand 108 to generate back-scattering signals $b_1$ and forward-scattering signals $f_1$ on strand 108. Additionally, the perturbation of fiber optic strand 1008 by event 1022 causes sensing signals $s_2$ on strand 1008 to generate back-scattering signals $b_2$ and forward-scattering signals $f_2$ on strand 1008. Each of back-scattering signals $b_1$ and $b_2$ are received by scattering signal analyzer 118 in DFOS system 1012, and scattering signal analyzer 118 determines one of more of the following information from the two back-scattering signals, such as by correlating and analyzing the two signals: (a) occurrence of event 1022, (b) type of event 1022, and (c) location of event 1022. For reasons analogous to those discussed above with respect to FIG. 9, the fact that scattering signal analyzer 118 in network 1000 detects event 1022 based on a plurality of back-scattering signals, instead of based on a single back-scattering signal, helps scattering signal analyzer 118 achieve high sensitivity and accuracy when analyzing event 1022.

Although FIG. 10 depicts all elements of DFOS system 1012 being grouped together, some or all of the elements of DFOS could alternately be distributed. For example, in an alternate embodiment, sensing signal transmitter 116 is integrated with data signal transmitter 102, and sensing signal transmitter 1016 is integrated in data signal transmitter 1002. As another example, in an alternate embodiment, scattering signal analyzer 118 is split into two sub-analyzers that are integrated with data signal transmitters 102 and 1002, respectively. Furthermore, in some embodiments, two or more elements of DFOS system 1012 share one or more common elements, such as a common optical carrier light source. Not all elements of network 1000 need be operated by a common party.

Network 1000 could be modified so that scattering signal analyzer 118 senses an event using forward-scattering signals in addition to, or in place of, back-scattering signals. For example, in an alternate embodiment of network 1000, scattering signal analyzer 118 is configured to sense event 1022 based on forward-scattering signals $f_1$ and $f_2$, as well as based on back-scattering signals $b_1$ and $b_2$. In this alternate embodiment, data signal receivers 110 and 1010 are configured to capture forward-scattering signals as well as respective data signals $d_1$ and $d_2$, or in the alternative, network 1000 includes additional receivers at Location 2 configured to capture forward scattering signals $f_1$ and $f_2$. Moreover, network 1000 could be modified to have a different topology, such as to include one or more additional fiber optic strands that are not optically coupled to fiber optic strands 108 and 1008, and/or such that one or more strands of network 1000 form two or more branches.

Figure 11:
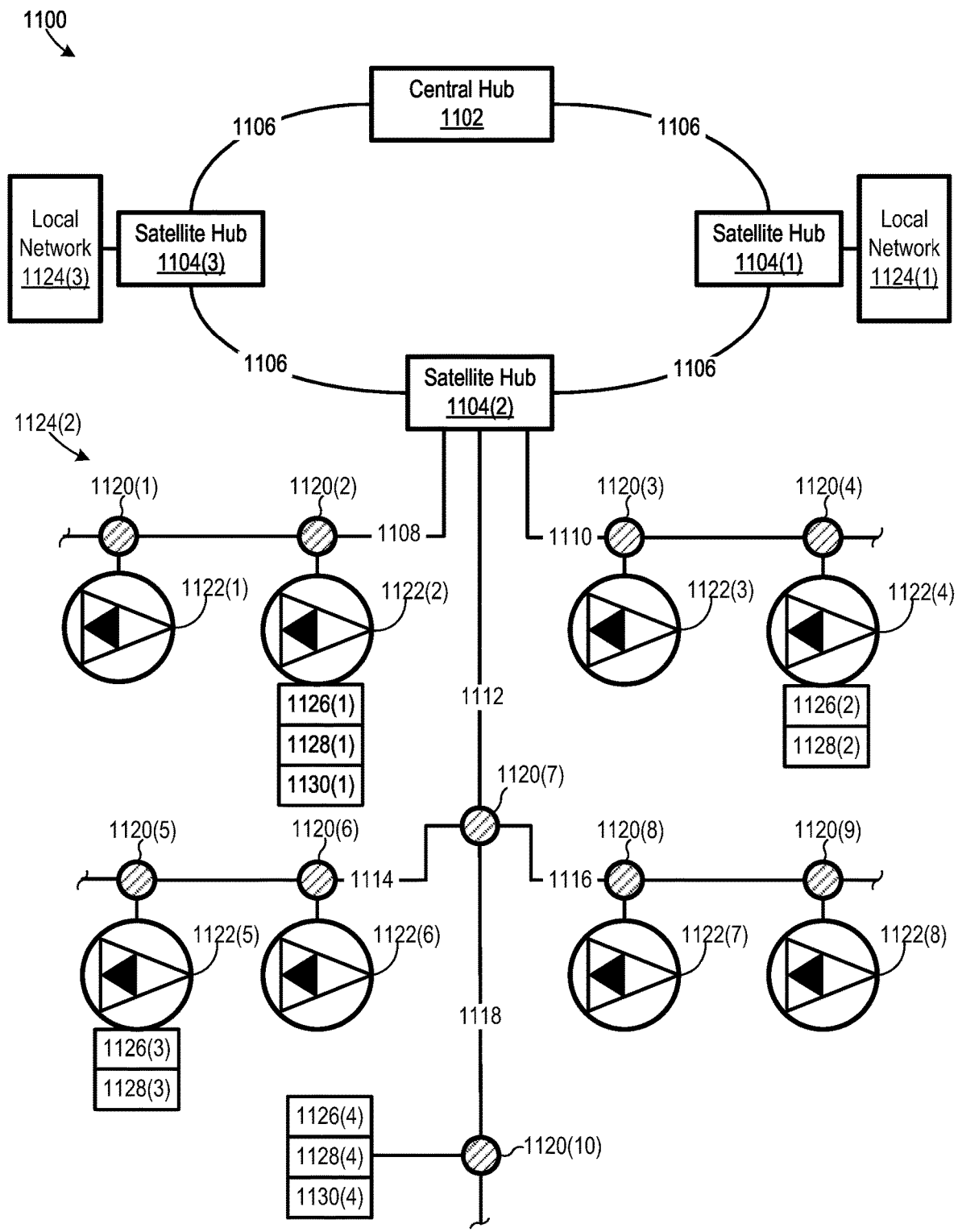
FIG. 11 is a block diagram of another fiber optic network including a DFOS system, according to an embodiment.

FIG. 11 is a block diagram of a fiber optic network 1100, henceforth referred to as network 1100, which includes another embodiment of the new systems for DFOS. Network 1100 includes a central hub 1102, a plurality of satellite hubs 1104, a fiber optic cable ring 1106, fiber optic branch cables 1108, 1110, 1112, 1114, 1116, and 1118, a plurality of fiber splices boxes 1120, a plurality of nodes 1122, and a plurality of local networks 1124. The number of satellite hubs 1104, fiber splice boxes 1120, nodes 1122, and fiber optic branch cables may vary without departing from the scope hereof. Although fiber optic network 1100 is discussed below primarily in the context of a communication network application, fiber optic network 1100 is not limited to communication applications.

Fiber optic cable ring 1106 communicatively couples satellite hubs 1104 to central hub 1102. While not required, it is anticipated that fiber optic cable ring 1106 will include a plurality of fiber optic strands. For example, some embodiments of fiber optic cable ring 1106 include 144 fiber optic strands. Each satellite hub 1104 interfaces a respective local network 1124 with fiber optic cable ring 1106. Details of local networks 1124(1) and 1124(3) are not shown in FIG. 11. However, a portion of local network 1124(2) is shown in FIG. 11. Each satellite hub 1104 need not have the same configuration, and each local network 1124 also need not have the same configuration.

In local network 1124(2), fiber optic branch cables 1108, 1110, and 1112 originate at satellite hub 1104. Fiber optic branch cable 1112 splits into three branches 1114, 1116, and 1118 at fiber splice box 1120(7). Each of fiber optic branch cables 1108, 1110, 1114, 1116, and 1118 may extend beyond the portion of local network 1124(2) shown in FIG. 11. While not required, fiber optic branch cables 1108, 1110, 1112, 1114, 1116, and 1118 typically include a plurality of fiber optic strands, with the number of fiber optics strands decreasing with distance from satellite hub 1104(2). For example, in some embodiments, fiber optic branch cable 1108 includes 72 fiber optic strands between satellite hub 1104(2) and fiber splice box 1120(2), but the number of fiber optic strands in cable 1108 drops to 48 after fiber optic splice box 1122(2), and the number of fiber optic strands in cable 1108 further drops to 36 between after fiber splice box 1120(1). As another example, in certain embodiments, fiber optic branch cable 1108 includes 144 fiber optic strands between satellite hub 1104(2) and fiber splice box 1120(7), and the 144 fiber optic strands are split into three groups of 48 fiber optic strands each at fiber splice box 1120(7), to form fiber optic branch cables 1114, 1116, and 1118 of 48 fiber optic strands each.

Each node 1122 is communicatively coupled to a fiber optic branch cable by a fiber splice box 1120. For example, node 1122(1) is communicatively coupled to fiber optic branch cable 1108 by fiber splice box 1120(1), and node 1122(3) is communicatively coupled to fiber optic branch cable 1110 by fiber splice box 1120(3). Each node 1122 can be any device which receives data signals from satellite hub 1104(2) and/or sends data signals to satellite hub 1104(2). In some embodiments, one or more nodes 1122 are configured to convert signals, such as communication signals, control signals, and/or feedback signals, between an optical domain and an electrical domain. In some embodiments, one or more nodes 1122 include (a) a respective fiber node configured to interface a fiber optic branch cable with one or more coaxial electrical cables, (b) a respective digital subscriber line access multiplexer (DSLAM) configured to interface a fiber optic branch cable with one or more twisted pair electrical cables, (c) a respective optical network termination (ONT) configured to interface a fiber optic branch cable with one or more Ethernet electrical cables or other type of electrical cables, (d) a respective optic network unit (ONU) configured to interface a fiber optic branch cable with one or more Ethernet electrical cables or other type of electrical cables, or (e) a device similar to, or analogous to, the aforesaid devices. Each node 1122 need not have the same configuration, and the number of nodes 1122 in local network 1124(2) may vary.

Some nodes 1122 include elements to help network 1100 perform DFOS. For example, each of nodes 1122(2), 1122(4), and 1122(5) includes a respective sensing signal receiver 1126 and a respective management transceiver 1128. Additionally, node 1122(2) further includes a sensing signal transmitter 1130. The number of nodes 1122 including elements for performing DFOS may vary. Additionally, network 1100 may include sensing signal receivers 1126, management transceivers 1128, and/or sensing signal transmitters 1130 that are stand-alone elements, i.e., they are not integrated in nodes 1122, but they are instead directly connected to one or more fiber optic branch cables. For example, sensing signal receiver 1126(4), management transceiver 1128(4), and sensing signal transmitter 1130(4) are stand-alone elements that are directly communicatively coupled to fiber optic branch cable 1118 via fiber splice box 1120(10).

Figure 12:
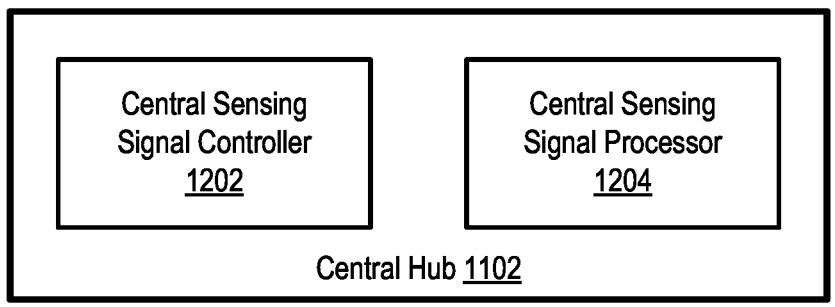
FIG. 12 is a block diagram of a central hub of the FIG. 11 fiber optic network, according to an embodiment.

Central hub 1102 and satellite hubs 1104 also include elements to help network 1100 perform DFOS. FIG. 12 is a block diagram of central hub 1102, and FIG. 13 is a block diagram of a satellite hub 1104 instance. Central hub 1102 includes a central sensing signal transmitter 1202 and a central sensing signal processor 1204. Satellite hub 1104 includes a local sensing signal controller 1302, a local sensing signal processor 1304, a management transceiver 1306, a sensing signal receiver 1308, a sensing signal transmitter 1310, and a switching element 1312. The elements of central hub 1102 and satellite hub 1104 are discussed further below, and any of these hubs could include additional elements without departing from the scope hereof.

Fiber optic strands of fiber optic branch cables 1108, 1110, 1112, 1114, 1116, and 1118 are configured to transmit data signals between satellite hub 1104(2) and nodes 1122. Additionally, at least some fiber optic strands of fiber optic branch cables 1108, 1110, 1112, 1114, 1116, and 1118 are configured to transmit sensing signals for DFOS. In some embodiments, one or more fiber optic strands of fiber optic branch cables 1108, 1110, 1112, 1114, 1116, and 1118 carry both data signals and sensing signals for DFOS.

In some embodiments of network 1100, operation over single or multiple fiber optic strands, and operation over multiple hubs and/or central offices, is managed within an access network environment. The sensing signals are carried over individual optical carriers and/or are embedded in optical data signals, such as coherent optical data signals. Other signals may coexist with the sensing signals and the coherent data signals, including but not limited to IM-DD optical data signals and analog optical data signals. Additional, management signals that exist separately (out-of-band), or that leverage data signals (in-band), are optionally used to control and manage at least some aspects of network 1100. In particular embodiments, intelligent control of sensing signals result in a cost-effective use of optical wavelength resources with only an incremental implementation cost over that of a fiber optic network without DFOS capability. Furthermore, some embodiments of network 1100 leverage an intelligent protocol to flexibly accommodate a wide variety of optical sensing signals by applying coexistence rules conditioned by the environment and other optical carrier tenants residing on the same fiber optic strand. Some embodiments also use multiple modes of operation that leverage remote end devices that help acquire sensing data, as well as operation modes where no remote end devices are used to capture sensing data, where the sensing data includes, for example, scattering signals.

Certain embodiments of network 1100 implement a hybrid communication-sensing system including elements having different functions that are strategically placed within network 1100 according to their respective functions and their intended sensing tasks. Particular embodiments include the following three element types: (a) a sensing termination system, (b) a sensing signal switching and routing device, (c) and a sensing signal end device. Some functions of a disaggregated sensing termination system could also be centrally deployed in a centralized termination system.

Some embodiments of the hybrid communication-sensing system implement at least the following three channels: (a) a sensing channel, (b) a communication channel, and (c) an out-of-band (OOB) management channel. The sensing channel includes selected wavelengths for transmitting sensing signals, and the communication channel carries communication signals. In some embodiments, the communication channel can also carry sensing signals embedded within communication signals. The communication channel optionally further carries in-band management and control signals within the communication signals. The OOB management channel uses a separate wavelength than the other channels, and some embodiments of the OOB management channel exclusively carry management and control information.

Referring to FIG. 12, central sensing signal controller 1202 is configured to control sensing signal generation in all local networks 1124. Additionally, central sensing signal processor 1204 is configured to perform control of sensing signal analysis, such as to detect events, in all local networks 1124. In some alternate embodiments of network 1100, each satellite hub 1104 operates independently, and central hub 1102 may therefore be omitted. In these embodiments, satellite hubs 104 may instead be referred to as "hubs."

Figure 13:
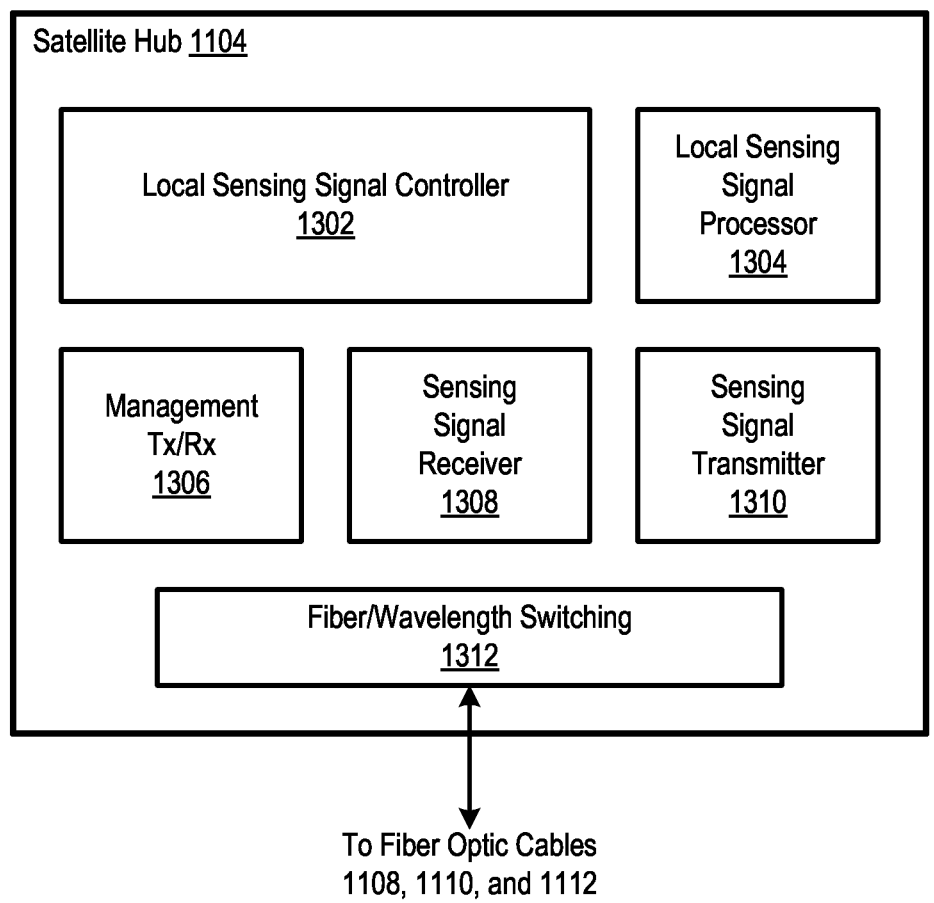
FIG. 13 is a block diagram of a satellite hub of the FIG. 11 fiber optic network, according to an embodiment.

Referring to FIG. 13, local sensing signal controller 1302 is configured to execute sensing routines to generate different types of sensing signals. Local sensing signal controller 1302 also schedules and delivers sensing signals and control signals to switching element 1312 so that the sensing signals are directed to selected fiber optic strands at desired wavelengths, based on the control information. Certain embodiments of local sensing signal controller 1302, as well as other sensing elements of network 1100, are configured to use a sensing protocol (SP), discussed below, for transmission of sensing-related information.

In some embodiments, local sensing signal controller 1302 is configured to plan which fiber optic branch cables and end devices, e.g., sensing signal receivers 1126 and sensing signal transmitters 1130, will participate in a given sensing session. Local sensing signal controller 1302 may also be configured to determine what type of sensing signals are needed for the various fiber optic cables and end devices. Furthermore, local sensing signal controller 1302 may be configured to determine (a) which end devices need to generate and send sensing signals back to satellite hub 1104(2), and (b) which end devices send captured sensing signals back to satellite hub 1104(2) via the OOB management channel.

Local sensing signal processor 1304 is configured to receive a sensing signal from sensing signal receiver 1308 after the sensing signal has traversed the network being sensed. The received sensing signal is, for example, a back-scattering signal analogous to back-scattering signal $b_1$ of FIG. 1, a forward-scattering signal analogous to forward-scattering signal $f_1$ of FIG. 1, or a sensing signal derived from a data signal. Additionally, sensing signal receiver 1308 is configured to receive, through an OOB channel via management transceiver 1306, sensing signals (e.g., back-scattering and/or forward scattering signals) captured from remote sensors, to process and analyze such signals. In some embodiments, some or all sensing signals that have been remotely captured are partially analyzed at respective remote locations where they are captured. In such embodiments, only an abbreviated representation of the captured sensing signals need be transmitted to local sensing signal processor 1304.

Sensing signal transmitter 1310 is configured to generate sensing signals analogous to sensing signals $s_1$ of FIG. 1 and transmit the sensing signals at a time, power level, and wavelength indicated by local sensing signal controller 1302. Sensing signal receiver 1308 is configured to receive and digitize sensing signals from fiber optic branch cables of local network 1124(2), and sensing signal receiver 1308 is configured to send the digitized sensing signals to local sensing signal processor 1304 for further processing. In some embodiments, the sensing signals received and digitized by sensing signal receiver 1308 are scattering signals. Management transceiver 1306 is configured to control in-band and OOB communication associated with DFOS, such as for communicating between sensing system elements.

Switching element 1312 is configured to perform fiber optic strand and wavelength switching or routing under the command of local sensing signal controller 1302. In some embodiments, sensing signal switching and routing devices (not shown) are located in local network 1124(2) and operate in stand-alone manner, and the OOB management channel carries commands from satellite hub 1104(2) to these switching and routing devices. Use of switching element 1312 in satellite hub 1104(2) allows one sensing signal transmitter to be shared among multiple fiber optic strands and wavelengths, instead of requiring a separate sensing signal transmitter for each fiber optic strand, thereby promoting low cost and small size of satellite hub 1104(2).

Referring again to FIG. 11, each sensing signal receiver 1126 is analogous to sensing signal receiver 1308 of satellite hub 1104. Accordingly, sensing signal receivers 1126 are configured to receive sensing signals, such as back-scattering signals analogous to signals $b_1$ of FIG. 1 and/or forward scattering signals analogous to signals $f_1$ of FIG. 1. Additionally, each sensing signal transmitter 1130 is analogous to sensing signal transmitter 1310 of satellite hub 1104(2), and sensing signal transmitters 1130 are accordingly configured to generate sensing signals, such as signals analogous to sensing signals $s_1$ of FIG. 1. Management transceivers 1128 are configured to communicate with management transceiver 1308 of satellite hub 1104(2), such as to transmit captured sensing signals to satellite hub 1104(2) and/or to receive instructions from satellite hub 1104(2) to generate sensing signals, using in-band and/or OOB communication.

Some embodiments of network 1100 are figured to generate derived sensing signals and/or explicit sensing signals. These two types of sensing signals may be generated using different respective optical carrier wavelengths.

Derived sensing signals are generated from information extracted from data signals, for the purpose of sensing the environment traversed by the data signals. Events and conditions along a fiber optic strand transmission path can be inferred by comparing received data signals, which will typically be distorted due to transmission through the fiber optic strand, to ideal (non-distorted) data signals. While data signals, such as communication signals, may be considered to be sub-optimal sensing signals, the sheer quantity and variety of data signals that typically traverse a fiber optic network can potentially be leveraged to obtain meaningful information regarding events and conditions along the network.

Explicit sensing signals, on the other hand, are signals that are designed for a specific sensing task, such as to generate scattering signals in response to perturbation of a fiber optic strand by a particular type of event. The optimized sensing signals discussed above with respect to FIG. 1 are one example of explicit sensing signals.

In some embodiments of network 1100, sensing signals of one or more types may be flexibly scheduled for transmission in the sensing channel. Sensing signal parameters can be varied, and sensing signal parameters depend, for example, on the type of information that is to be sensed, including but not limited to, high/low frequency vibration, temperature changes, electromagnetic pulses, tensile/compressive forces, movement (e.g., due to wind), light scattering phenomena, etc. Additionally, particular embodiments of network 1100 are advantageously capable of performing highly granular sensing. For example, some embodiments are capable of pinpointing problems in a fiber optic cable, such as water in the cable, poor connectorization in the cable, cracks and/or cuts in the cable, higher attenuation segments of the cable, etc.

In particular embodiments, sensing signals are multiplexed in time and transmitted over the sensing channel. Linear characterization can be performed by sending sensing signals having a common power level for capture by remote end devices, e.g., by sensing signal receivers 1126, and non-linear characterization of a fiber optic strand can be performed by generating a sequence of sensing signals of increasing power levels.

As mentioned above, certain embodiments of network 1100 use a sensing protocol (SP) for transmission of sensing-related information. In particular embodiments, the sensing protocol is designed to efficiently use optical transport and sensing signal generation resources, to enable both of a one-to-many fiber optic strand topology and a one-to-many end device topology, to operate in a coordinated fashion. In some embodiments, the sensing protocol identifies one or more of (a) what type of sensing signal(s) is (are) sent along with its attributes (e.g., wavelength, power level, duration, number of sensing signals, duty cycle, etc.), (b) when these sensing signals are transmitted, and (c) where the sensing signals are being sent to (e.g., the recipient receiver and/or what path the sensing signals traverse to the recipient receiver). FIGS. 14-18 illustrate several examples of sensing protocol flow in network 1100, although it is understood that sensing protocols in network 1100 may vary and need not conform to the examples of FIGS. 14-18.

Figure 14:
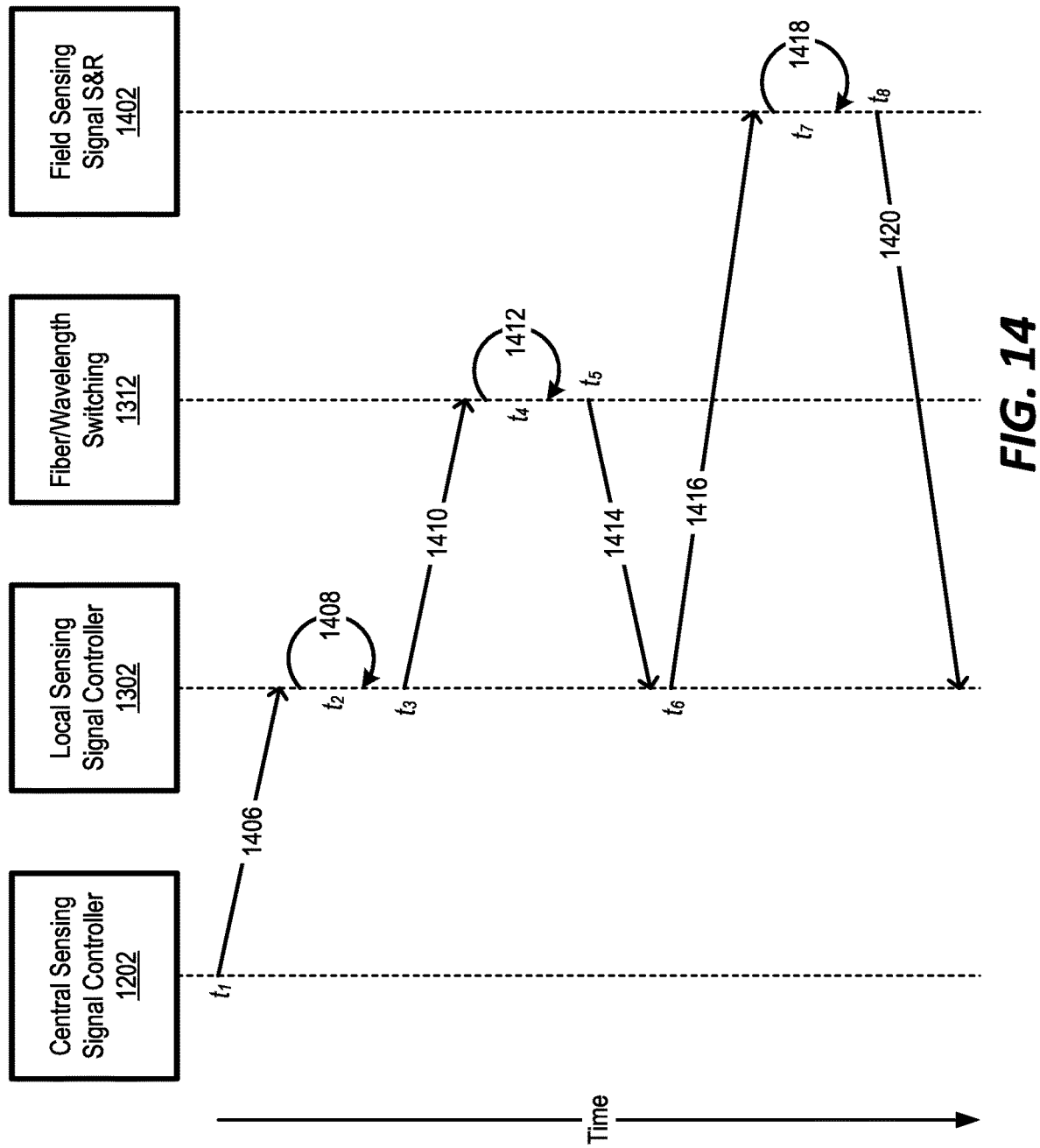
FIG. 14 is a signal flow diagram illustrating one example of using a sensing protocol to coordinate sensing in the FIG. 11 fiber optic network, according to an embodiment.

FIG. 14 is signal flow diagram illustrating one example of using a sensing protocol to coordinate sensing in network 1100. FIG. 14 includes vertical dashed lines corresponding to (a) central sensing signal controller 1202, (b) local sensing signal controller 1302, (c) switching element 1312, and (d) field switching and routing (S&R) elements 1402. Field switching and routing elements 1402 refer to switching and routing elements in local network 1124(2), such as a WSS or a EWSS in local network 1124(2). Field switching and routing elements 1402 are optional and are not shown in FIG. 11. The vertical axis of FIG. 14 represents time.

At time $t_1$, central sensing signal controller 1202 sends a general sensing request 1406 to local sensing controller 1302 of satellite hub 1104(2). Local sensing signal controller 1302 responds to request 1406 by translating 1408 request 1406 into sensing signal and S&R commands 1410, at time $t_2$. Local sensing signal controller 1302 sends S&R commands 1410 to switching element 1312 at time $t_3$, and switching element 1312 processes 1412 S&R commands 1410 at time $t_4$. Switching element 1312 sends an acknowledgement 1414 at time is advising that it is performing the switching and/or routing requested by S&R commands 1410.

Local sensing signal controller 1302 also responds to request 1406 by sending S&R commands 1416 to field sensing signal S&R elements 1402 at time $t_6$. Field sensing signal S&R elements 1402 process 1418 S&R commands 1416 at time $t_7$, and field sensing signal S&R elements 1402 send an acknowledgement 1420 at time $t_8$ advising that it is performing the switching and/or routing requested by S&R commands 1416. The aforementioned steps involving field sensing signal S&R elements 1402 are omitted in embodiments where local network 1124(2) does not include field sensing signal S&R 1402.

Figure 15:
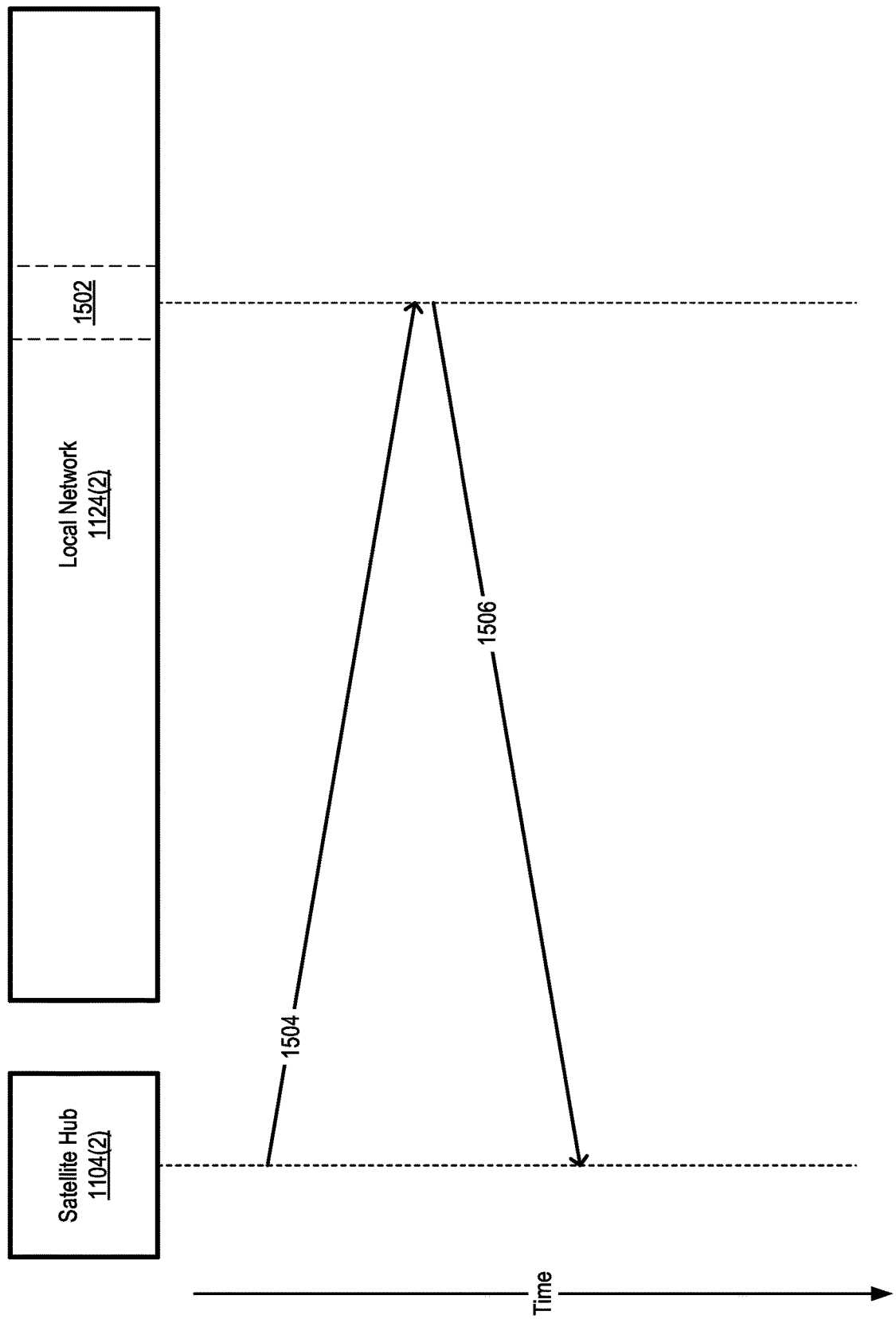
FIG. 15 is a signal flow diagram illustrating one example of sensing signal flow where a sensing signal is generated by a sensing signal transmitter in a satellite hub of the FIG. 11 fiber optic network, according to an embodiment.

FIG. 15 is a signal flow diagram illustrating one example of sensing signal flow where a sensing signal is generated by sensing signal transmitter 1310 in satellite hub 1104(2). FIG. 15 includes vertical lines logically representing satellite hub 1104(2) and a perturbation 1502 along a fiber optic branch cable of local network 1124(2). Perturbation 1502 is caused, for example, by an event in an area covered by local network 1124(2). In the FIG. 15 example, satellite hub 1140(2) generates a sensing signal 1504, such as in response to a command from local sensing signal controller 1302. Sensing signal 1504 travels through one or more fiber optic strand branches of local network 1124(2) and reaches perturbation 1502, which results in generation of a back-scattering signal 1506 and a forward-scattering signal (not shown). Back-scattering signal 1506 returns to satellite hub 1104(2) along the one or more fiber optic strand branches of local network 1124(2), and sensing signal receiver 1308 captures back-scattering signal 1506. Local sensing signal processor 1304 subsequently processes a digitized version of back-scattering signal 1506 received from sensing signal receiver 1308.

Figure 16:
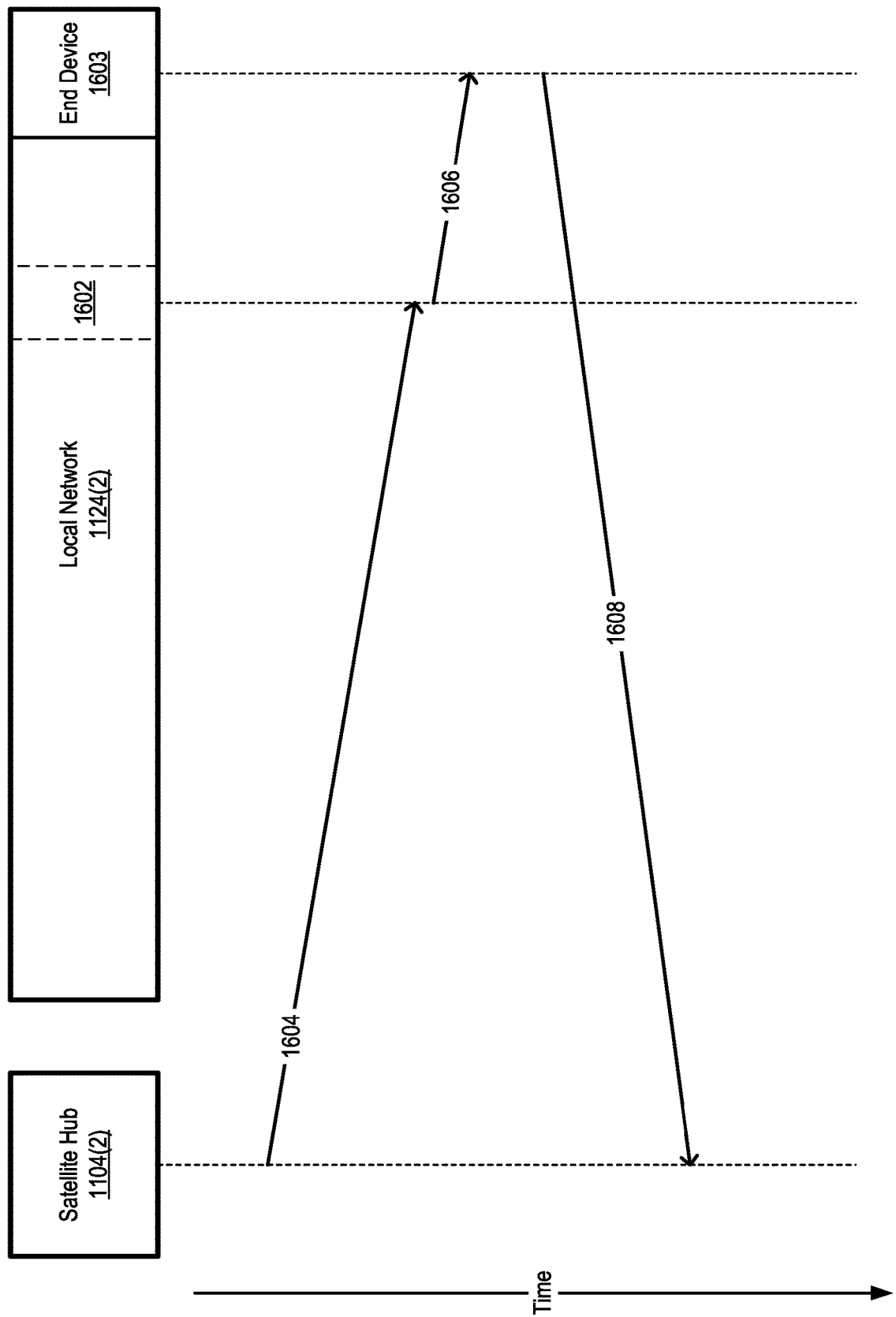
FIG. 16 is a signal flow diagram illustrating one example of sensing signal flow where a sensing signal is generated by a sensing signal transmitter in a satellite hub of the FIG. 11 fiber optic network, according to an embodiment.

FIG. 16 is a signal flow diagram illustrating another example of sensing signal flow where a sensing signal is generated by sensing signal transmitter 1310 in satellite hub 1104(2). FIG. 16 includes vertical lines logically representing satellite hub 1104(2), a perturbation 1602 along a fiber optic branch cable of local network 1124(2), and an end device 1603. End device 1603 includes an instance of a sensing signal receiver 1126 (not shown) and an instance of a management transceiver 1128 (not shown). Perturbation 1602 is caused, for example, by an event in an area covered by local network 1124(2). In the FIG. 16 example, satellite hub 1140(2) generates a sensing signal 1604, such as in response to a command from local sensing signal controller 1302. Sensing signal 1604 travels through one or more fiber optic strand branches of local network 1124(2) and reaches perturbation 1602, which results in generation of a forward-scattering signal 1606 and a back-scattering signal (not shown). The sensing signal receiver 1126 of end device 1603 captures forward-scattering signal 1606, and the management transceiver 1128 of end device 1603 sends the captured signal 1608 back to satellite hub 1104(2) via OOB communication. Management transceiver 1306 of satellite hub 1104(2) receives captured signal 1608 and provides it to local sensing signal processor 1304 for processing.

Figure 17:
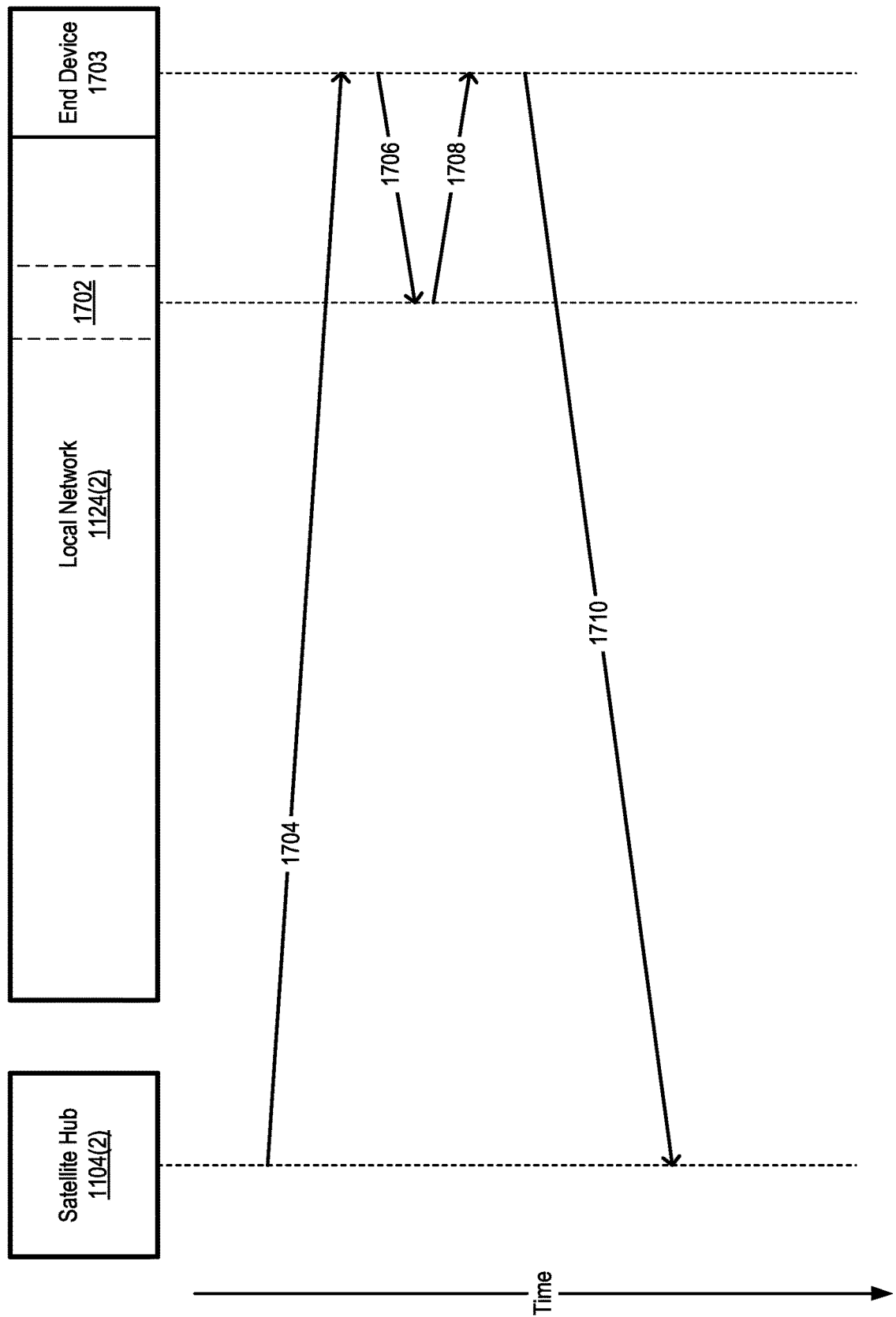
FIG. 17 is a signal flow diagram illustrating an example of sensing signal flow where a sensing signal is generated by an end device in the FIG. 11 fiber optic network, according to an embodiment.

FIG. 17 is a signal flow diagram illustrating an example of sensing signal flow where a sensing signal is generated by an end device in local network 1124(2). FIG. 17 includes vertical lines logically representing satellite hub 1104(2), a perturbation 1702 along a fiber optic branch cable of local network 1124(2), and an end device 1703. End device 1703 includes an instance of a sensing signal transmitter 1130 (not shown) and an instance of a management transceiver 1128 (not shown). Perturbation 1702 is caused, for example, by an event in an area covered by local network 1124(2). In the FIG. 17 example, local sensing signal controller 1302 of satellite hub 1104(2) sends a command 1704 to end device 1703 to generate a sensing signal. The sensing signal transmitter 1130 of end device 1703 generates a sensing signal 1706 in response to command 1704. Sensing signal 1706 travels through one or more fiber optic strand branches of local network 1124(2) and reaches perturbation 1702, which results in generation of a back-scattering signal 1708 and a forward-scattering signal (not shown). The sensing signal receiver 1126 of end device 1703 captures back-scattering signal 1708, and the management transceiver 1128 of end device 1703 sends the captured signal 1710 to satellite hub 1104(2) via OOB communication. Management transceiver 1306 of satellite hub 1104(2) receives captured signal 1710 and provides it to local sensing signal processor 1304 for processing.

Figure 18:
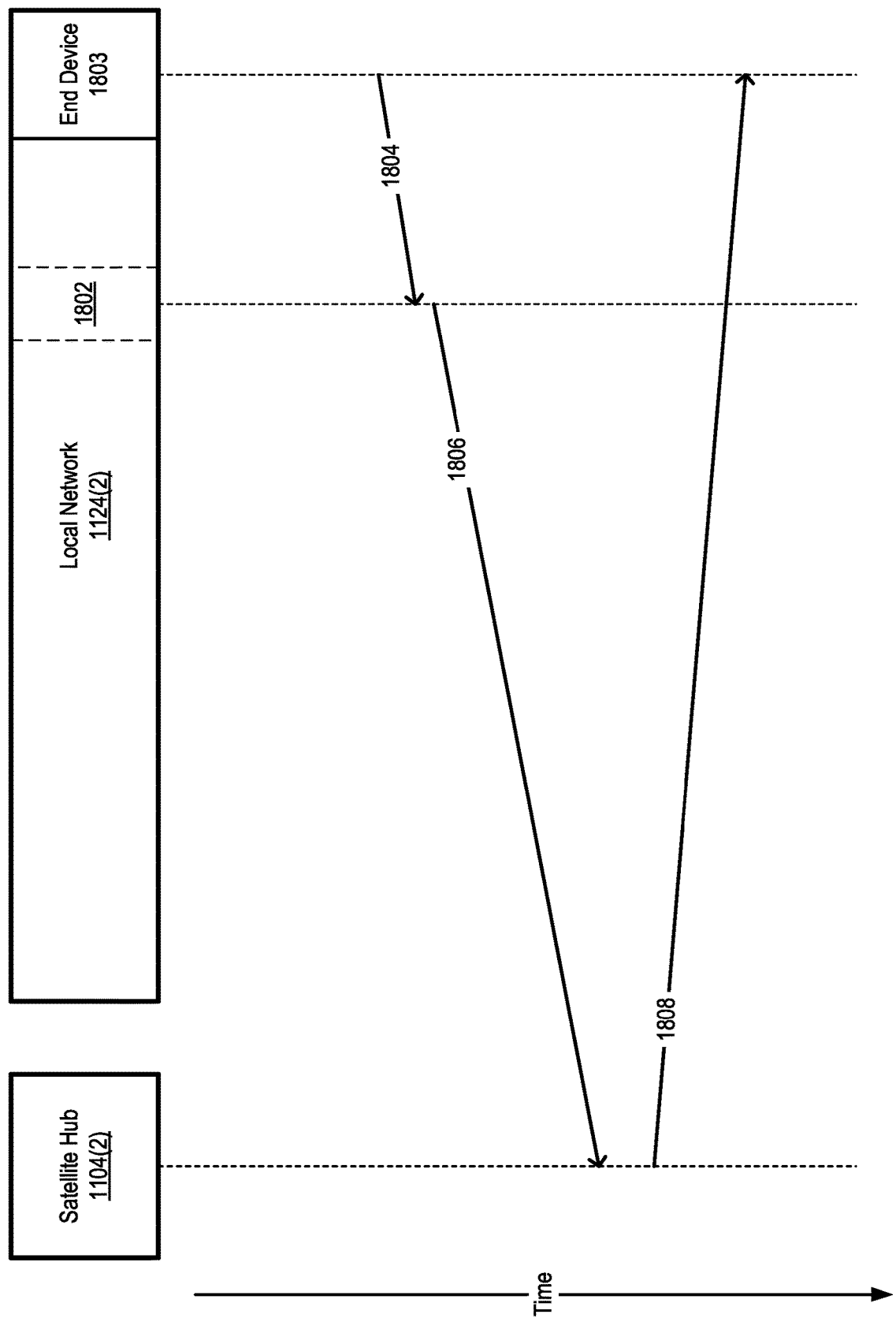
FIG. 18 is a signal flow diagram illustrating another example of sensing signal flow where a sensing signal is generated by an end device in the FIG. 11 fiber optic network, according to an embodiment

FIG. 18 is a signal flow diagram illustrating another example of sensing signal flow where a sensing signal is generated by an end device in local network 1124(2). FIG. 18 includes vertical lines logically representing satellite hub 1104(2), a perturbation 1802 along a fiber optic branch cable of local network 1124(2), and an end device 1803. End device 1803 includes an instance of a sensing signal transmitter 1130 (not shown) and an instance of a management transceiver 1128 (not shown). Perturbation 1802 is caused, for example, by an event in an area covered by local network 1124(2). In the FIG. 18 example, the sensing signal transmitter 1130 of end device 1803 generates a sensing signal 1804, optionally in response to command (not shown) of local sensing signal controller 1302. Sensing signal 1804 travels through one or more fiber optic strand branches of local network 1124(2) and reaches perturbation 1802, which results in generation of a forward-scattering signal 1806 and a back-scattering signal (not shown). Sensing signal receiver 1308 of satellite hub 1104(2) captures forward scattering signal 1806 and provides it to local sensing signal processor 1304 for processing. Management transceiver 1308 of satellite hub 1104(2) also sends an acknowledgement 1808 of receipt of back-scattering signal 1806 to the management transceiver 1128 of end device 1803.

The sensing protocol flow examples of FIGS. 14-18 illustrate interactions that leverage both the sensing channel and the OOB management channel. In these examples, the sensing channel is limited to carrying the sensing signals and their reflections (e.g., scattering signals), while the OOB channel is used to carry commands that control channel setup, such as commands to switching element 1312 to define the fibers in use and the sensing signal paths. The OOB management channel also is used to request sensing signal transmissions from remote sensing end devices and to provide a time reference to sensing end devices so that signal transmission and reception can be synchronized. In particular embodiments, one function of the OOB management channels is to carry captured sensing data associated with sensing signals generated by network 1100.

Certain embodiments of network 1100 have the following three sensing operating modes: (a) a reflection-only sensing mode, (b) a transmission-only sensing mode, and (c) a reflection and transmission sensing mode. These three sensing operating modes are discussed below.

A. Sensing-Only Sensing Mode

The sensing-only sensing mode requires only a sensing termination system (STS) for operation. Examples of an STS include (a) the combination of sensing signal transmitter 1310 and sensing signal receiver 1308 in satellite hub 1104(2) and (b) a combination of a sensing signal transmitter 1130 instance and a sensing signal receiver 1126 instance. In this operating mode, the STS transmitter sends a sensing signal, e.g., using sensing signal transmitter 1310 or a sensing signal transmitter 1130. As the sensing signal traverses fiber optic branch cables of network 1100, reflections such as back-scattering occur, and the reflections flow back to the STS via the cable branches. The STS receiver, e.g., sensing signal receiver 1308 or a sensing signal receiver 1126 instance, captures the reflections. The captured reflections are processed to sense events and conditions along the fiber optic branch cables. In some embodiments, a priori knowledge of the sensing signals facilitates the reflection processing. Examples of sensing-only operation include the example scenarios of FIGS. 15 and 17.

B. Transmission-Only Sensing Mode

The transmission-only sensing mode requires both an STS and a sensing end device (SED) for operation. In this operating mode, a sensing signal transmitter of the STS transmitter sends a sensing signal, and the sensing signal is modified by the events and conditions along fiber optic branch cables of network 1100 as it traverses the cables. The modified transmitted sensing signal, which may include forward-scattering signals, is captured by a sensing signal receiver of the SED and is processed to determine events and channels conditions along the traversed fiber optic branch cables. In some embodiments, a priori knowledge of the sensing signals facilitates the captured modified signals.

Examples of the transmission-only sensing mode include the example scenarios of FIGS. 16 and 18. In the FIG. 16 scenario, satellite hub 1104(2) functions as an STS, and end device 1602 functions as a SED. In the FIG. 18 scenario, end device 1803 functions as an STS, and satellite hub 1104 functions as a SED.

C. Reflection and Transmission Sensing Mode

The reflection and transmission sensing mode not only requires use of an STS and a SED, but it also requires that both of these devices have transmission and reception capabilities. The reflection and transmission sensing mode is an aggregate of the sensing-only transmission mode and the transmission-only transmission mode and results in generation of the following reflection-transmission sensing matrix, where (a) TA is a sensing signal transmitted by the STS, (b) RA is a reflection signal received by the STS, (c) TB is a sensing signal transmitted by the SED, and (d) RB is a reflection signal received by the SED.

$$\begin{bmatrix} RA & TB \\ TA & RB \end{bmatrix}$$ (Matrix 1)

Figure 19:
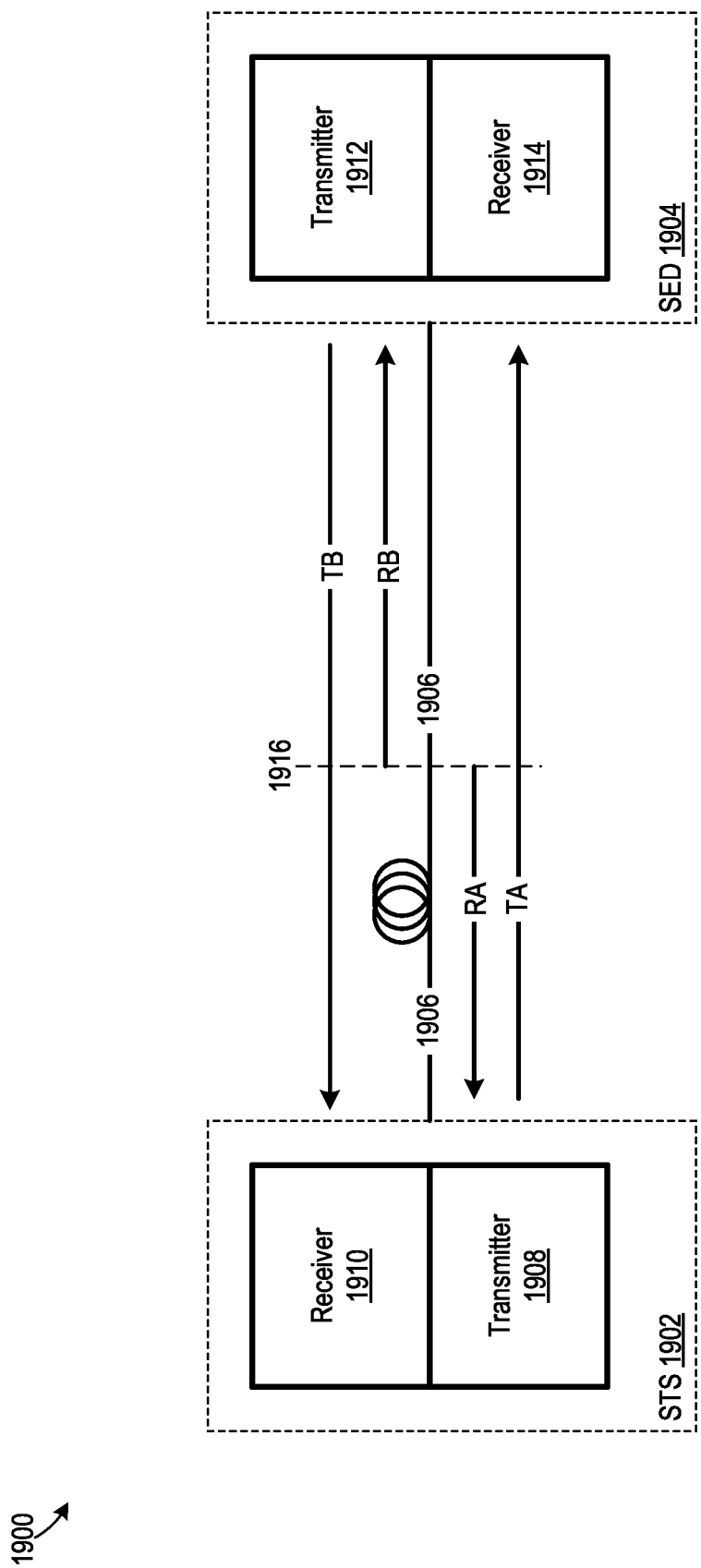
FIG. 19 is a block diagram illustrating one example of a reflection and transmission sensing mode of the FIG. 11 fiber optic network, according to an embodiment.

FIG. 19 is a block diagram of an STS/SED pair 1900 showing one example of the signals of the above reflection-transmission sensing matrix. Pair 1900 includes an STS 1902, a SED 1904, and a fiber optic strand 1906 communicatively coupling STS 1902 and SED 1904. STS 1902 includes a transmitter 1908 and a receiver 1910. In some embodiments, transmitter 1908 is an instance of sensing signal transmitter 1310, and receiver 1910 is an instance of sensing signal receiver 1308. SED 1904 includes a transmitter 1912 and a receiver 1914. In some embodiments, transmitter 1912 is an instance of sensing signal transmitter 1130, and receiver 1914 is an instance of sensing signal receiver 1126.

Transmitter 1908 generates sensing signal TA, which is affected by a perturbation 1916 in fiber optic strand 1906. A portion of sensing signal TA is received by receiver 1914, and a portion of sensing signal TA is returned to STS 1902 and received by receiver 1910 as reflection signal RA. Similarly, transmitter 1912 generates sensing signal TB, which is also affected by perturbation 1916. A portion of sensing signal TB is received by receiver 1910, and a portion of sensing signal TB is returned to SED 1904 and received by receiver 1914 as reflection signal RB. In some alternate scenarios, sensing signals TA and TB are affected by different perturbations on fiber optic strand 1906.

In passive and non-directional fiber optic strand scenarios, TA=TB and RA=RB, resulting in reciprocal characteristics of the fiber optic strand. Nevertheless, even in passive systems when high sensitivity is required, reciprocity may not always apply and it may be advantageous to operate in the bidirectional reflection and transmission sensing mode for higher resolution and accuracy. The information that is captured and processed by the SED may be sent through the management channel to the STS, and processor of the STS may process the four sensing parameters (RA, TA, TB, RB). In some embodiments, the processor of the STS is local sensing signal processor 1304.

Referring again to FIG. 11, certain embodiments of network 1100 are configured to implement sensing signal multicasting where sensing signals traverse two or more branches of a fiber optic strand path. In the case of a two-way splitter or a single port coupler, the following reflection-transmission matrix (Matrix 2) is obtained. In Matrix 2, RA=RA0+RA1+RA2, and transmission characteristics between two SEDs are assumed to be approximately zero. Some embodiments of network 1100 are configured to identify or verify the topology of network 1100 by correlating and analysis data of Matrix 2.

$$\begin{bmatrix} RA & TB1 & TB2 \\ TA1 & RB1 & \sim 0 \\ TA2 & \sim 0 & RB2 \end{bmatrix}$$ (Matrix 2)

Figure 20:
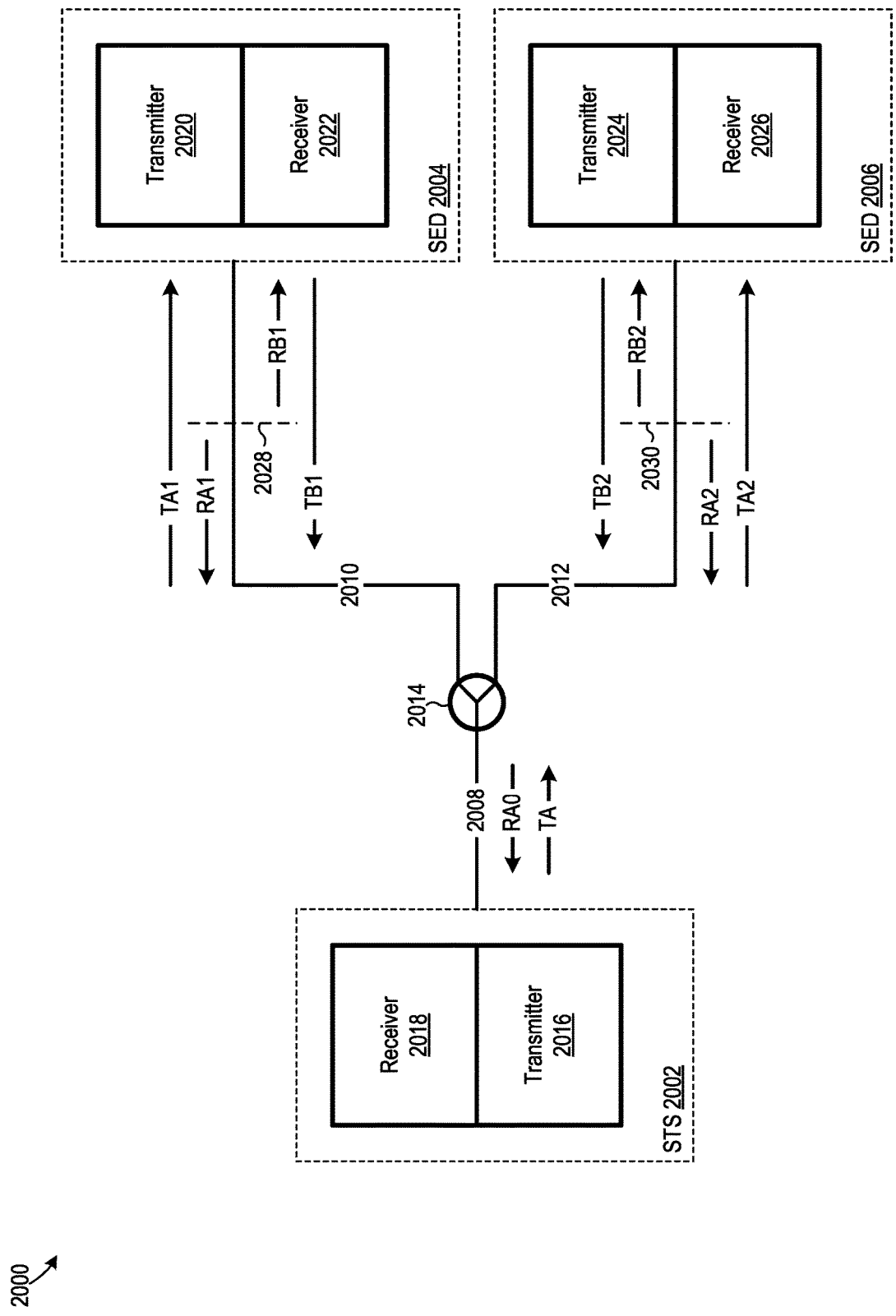
FIG. 20 is a block diagram of a network including a sensing termination system and two sensing end devices where the network is configured for sensing signal multicasting, according to an embodiment.

FIG. 20 is a block diagram of a network 2000 including an STD and two SEDs, which illustrates an example of the signals of Matrix 2 above. Network 2000 includes an STS 2002, a SED 2004, a SED 2006, fiber optic strands 2008, 2010, and 2010, and a splitter 2014. Fiber optic strand 2008 communicatively couples STS 2002 and splitter 2014. Fiber optic strand 2010 communicatively couples splitter 2014 and SED 2004, and fiber optic strand 2012 communicatively couples splitter 2014 and SED 2006. STS 2002 includes a transmitter 2016 and a receiver 2018. In some embodiments, transmitter 2016 is an instance of sensing signal transmitter 1310, and receiver 2018 is an instance of sensing signal receiver 1308. SED 2004 includes a transmitter 2020 and a receiver 2022, and SED 2006 includes a transmitter 2024 and a receiver 2026. In some embodiments, each transmitter 2020 and 2024 is a respective sensing signal transmitter 1130 instance, and each receiver 2022 and 2026 is a respective sensing signal receiver 1126 instance.

Transmitter 2016 generates sensing signal TA, which is split into portions TA1 and TA2 by splitter 2014. A portion of sensing signal TA is reflected by splitter 2014 as reflection signal RA0, which is received by receiver 2018. A portion of sensing signal TA1 is received by receiver 2022, and a portion of sensing signal TA1 is reflected by a perturbation 2028 in fiber optic strand 2010 as reflection signal RA1, which is received by receiver 2018. A portion of sensing signal TA2 is received by receiver 2026, and a portion of sensing signal TA2 is reflected by a perturbation 2030 in fiber optic strand 2012 as reflection signal RA2, which is received by receiver 2018. Transmitter 2020 generates sensing signal TB1, and a portion of sensing signal TB1 is received by receiver 2018. Another portion of sensing signal TB1 is reflected by perturbation 2028 in fiber optic strand 2010 as reflection signal RB1, and receiver 2022 receives reflection signal RB1. Transmitter 2024 generates sensing signal TB2, and a portion of sensing signal TB2 is received by receiver 2018. Another portion of sensing signal TB2 is reflected by perturbation 2030 in fiber optic strand 2012 as reflection signal RB2, and receiver 2026 receives reflection signal RB2.

Referring again to FIG. 11, certain embodiments of network 1100 are configured to generate multicast sensing signals using active devices, such as a multicast wavelength switch, instead of passive devices. Furthermore, some embodiments of network 1100 are configured to emulate multicasting of sensing signals by generating a plurality of copies of the same sensing signal using coordinated sensing signal transmission and sending them to the fiber optic branch cables.

Figure 21:
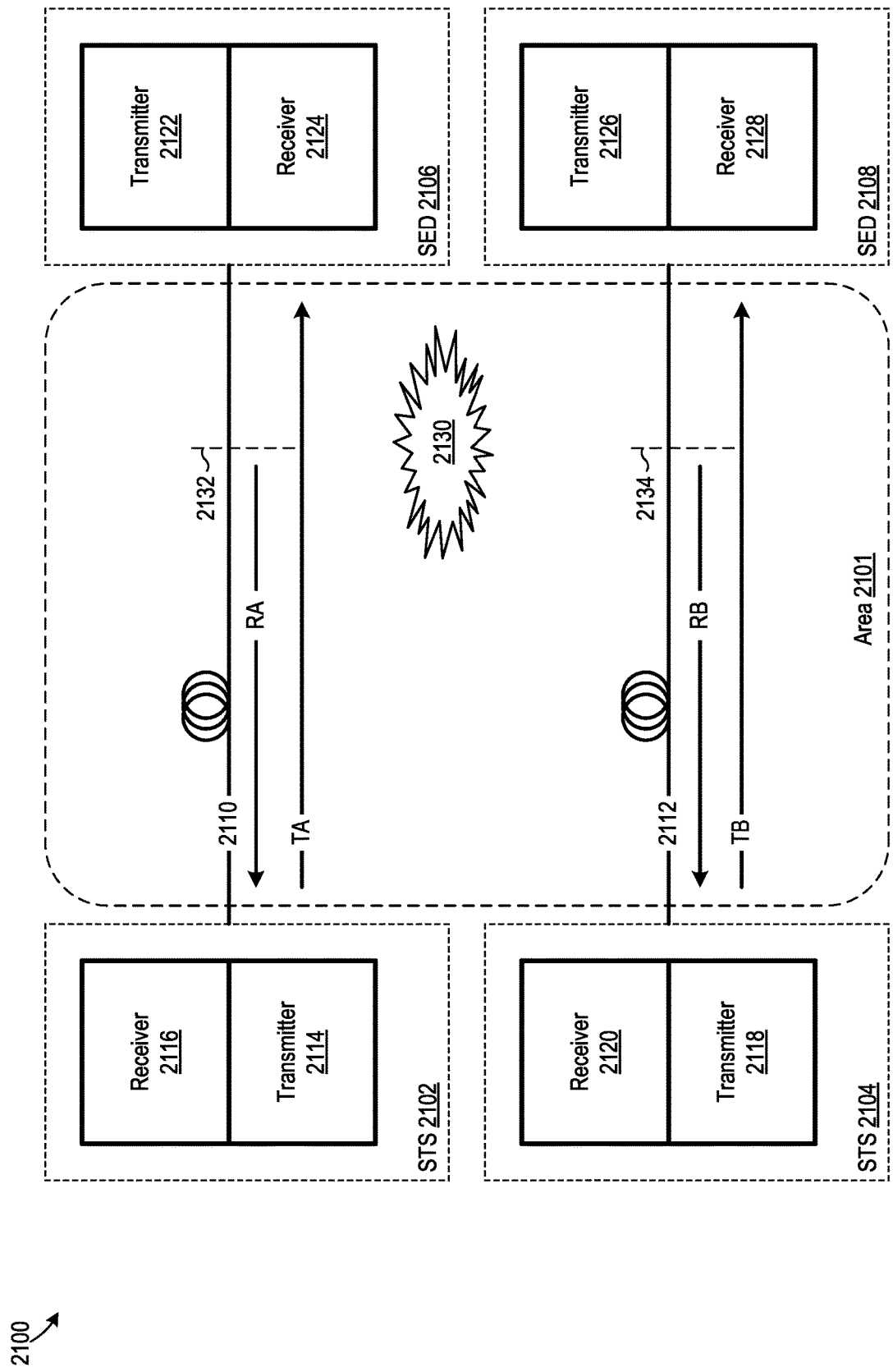
FIG. 21 a block diagram of a network including a plurality of sensing termination systems and sensing end devices where the network is configured to coordinate sensing signal transmission to provide sensing coverage in a particular area, according to an embodiment.

Moreover, some embodiments of network 1100 are configured to coordinate sensing signal transmissions to provide sensing coverage in a particular area. For example, FIG. 21 a block diagram of a network including a plurality of STSs and SEDs that is configured to coordinate sensing signal transmission to provide sensing coverage in a particular area 2101. Network 2100 includes an STS 2102, an STS 2104, a SED 2106, a SED 2108, and fiber optic strands 2110 and 2112. Fiber optic strand 2110 communicatively couples STS 2102 and splitter SED 2106, and fiber optic strand 2112 communicatively couples STS 2104 and SED 2108. STS 2102 includes a transmitter 2114 and a receiver 2116, and STS 2104 includes a transmitter 2118 and a receiver 2120. In some embodiments, each transmitter 2114 and 2118 is an instance of sensing signal transmitter 1310, and each receiver 2116 and 2120 is an instance of sensing signal receiver 1308. SED 2106 includes a transmitter 2122 and a receiver 2124, and SED 2108 includes a transmitter 2126 and a receiver 2128. In some embodiments, each transmitter 2122 and 2126 is a respective sensing signal transmitter 1130 instance, and each receiver 2124 and 2128 is a respective sensing signal receiver 1126 instance.

Transmitters 2114 and 2118 are configured to generate respective sensing signals TA and TB which are synchronized in time. An event 2130 in area 2101 creates perturbations 2132 and 2134 in fiber optic strands 2110 and 2112, respectively. A portion of sensing signal TA is reflected by perturbation 2132 as reflection signal RA, which is received by receiver 2116. Additionally, a portion of sensing signal TB is reflected by perturbation 2134 as reflection signal RB, which is received by receiver 2120. Accordingly, each of STSs 2102 and 2104 detects presence of event 2130.

It is anticipated that network 1100 will typically be able to identify a particular sensing signal, such as for providing coordinating sensing of a given area, using a timing reference and a sensing protocol, such as an embodiment of the above-discussed sensing protocol. Nevertheless, in some embodiments of network 1100, one or more sensing signals include identifying information, such as a unique identifier or a sensing signal signature, to facilitate identification of the sensing signals.

The topology of network 1100 may vary without departing from the scope hereof. For example, some alternate embodiments of network 1100 have a point-to-point topology, and some other alternate embodiments of network 1100 have a ring topology. In embodiments of network 1100 having very long fiber optic strand lengths, the sensing elements may have to operate solely in a reflection mode and thereby be limited to sensing nearby events, or the sensing elements may need to be configured to operate with a large number of sensing signals to achieve high sensitivity and thereby enable event sensing over long distances.

Intelligent Sensing Signal Generation and Intelligent Event Sensing

Discussed below are examples of how certain embodiments of the above-discussed networks may be configured to implement intelligent sensing signal generation and/or intelligent event sensing. It is understood, however, that the above-discussed networks are not limited to the following example implementations. To the contrary, the above-discussed networks may implement intelligent sensing signal generation and intelligent event sensing in a different manner, or the networks may be configured to not implement intelligent sensing signal generation and/or intelligent event sensing.

Figure 22:
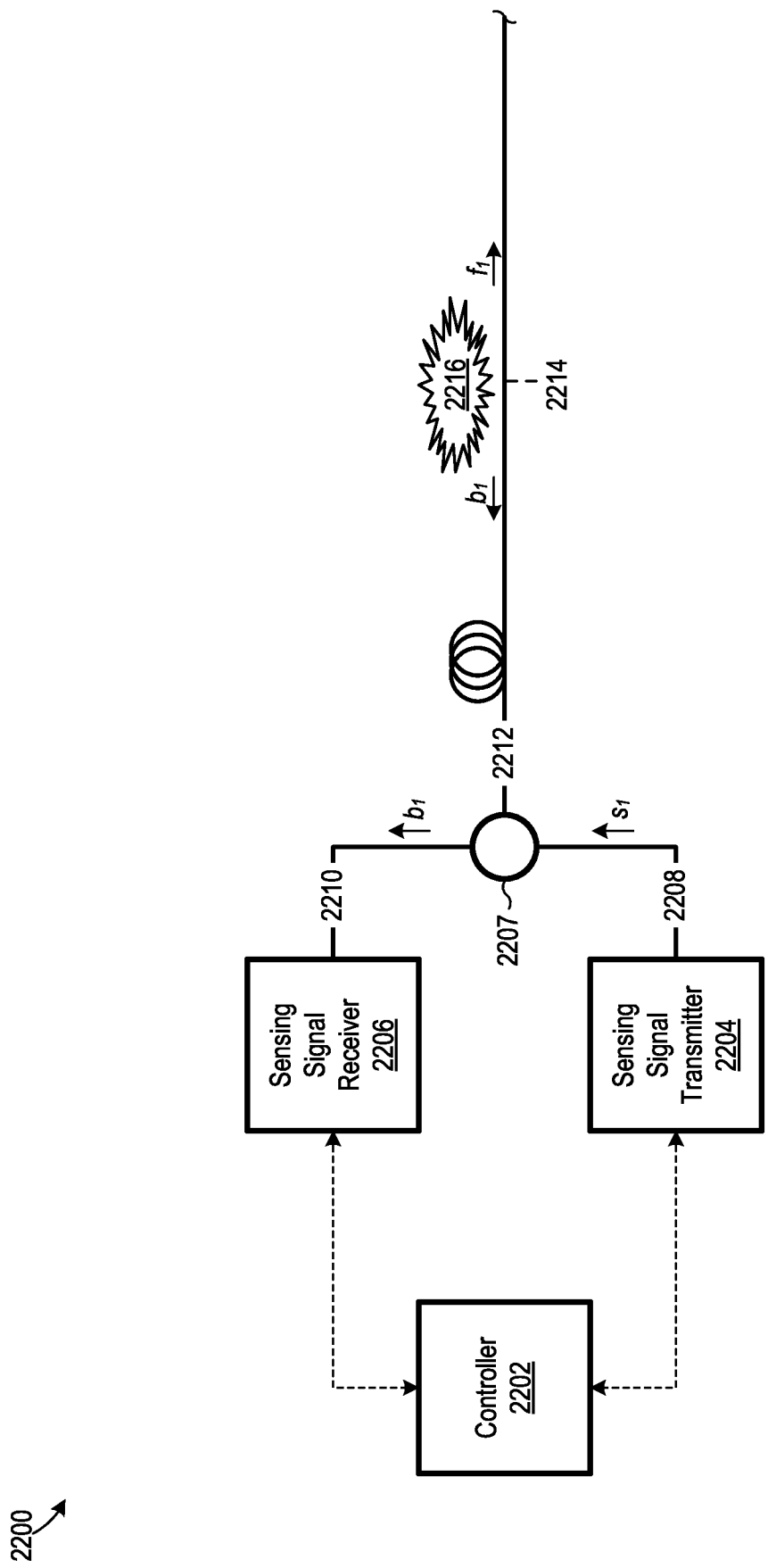
FIG. 22 is a block diagram of a network including a controller configured for intelligent sensing signal processing, correlation, and analysis, according to an embodiment.

FIG. 22 is a block diagram of a network 2200 including a controller 2202, a sensing signal transmitter 2204, a sensing signal receiver 2206, an optical circulator 2207, and fiber optic strands 2208, 2210, and 2212. Fiber optic strand 2208 communicatively couples sensing signal transmitter 2204 to optical circulator 2207, and fiber optic strand 2210 communicatively couples sensing signal receiver 2206 to optical circulator 2207. While not required, network 2200 will typically include additional elements (not shown). For example, some embodiments of network 2200 further include additional fiber optic strands (e.g., additional fiber optic strands 2212) and/or switching and routing devices. As another example, some embodiment of network 2200 further include a data signal transmitter and a data signal receiver analogous to data signal transmitter 102 and data signal receiver 110, respectively, of FIG. 1.

Sensing signal transmitter 2204 and sensing signal receiver 2206 are controlled by controller 2202, which performs intelligent sensing signal processing, correlation, and analysis. Optical circulator 2207 is configured to discriminate transmit/downlink directions from receive/uplink directions. For example, optical circulator 2207 is configured to (a) direct sensing signals $s_1$ from sensing transmitter 2204 to fiber optic strand 2212 and (b) direct reflection signals, e.g., back-scattering signal $b_1$, from optical fiber strand 2212 to sensing signal receiver 2206. Controller 2202 is configured to determine (a) what type of sensing signals $s_1$ are transmitted by sensing signal transmitter 2204 (including sensing signal parameters such as wavelength), (b) which optical path(s) sensing signals $s_1$ take, and when sensing signals $s_1$ are transmitted.

In a one-to-many fiber optic cable topology that has ubiquitous fiber optic cable coverage, multiple sensing signals can be transmitted simultaneously or in a sequence, and their responses to events can be analyzed. Network topology may determine which fibers are used and when the sensing signals are transmitted, so to achieve sensing coverage of a desired area for a type of event to be sensed. Multiple event types can be sensed simultaneously in the same area by sending multiple sensing signals designed for different events within a short time period of each other. In case these events still overlap in time, wavelength multiplexing can used to avoid interference among the sensing signal responses to the events (e.g., to avoid interference among multiple back-scattering signals and/or multiple forward-scattering signals generated by transmitted sensing signals.)

Some embodiments of network 2200 are configured to use a diverse set of sensing signals $s_1$ that facilitate training and recursive optimization of these sensing signals for specific target events. In certain embodiments, goals of such training and sensing signal optimization include, but are not limited to, (a) discriminating as accurately as possible type of an event and characteristics and features of the event, and (b) optimizing resource use and maximizing sensing coverage and sensing type diversity to minimize implementation and operational costs.

Figure 23:
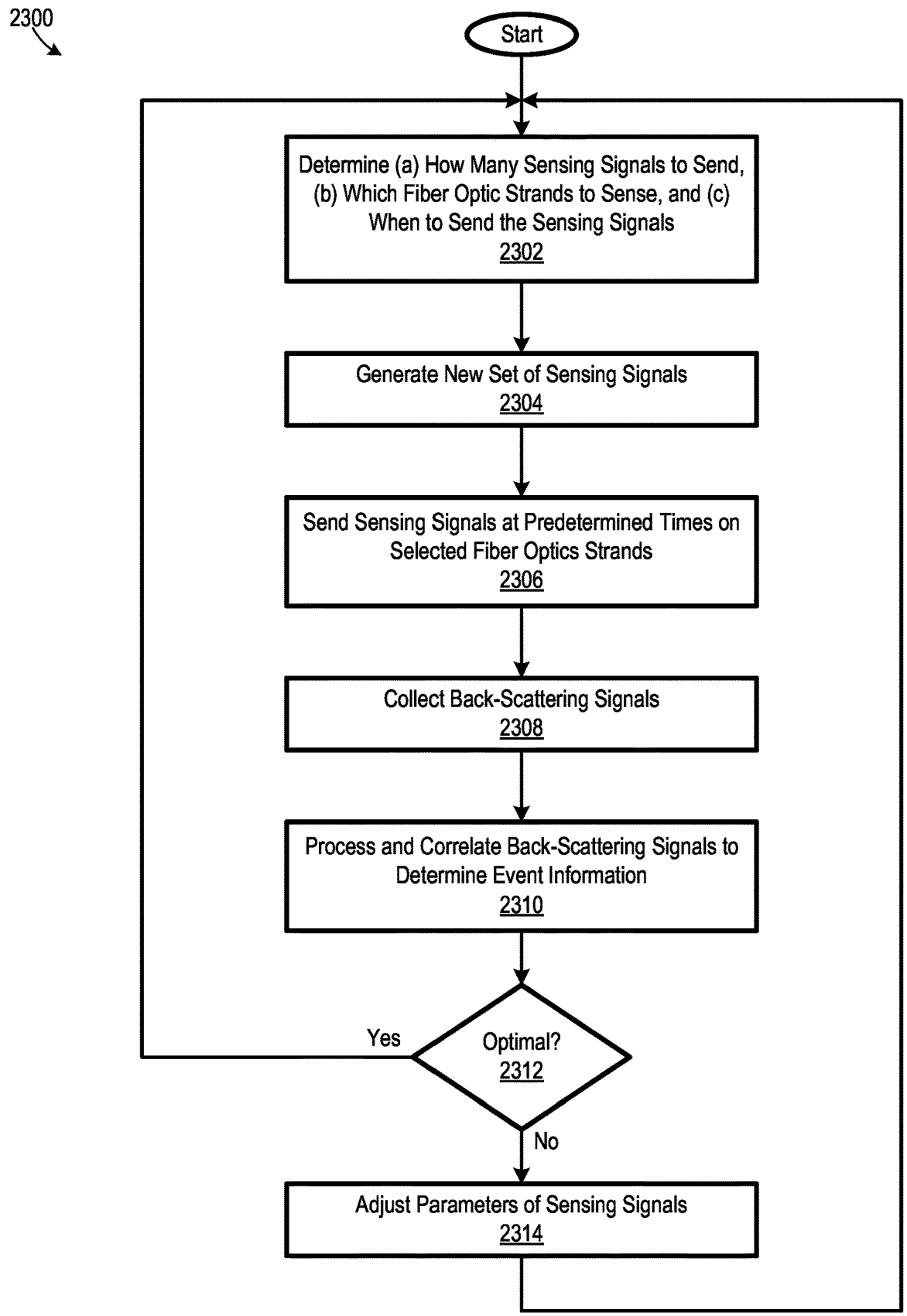
FIG. 23 is a flow chart of a method for intelligent sensing signal generation and intelligent event sensing, according to an embodiment.

FIG. 23 is a flow chart of a method 2300 for intelligent sensing signal generation and event sensing, which is performed by some embodiments of network 2200. In a block 2302 of method 2300, controller 2202 determines (a) how many sensing signals $s_1$ to send, (b) which fiber optic strand(s) to sending the sensing signals on, or in other words, which fiber optic strands to sense, and (c) at what times to send the sensing signals $s_1$. In a block 2304 of method 2300, sensing signal transmitter 2204 generates a set of sensing signals $s_1$ based on the determinations of controller 2202 in block 2302. In a block 2306 of method 2300, sensing signal transmitter 2204 sends sensing signals $s_1$ at the predetermined times, and on the fiber optic strand(s), determined by controller in block 2302. In a block 2308 of method 2300, sensing signal receiver 2206 receives back-scattering signals $b_1$, such as due to a perturbation 2214 on fiber optic strand 2212 caused by an event 2216.

In a block 2310 of method 2300, controller 2202 process and correlates back-scattering signals $b_1$ to determine event 2216 information. Examples of event information determined in block 2310 include, but are not limited to, location of event 2216, source of event 2216, type of event 2216, intensity of event 2216, and/or other characteristics of event 2216. In a decision block 2312, controller 2202 determines whether all sensing signals $s_1$ generated in block 2304 were optimal for sensing of event 2216. In some embodiments where two or more different types of sensing signals $s_1$ are generated in block 2304, controller 2202 determines in decision block 2312 whether any of the generated sensing signals performed better in sensing event 2216 than others of the generated sensing signals. If the result of decision block is yes, method 2300 returns to block 2302.

On the other hand, if the result of decision block 2312 is no, method 2300 proceeds to a block 2314 where controller 2202 adjusts one or more parameters of some or all sensing signals $s_1$ to increase likelihood of them being optimal for subsequent sensing of an event. In one example of block 2314, controller 2202 adjusts parameters of a subset of switching signals $s_1$ to match parameters of other sensing signals $s_1$ determined in block 2312 to have achieved superior performance when sensing event 2216. Although method 2300 is illustrated as continuing in perpetuity once it has begun, method 2300 could be modified to terminate after occurrence of one or more events.

Figure 24:
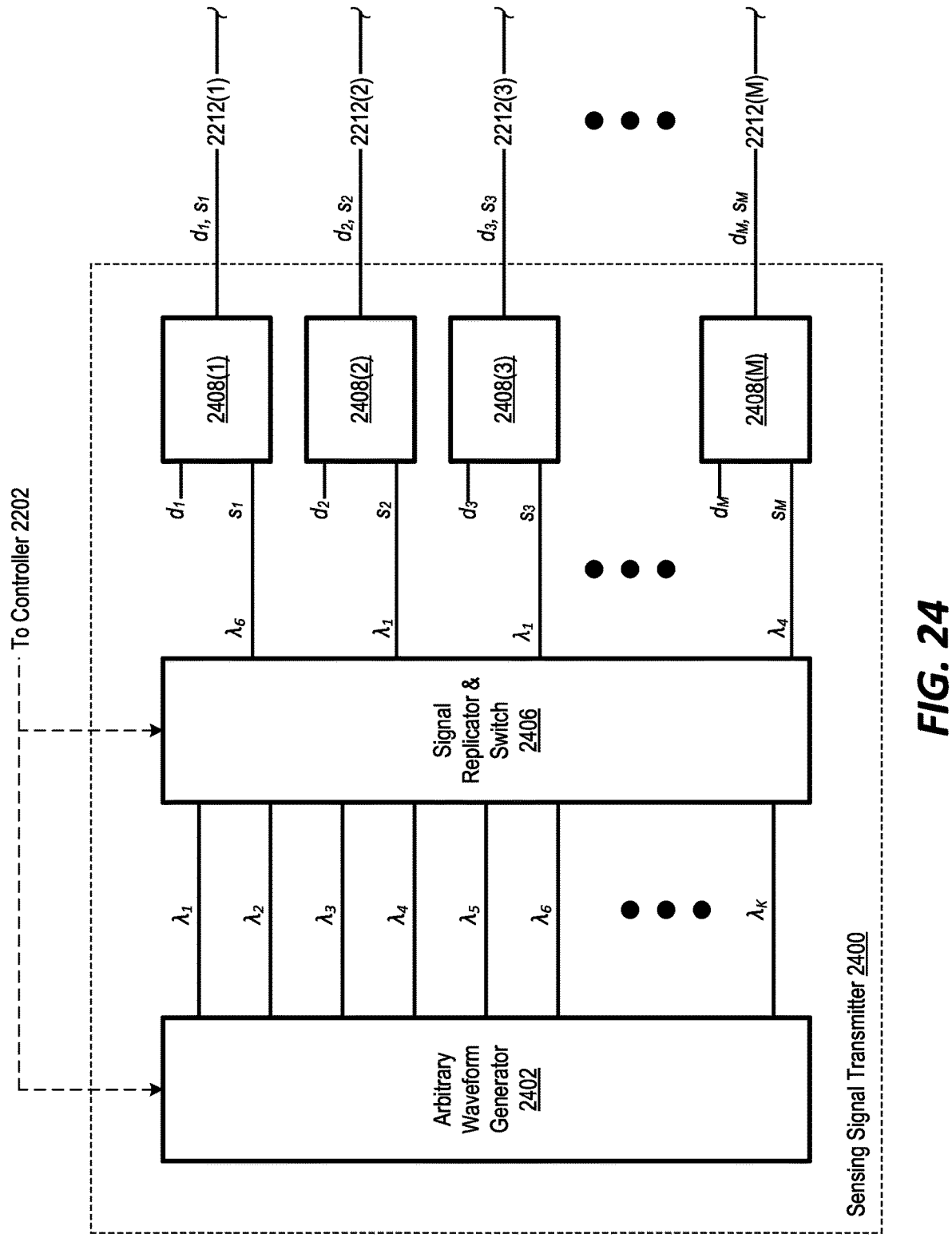
FIG. 24 is a block diagram of a sensing signal transmitter, according to an embodiment.

Referring again to FIG. 22, in certain embodiments of network 2200, sensing signal transmitter 2204 includes an arbitrary waveform generator that flexibly generates sensing signals according to the commands of controller 2202. Additionally, some embodiments of sensing signal transmitter 2204 include a signal replicator and a switch to achieve sensing signal distribution flexibility. For example, FIG. 24 is block diagram of a sensing signal transmitter 2400 including an arbitrary waveform generator 2402, a signal replicator and switch 2406, and M coupling devices 2408, where M is an integer greater than one. Sensing signal transmitter 2400 is an embodiment of sensing signal transmitter 2204 of FIG. 22. Arbitrary waveform generator 2402 is configured to generate K waveforms having different respective center wavelengths A, under the control of controller 2202. Signal replicator and switch 2406 is configured to provide waveforms from arbitrary waveform generator 2402 to coupling devices 2408 according to instructions from controller 2202.

Signal replicator and switch 2406 is capable of providing a given waveform from arbitrary waveform generator 2402 to multiple coupling devices 2408 as sensing signals s. For example, FIG. 24 illustrates signal replicator and switch 2406 providing a signal from arbitrary waveform generator 2402 having wavelength $\lambda_1$ to each of coupling devices 2408(2) and 2408(3) as sensing signals $s_2$ and $s_3$, respectively. Additionally, certain embodiments of signal replicator and switch 2406 are capable of providing signals from arbitrary waveform generator 2402 to coupling devices 2408 in an arbitrary order. For example, FIG. 24 illustrates a signal having wavelength $\lambda_5$ being provided to a first coupling device 2408(1) as sensing signal $s_1$, while a signal having wavelength $\lambda_4$ is provided to an Mth coupling device 2408(M) as sensing signal $s_M$. As such, signal replicator and switch 2406 is capable of switching a given waveform from arbitrary waveform generator 2402 to a given a fiber optic strand 2212, as well replicating a given waveform from arbitrary waveform generator 2402 and providing it to a plurality of fiber optic strands 2212.

Each coupling device 2408 is configured to multiplex a respective switching signal s and a respective data signal d onto a respective fiber optic strand 2212. For example, coupling device 2408(1) is configured to multiplex switching signal $s_1$ and a data signal $d_1$ onto a fiber optic strand 2212(1), and coupling device 2408(2) is configured to multiplex a switching signal $s_2$ and a data signal $d_2$ onto a fiber optic strand 2212(2). In some embodiments, each coupling device 2408 includes one or more of a coupler, a combiner, and a wavelength division multiplexer.

The number (M) of fiber optic strands 2212 coupled to sensing signal transmitter 2400 is implementation dependent. In some scenarios, one may want to take advantage of a network having many fiber optic strands to achieve a dense presence of sensing signals, such as to achieve high correlation, to achieve high sensitivity, and/or to achieve high resolution of event location. In other scenarios, use of fewer fiber optic strands may be sufficient to achieve a desired sensing performance.

Figure 25:
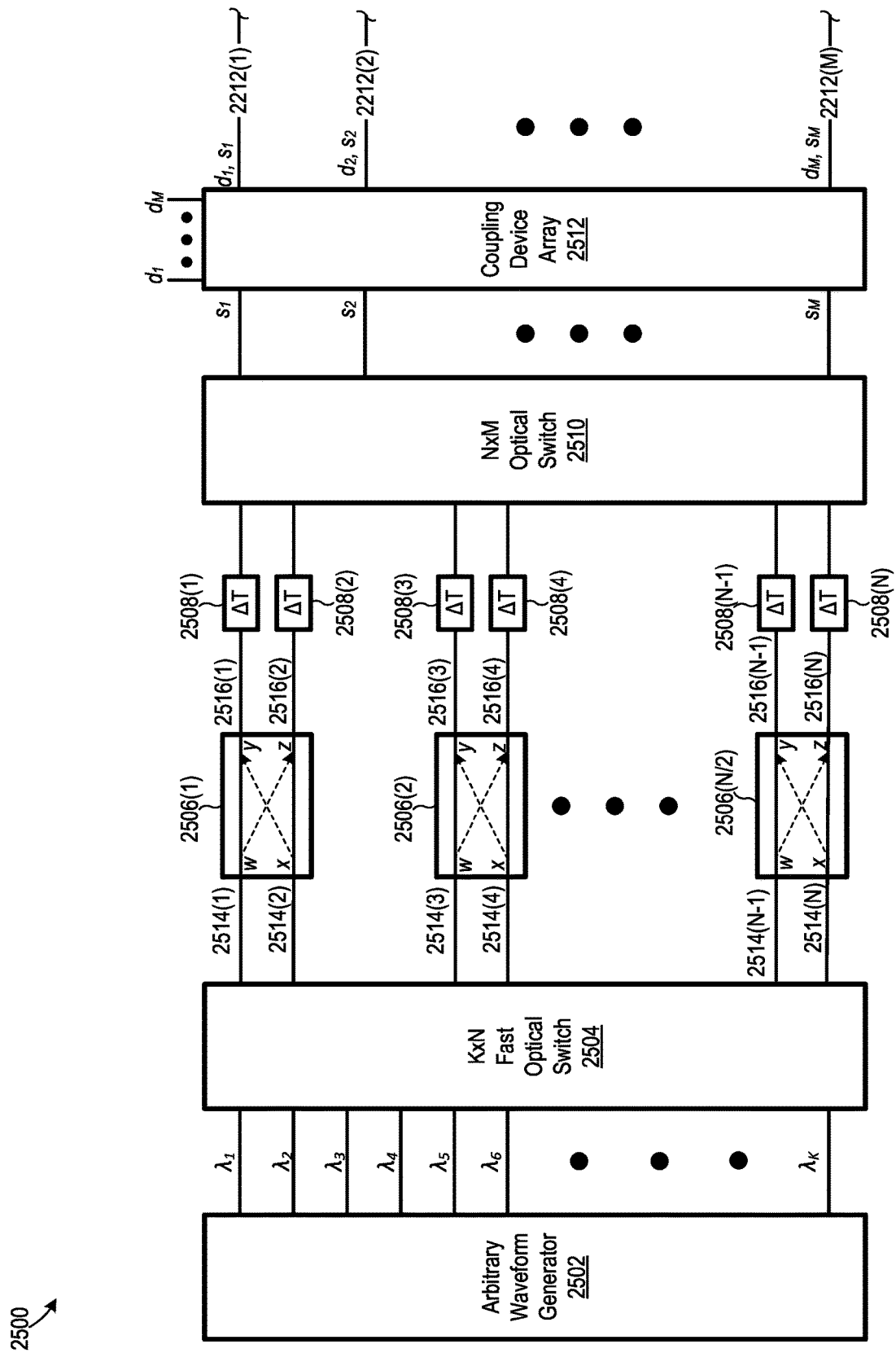
FIG. 25 is a block diagram of an embodiment of the FIG. 24 sensing signal transmitter, according to an embodiment.

FIG. 25 is a block diagram of a sensing signal transmitter 2500, which is an embodiment of sensing signal transmitter 2400 of FIG. 24. Sensing signal transmitter 2500 includes an arbitrary waveform generator 2502, a fast optical switch 2504, N/2 tunable couplers 2506, N tunable delay elements 2508, an optical switch 2510, and a coupling device array 2512, where (a) N is a positive even integer and (b) M is a positive integer. N need not be equal to M. Arbitrary waveform generator 2502 is an embodiment of arbitrary waveform generator 2402 of FIG. 24, and arbitrary waveform generator 2502 is configured to generate K waveforms having different respective center wavelengths $\lambda$.

Fast optical switch 2504, tunable couplers 2506, tunable delay elements 2508, and optical switch 2510 collectively form an embodiment of signal replicator and switch 2406. Fast optical switch 2504 is configured to switch the K waveforms from arbitrary waveform generator 2502 among N first channels 2514. At a given time, each first channel 2514 carries a signal having a respective wavelength. Pairs of first channels 2514 are connected to a respective tunable coupler 2506. For example, a pair of first channels 2514(1) and 2514(2) is connected to tunable coupler 2506(1), and a pair of first channels 2514(3) and 2514(4) is connected to tunable coupler 2506(2). Each tunable coupler 2506 includes two input ports w and x as well as two output ports y and z. Each input port w and x is communicatively coupled to a respective first channel 2514, and each output port y and z is communicatively coupled to a respective second channel 2516.

Each tunable coupler 2506 operates in one of at least two operating modes at a given time under the command controller 2202. In a first operating mode, a sensing signal entering one of input ports w and x of a tunable coupler 2506 instance is divided at least substantially equally among its two output ports y and z, thereby replicating the input signal on two output ports. For example, a signal on first channel 2514(3) may be replicated by tunable coupler 2506(2) such that the signal is divided equally among second channels 2516(3) and 2516(4), in a first operating mode of tunable coupler 2506(2). In second operating mode, there is no signal replication and no energy is cross-coupled across output ports y and z. For example, in a second operating mode of tunable coupler 2506(2), a signal on first channel 2514(3) is coupled solely to second channel 2516(3), and a signal on first channel 2514(4) is coupled solely to second channel 2516(4). Sensing signal transmitter 2500 could be modified to include additional tunable couplers that are cascaded with tunable couplers 2506 to obtain greater replication of signals, such as a one-to-four replication, a one-to-eight replication, etc.

Each tunable delay element 2508 operates under the control of controller 2202 to perform fine time adjustments to ensure that sensing signals are synchronized as required. Optical switch 2510 is configured to switch N second channels 2516 under the command of controller 2202 to generate M sensing signals $s_1$ though $s_M$. While optical switch 2504 needs to be capable of relatively fast switching, slower switching will suffice for optical switch 2510. Consequently, in some embodiments, optical switch 2504 has a faster switching capability than optical switch 2510. In some alternate embodiments where manual configuration of sensing signal transmitter 2500 is permissible, optical switch 2510 is replaced with an optical fiber strand patch panel.

Figure 26:
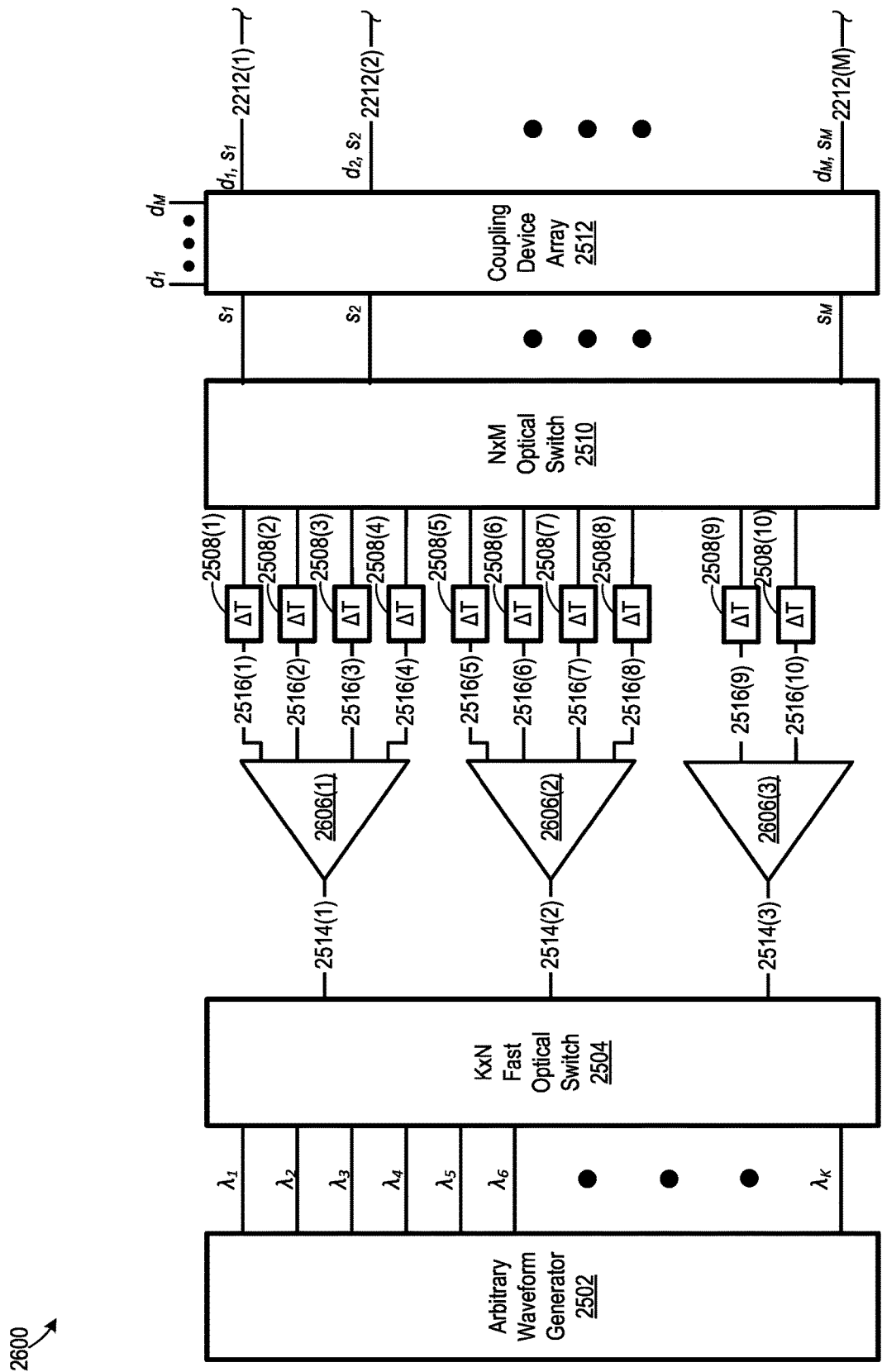
FIG. 26 is a block diagram of an alternate embodiment of the FIG. 25 sensing signal transmitter.

FIG. 26 is a block diagram of a sensing signal transmitter 2600, which is an alternate embodiment of sensing signal transmitter 2500. While N is equal to ten in the FIG. 26 example, N could any integer in sensing signal transmitter 2600 as long as N is an integer greater than one, where N represents number of second channels 2516. Tunable couplers 2506 of sensing signal transmitter 2500 are replaced with fixed splitters 2606 in sensing signal transmitter 2600. Each fixed splitter 2606 is configured to replicate a signal on a respective first channel 2514 into a plurality of common signals on respective second channels 2516. For example, fixed splitter 2606(1) is configured to replicate a first signal of first channel 2514(1) into a first signal on each of second channels 2516(1), 2516(2), 2516(3), and 2516(4). Each splitter 2606 need not have the same configuration. For example, while each of splitters 2606(1) and 2606(2) is a one-to-four splitter, splitter 2606(3) is only a one-to-two splitter, in the FIG. 26 example. Additionally, in some alternate embodiments of sensing signal transmitter 2600, one or more outputs of optical switch 2504 is coupled to optic switch 2510 without being replicated by a fixed splitter 2606. The number of fixed splitters 2606 in sensing signal transmitter 2600 may vary.

Figure 27:
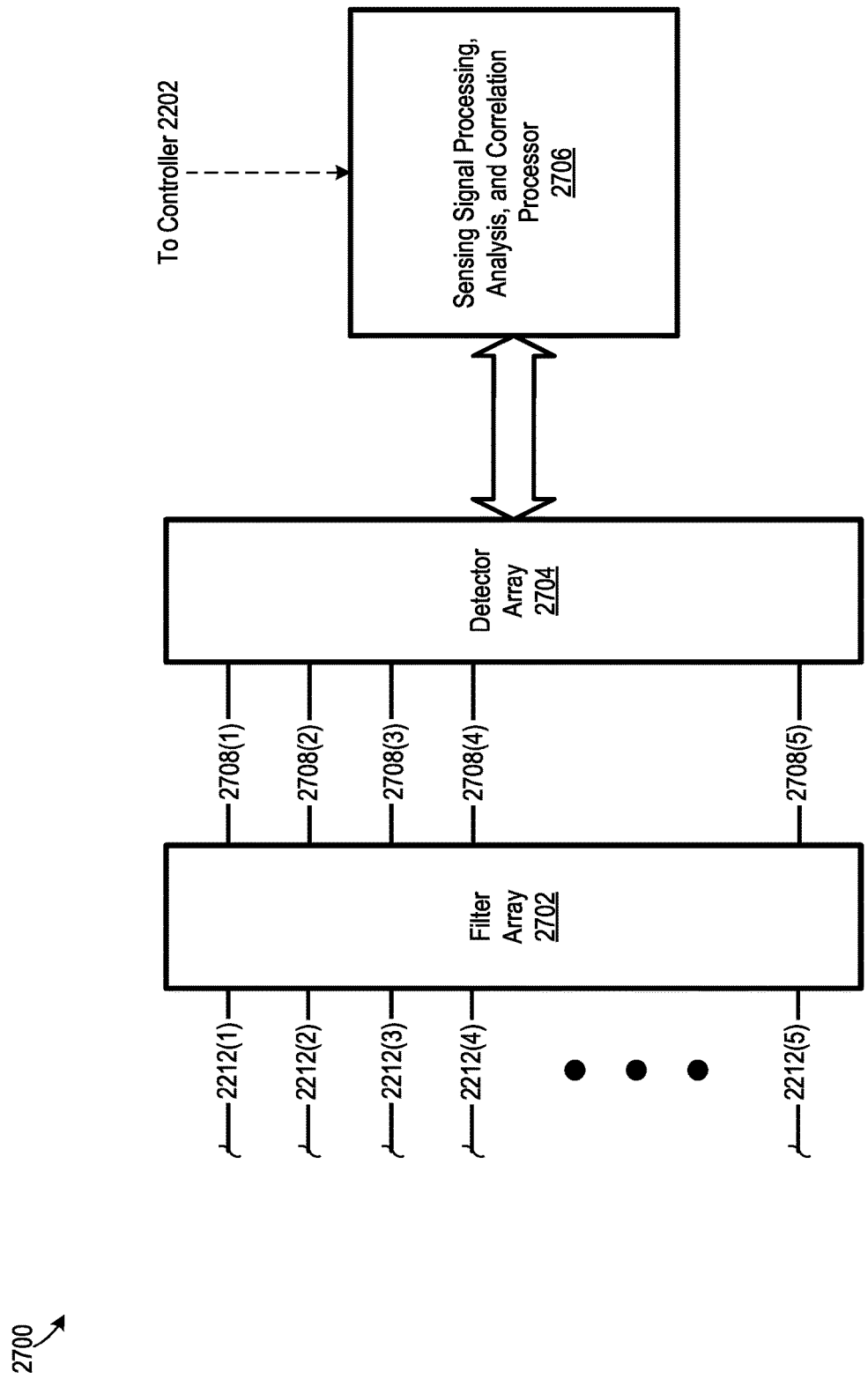
FIG. 27 is a block diagram of a sensing signal receiver, according to an embodiment.

FIG. 27 is a block diagram of a sensing signal receiver 2700, which is one embodiment of sensing signal receiver 2206 of FIG. 22. Sensing signal receiver 2700 includes a filter array 2702, a detector array 2704, and a processor 2706. Filter array 2702 is configured to filter signals received from each of fiber optic strands 2214 to generate filtered signals 2708. In some embodiments, filter array 2702 is coupled to fiber optic strands 2212 via a respective optical circulator (not shown) for each fiber optic strand 2212, to direct uplink signals on fiber optic strands to filter array 2702. One or more filtered signals 2708 includes, for example, back-scattering signals and/or forward scattering signals generated by perturbations on respective fiber optic strands 2212. Processor 2706 is configured to process, analyze, and correlate scattering signals in filtered signals 2708 to sense an event perturbing one or more fiber optic strands 2212. In some embodiments, processor 2706 is configured to compare and learn from the different training sensing signals that have been sent so that future sensing signals for the different events could be further optimized.

EXPERIMENTAL RESULTS

The following is a summary of several experiments that Applicant conducted on particular embodiments of the new DFOS systems disclosed herein. It is understood that the new DFOS systems and methods described above are not limited to embodiments of the experiments discussed below.

Experiment A

Figure 28:
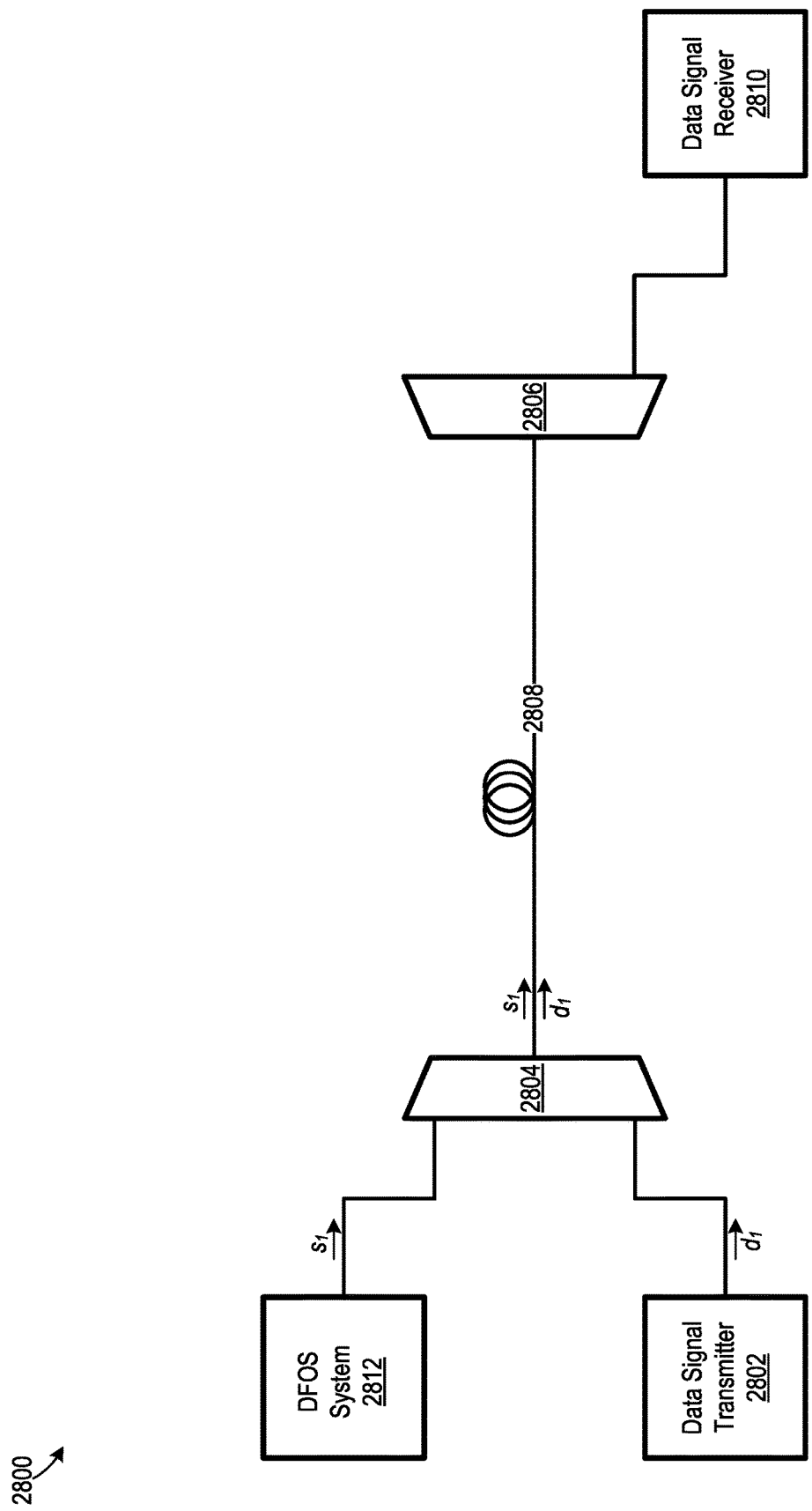
FIG. 28 is a block diagram of an embodiment of the FIG. 1 fiber optic network used for experimentation.

Applicant conducted experiments using a fiber optic network 2800, henceforth referred to as network 2800, which is illustrated in FIG. 28. Fiber optic network 2800 includes a data signal transmitter 2802, a multiplexer 2804, a demultiplexer 2806, a fiber optic strand 2808, a data signal receiver 2810, and a DFOS system 2812. Network 2800 is similar to network 100 of FIG. 1. Specifically, data signal transmitter 2802, fiber optic strand 2808, data signal receiver 2810, and DFOS system 2812 are embodiments of data signal transmitter 102, fiber optic strand 108, data signal receiver 110, and DFOS system 112, respectively. Optical couplers 104 and 106 of network 100 are collectively implemented by multiplexer 2804 in network 2800.

Data signal transmitter 2802 is configured to generate coherent optics data signals $d_1$ supporting either (a) a 100 Gigabit per second (Gbs) client data rate using 31.4 Gigabaud (Gbd) phase modulation-quadrature phase shift keying (PM-QPSK) modulation or (b) a 200 Gbd client data rate using 31.4 GBd phase modulation-16 quadrature amplitude modulation (PM-16QAM) modulation. Data signal generator 2802 is configured to support both single channel and wavelength division multiplexing (WDM) communication. Fiber optic strand 2808 has a length of 80 km. DFOS system 2812 is configured to generate sensing signals $s_1$ having a repetition rate of 1 kilohertz (kHz), an optical intensity profile of a supergaussian with a full width at half maximum (FWHM) of 20 ns-100 ns (1E-4 duty cycle) and 500 megahertz (MHz) frequency (chirp) content. DFOS system 2812 is configured such that sensing signals $s_1$ have a programmable power ranging from 20 milliwatts (mW) to 200 mW when entering fiber optic strand 2808 from multiplexer 2804. Data signal receiver 2810 is configured to receive data signals $d_1$ generated by data signal transmitter 2810.

Figure 29:
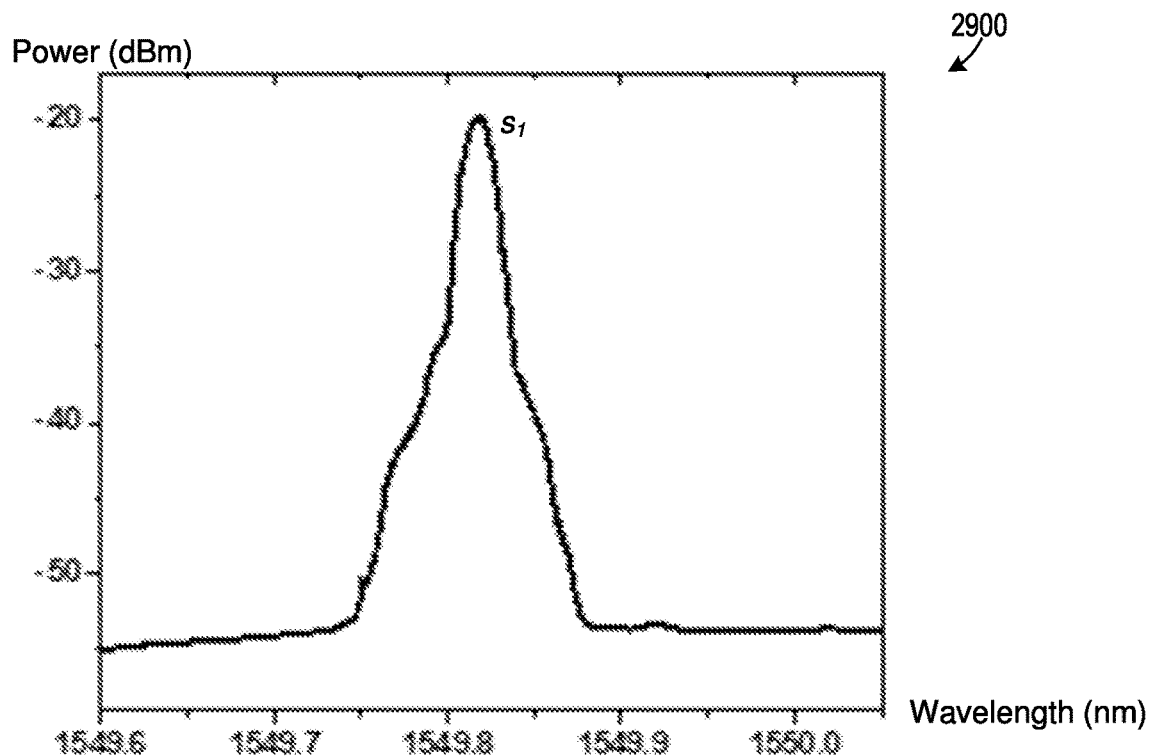
FIG. 29 is graph of power versus wavelength of one example of sensing signals in the FIG. 28 fiber optic network.
Figure 30:
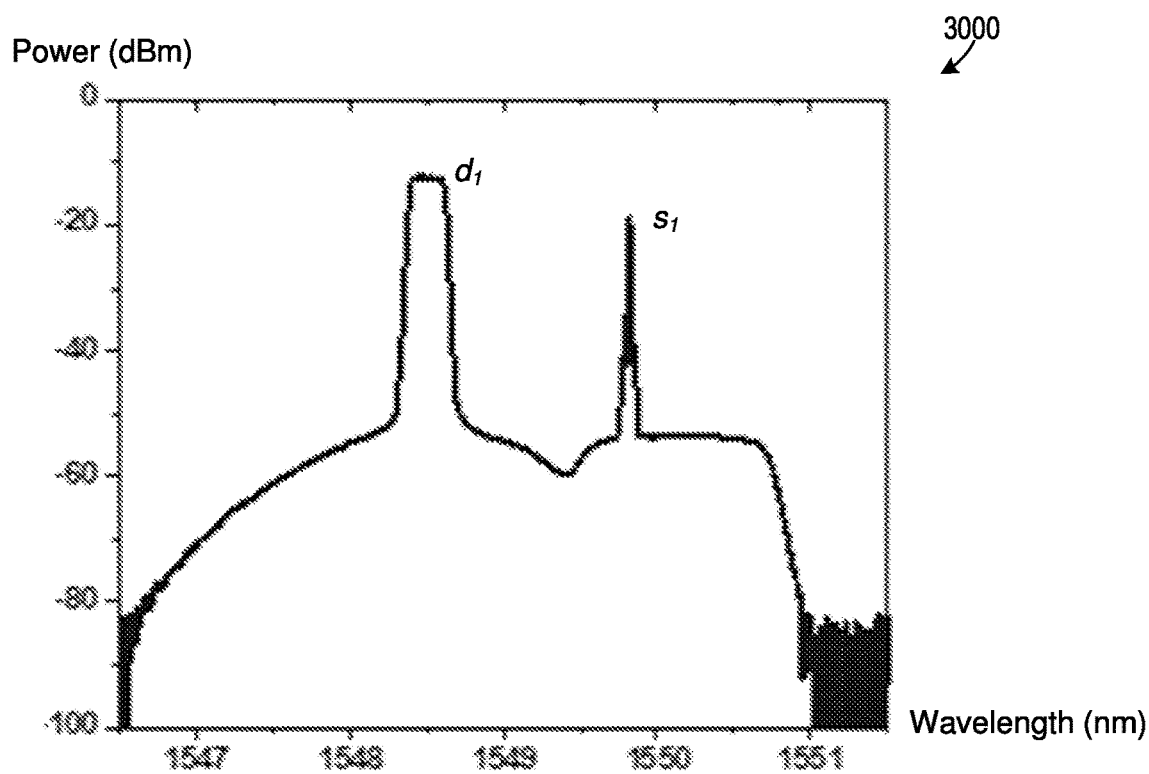
FIG. 30 is a graph of power versus wavelength of one example of data signals and sensing signals in the FIG. 28 fiber optic network.
Figure 31:
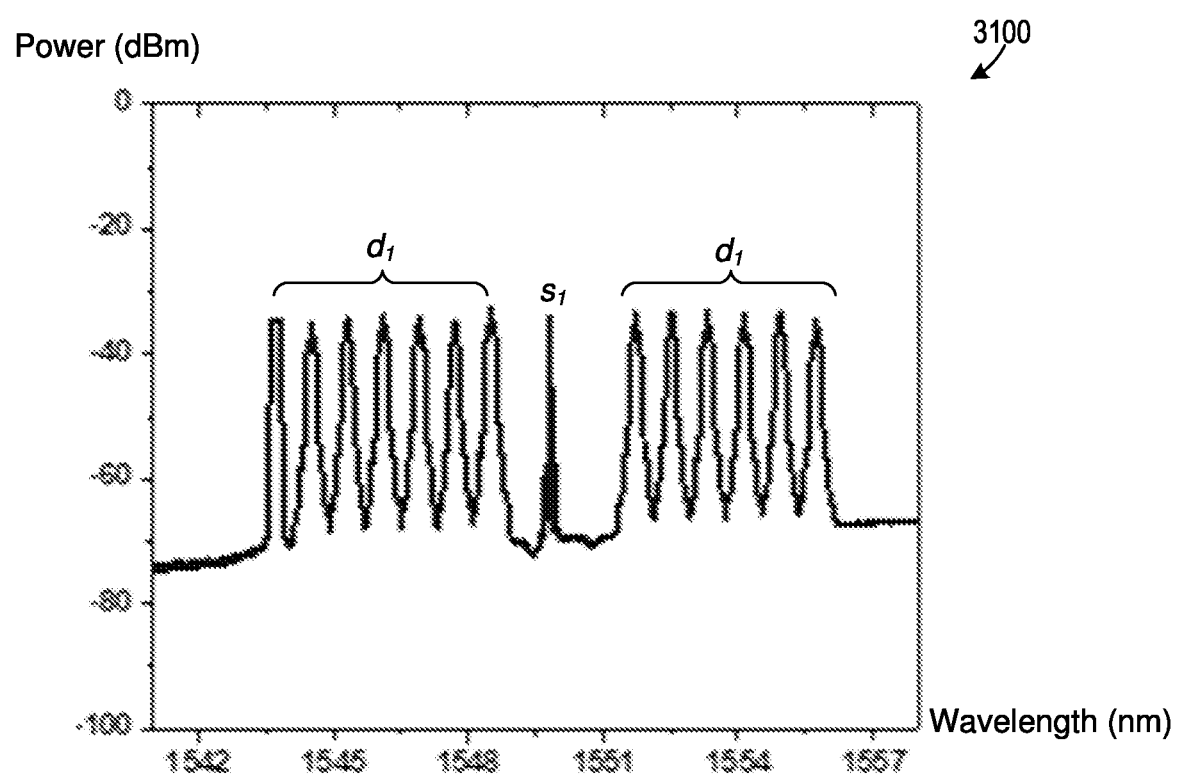
FIG. 31 is a graph of power versus wavelength of another example of data signals and sensing signals in the FIG. 28 fiber optic network.

FIGS. 29-31 illustrate several examples of signals in network 2800. Specifically, FIG. 29 is a graph 2900 of power in milli-decibels (dBm) versus wavelength in nanometers (nm) of one example of sensing signals $s_1$ in network 2800. FIG. 30 is a graph 3000 of the FIG. 29 sensing signals $s_1$ superimposed on an example of data signals $d_1$ in network 2800 during single channel operation. FIG. 31 is a graph 3100 of the FIG. 29 sensing signals $s_1$ superimposed on an example of data signals $d_1$ in network 2800 during WDM operation. Sensing signals $s_1$ have a significantly different wavelength than data signals $d_1$ in the examples of FIGS. 30 and 31, which helps achieve coexistence of the signals on fiber optic strand 2808.

Network 2800 is configured such that data signals $d_1$ and sensing signals $s_1$ travel in the same direction in fiber optic strand 2808, which is referred to as co-propagation. Applicant also tested a modified version of network 2800 (not shown) where data signals $d_1$ and sensing signals $s_1$ travel in opposite directions in fiber optic strand 2808, which is referred to as counter-propagation.

Testing of network 2800 (and the modified version configured for counter-propagation) confirmed that data signals $d_1$ and sensing signals $s_1$ can coexist on fiber optic strand 2808 without presence of excessive errors in data signals $d_1$ at data signal receiver 2810, with certain restrictions on the configuration of sensing signals $s_1$. Table 1 below summarizes the results of the tests.

TABLE 1

| Transmission Direction | PM-QPSK Modulation | PM-16QAM Modulation |
| --- | --- | --- |
| Co-Propagation | Coexistence Achieved: $s_1$ power of 25 mW and 100 ns duration $s_1$ power of 50 mW and 100 ns duration $s_1$ power of 75 mW and 20 ns duration Coexistence Not Achieved: $s_1$ power ≥ 100 mW, irrespective of signal duration | Coexistence Achieved: $s_1$ power of 25 mW and 100 ns duration Coexistence Not Achieved: $s_1$ power ≥ 50 mW, irrespective of signal duration |
| Counter-Propagation | Coexistence achieved under all tested scenarios | |

As summarized in Table 1, coexistence of data signals $d_1$ and sensing signals $s_1$ on fiber optic strand 2808 during co-propagation operation was achieved under some, but not all, of the tested scenarios. In particular, with data signal transmitter 2802 configured for PM-QPSK modulation during co-propagation operation, (a) coexistence was achieved with sensing signal $s_1$ power of 25 milliwatts (mW), 50 mW, and 75 mW and respective signal durations of 100 nanoseconds (ns), 100 ns, and 20 ns, and (b) coexistence was not achieved with sensing signal $s_1$ power of greater than or equal to 100 mW, irrespective of sensing signal duration. With data signal transmitter 2802 configured for PM-16QAM modulation co-propagation operation, (a) coexistence was achieved with sensing signal $s_1$ power of 25 mW with a sensing signal duration of 110 ns, and (b) coexistence was not achieved with sensing signal $s_1$ power of greater than or equal to 50 mW, irrespective of sensing signal duration. During counter-propagation, coexistence was achieved under all tested scenarios.

Combinations of Features

Features described above may be combined in various ways without departing from the scope hereof. The following examples illustrate some possible combinations.

(A1) A method for distributed fiber optic sensing (DFOS) includes (1) generating first data signals for transmission via a first fiber optic strand, (2) generating first sensing signals for transmission via the first fiber optic strand, and (3) analyzing at least one of first back-scattering signals and first forward-scattering signals of the first sensing signals, to perform DFOS.

(A2) In the method denoted as (A1), an optical carrier of the first sensing signal may have a different wavelength than an optical carrier of the first data signal.

(A3) Either one of the methods denoted as (A1) and (A2) may further include generating the first sensing signal such that presence of the first sensing signal on the first fiber optic strand does not interfere with transmission of the first data signal by the first fiber optic strand.

(A4) Any one of the methods denoted as (A1) through (A3) may further include controlling one or more parameters of the first sensing signal at least partially based on a type of the first data signal.

(A5) Any one of the methods denoted as (A1) through (A4) may further include changing one or more parameters of the first sensing signal, to reduce likelihood of the first sensing signal interfering with transmission of the first data signal by the first fiber optic strand.

(A6) Any one of the methods denoted as (A1) through (A5) may further include changing one or more parameters of the first sensing signal using one or more of an artificial intelligence technique and a machine learning technique.

(A7) In any one of the methods denoted as (A1) through (A6), generating the first sensing signal may include modulating both phase and amplitude of an optical carrier signal.

(A8) Any one of the methods denoted as (A1) through (A7) may further include analyzing at least one of second back-scattering signals and second forward-scattering signals of the first sensing signal, to perform DFOS.

(A9) In the method denoted as (A8), the first back-scattering signals and the second back-scattering signals may be generated in different respective branches of the first fiber optic strand.

(A10) In any one of the methods denoted as (A1) through (A9), the first back-scattering signals and the first forward-scattering signals of the first sensing signals may be generated in response to a perturbation of the first fiber optic strand.

(A11) In any one of the methods denoted as (A1) through (A10), the first data signals may include one or more of communication signals, control signals, and feedback signals.

(B1) A method for distributed fiber optic sensing (DFOS) includes (1) generating first data signals for transmission via a first fiber optic strand, (2) generating first sensing signals for transmission via the first fiber optic strand, (3) generating second sensing signals for transmission via a second fiber optic strand, and (4) analyzing scattering signals of each of the first and second sensing signals, to perform DFOS.

(B2) The method denoted as (B1) may further include generating the first and second sensing signals such that the first and second sensing signals are synchronized.

(B3) Either one of the methods denoted as (B1) and (B2) may further include generating second data signals for transmission via the second fiber optic strand.

(C1) A distributed fiber optic sensing (DFOS) system includes (1) a sensing signal transmitter configured to generate a first sensing signal for transmission via a first fiber optic strand, at least partially based on a type of data signals to be transmitted by the first fiber optic strand, such that the first sensing signal does not interfere with transmission of the data signals by the first fiber optic strand, and (2) a scattering signal analyzer configured to analyze first scattering signals of the first sensing signal from the first fiber optic strand, to perform DFOS.

(C2) In the DFOS system denoted as (C1), the scattering signal analyzer may be further configured to analyze second scattering signals of the first sensing signal from the first fiber optic strand, to perform DFOS.

(C3) In either of the DFOS systems denoted as (C1) and (C2), the sensing signal transmitter may be further configured to change one or more parameters of the first sensing signal, to reduce likelihood of the first sensing signal interfering with transmission of the data signals by the first fiber optic strand.

(C4) In any one of the DFOS systems denoted as (C1) through (C3), the sensing signal transmitter may be further configured to modulate both phase and amplitude of an optical carrier signal, to generate the first sensing signal.

(C5) Any one of the DFOS systems denoted as (C1) through (C4) may further include a second sensing signal transmitter configured to generate a second sensing signal for transmission via a second fiber optic strand.

(C6) In the DFOS system denoted as (C5), the scattering signal analyzer may be further configured to analyze first scattering signals of the second sensing signal from the second fiber optic strand, to perform DFOS.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for distributed fiber optic sensing (DFOS), the method comprising:
   generating first data signals;
   generating first sensing signals;
   controlling one or more parameters of the first sensing signals at least partially based on a type of the first data signals;
   providing each of the first data signals and the first sensing signals to a first fiber optic strand, for transmission by the first fiber optic strand;
   receiving, from the first fiber optic strand, first scattering signals resulting from a perturbation of the first fiber optic strand while the first sensing signals are being transmitted by the first fiber optic strand; and
   analyzing the first scattering signals to perform DFOS.

2. The method of claim 1, wherein a carrier of the first sensing signals has a different wavelength than a carrier of the first data signals, each of the first sensing signals and the first data signals being respective optical signals.

3. The method of claim 1, further comprising generating the first sensing signals such that the presence of the first sensing signals on the first fiber optic strand does not interfere with transmission of the first data signals by the first fiber optic strand.

4. The method of claim 1, further comprising changing one or more parameters of the first sensing signals, to reduce likelihood of the first sensing signals interfering with transmission of the first data signals by the first fiber optic strand.

5. The method of claim 1, further comprising changing one or more parameters of the first sensing signals using one or more of an artificial intelligence technique and a machine learning technique.

6. The method of claim 1, wherein generating the first sensing signals comprises modulating both phase and amplitude of a carrier, the first sensing signals being optical signals.

7. The method of claim 1, further comprising analyzing second scattering signals of the first sensing signals, to perform DFOS.

8. The method of claim 7, wherein the first scattering signals and the second scattering signals are generated in different respective branches of the first fiber optic strand.

9. The method of claim 1, wherein the first data signals comprise one or more of communication signals, control signals, and feedback signals.

10. A method for distributed fiber optic sensing (DFOS), the method comprising:
    generating first data signals;
    generating first sensing signals;
    controlling one or more parameters of the first sensing signals at least partially based on a type of the first data signals;
    providing each of the first data signals and the first sensing signals to a first fiber optic strand, for transmission by the first fiber optic strand;
    generating second sensing signals for transmission via a second fiber optic strand;
    providing the second sensing signals to a second fiber optic strand, for transmission by the second fiber optic strand;
    receiving, from the first fiber optic strand, scattering signals of the first sensing signals resulting from a perturbation of the first fiber optic strand while the first sensing signals are being transmitted by the first fiber optic strand;
    receiving, from the second fiber optic strand, scattering signals of the second sensing signals resulting from a perturbation of the second fiber optic strand while the second sensing signals are being transmitted by the second fiber optic strand; and
    analyzing each of (a) the scattering signals of the first sensing signals and (b) the scattering signals of the second sensing signals, to perform DFOS.

11. The method of claim 10, further comprising generating the first and second sensing signals such that the first and second sensing signals are synchronized.

12. The method of claim 10, further comprising generating second data signals for transmission via the second fiber optic strand.

13. A distributed fiber optic sensing (DFOS) system, comprising:
    a sensing signal transmitter configured to generate first sensing signals for transmission via a first fiber optic strand, at least partially based on a type of data signals to be transmitted by the first fiber optic strand, such that the first sensing signals do not interfere with transmission of the data signals by the first fiber optic strand; and
    a scattering signal analyzer configured to analyze first scattering signals resulting from a perturbation of the first fiber optic strand while the first sensing signals are being transmitted by the first fiber optic strand, to perform DFOS.

14. The DFOS system of claim 13, wherein the scattering signal analyzer is further configured to analyze second scattering signals of the first sensing signals from the first fiber optic strand, to perform DFOS.

15. The DFOS system of claim 13, wherein the sensing signal transmitter is further configured to change one or more parameters of the first sensing signals, to reduce likelihood of the first sensing signals interfering with transmission of the data signals by the first fiber optic strand.

16. The DFOS system of claim 13, wherein the sensing signal transmitter is further configured to modulate both phase and amplitude of a carrier, to generate the first sensing signals, the first sensing signals being optical signals.

17. The DFOS system of claim 13, further comprising a second sensing signal transmitter configured to generate second sensing signals for transmission via a second fiber optic strand.

18. The DFOS of claim 17, wherein the scattering signal analyzer is further configured to analyze first scattering signals of the second sensing signals from the second fiber optic strand, to perform DFOS.

* * * * *